(12) United States Patent
Yeo et al.

(10) Patent No.: US 11,394,501 B2
(45) Date of Patent: Jul. 19, 2022

(54) METHOD AND APPARATUS FOR TRANSMITTING UPLINK CONTROL SIGNAL IN WIRELESS CELLULAR COMMUNICATION SYSTEM

(71) Applicant: Samsung Electronics Co., Ltd., Suwon-si (KR)

(72) Inventors: Jeongho Yeo, Hwaseong-si (KR); Jinyoung Oh, Seoul (KR); Sungjin Park, Incheon (KR); Hoondong Noh, Suwon-si (KR); Taehyoung Kim, Seoul (KR); Yongjun Kwak, Yongin-si (KR); Younsun Kim, Seongnam-si (KR); Youngwoo Kwak, Suwon-si (KR); Donghan Kim, Osan-si (KR); Youngbum Kim, Seoul (KR); Cheolkyu Shin, Suwon-si (KR); Seunghoon Choi, Seongnam-si (KR); Heedon Gha, Suwon-si (KR); Taehan Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/338,211

(22) PCT Filed: Sep. 29, 2017

(86) PCT No.: PCT/KR2017/011083
§ 371 (c)(1),
(2) Date: Mar. 29, 2019

(87) PCT Pub. No.: WO2018/062976
PCT Pub. Date: Apr. 5, 2018

(65) Prior Publication Data
US 2020/0028640 A1    Jan. 23, 2020

(30) Foreign Application Priority Data

Sep. 29, 2016 (KR) .................. 10-2016-0125836
Mar. 23, 2017 (KR) .................. 10-2017-0037077
(Continued)

(51) Int. Cl.
*H04W 72/04* (2009.01)
*H04L 5/00* (2006.01)

(52) U.S. Cl.
CPC .......... *H04L 5/0007* (2013.01); *H04L 5/0053* (2013.01)

(58) Field of Classification Search
CPC .... H04B 7/02; H04B 7/26; H04L 1/18; H04L 5/0007; H04L 5/005; H04L 5/0051;
(Continued)

(56) References Cited

U.S. PATENT DOCUMENTS

2011/0170435 A1    7/2011  Kim et al.
2013/0070719 A1*   3/2013  Xu ..................... H04L 5/0057
                                                    370/329
(Continued)

FOREIGN PATENT DOCUMENTS

CN    102263723 A    11/2011
CN    102549997 A     7/2012
(Continued)

OTHER PUBLICATIONS

ZTE Corporation et al., "Reference Signal Design for NR MIMO", R1-166213, 3GPP TSG RAN WG1 Meeting #86, Aug. 13, 2016 See section 2. Aug. 13, 2016.
(Continued)

*Primary Examiner* — Khaled M Kassim
*Assistant Examiner* — Zhaohui Yang
(74) *Attorney, Agent, or Firm* — Jefferson IP Law, LLP

(57) ABSTRACT

The present disclosure relates to a communication technique for converging an IoT technology with a 5G communication
(Continued)

system for supporting a higher data transmission rate beyond a 4G system, and a system therefor. The present disclosure may be applied to an intelligent service (for example, a smart home, a smart building, a smart city, a smart car or connected car, healthcare, digital education, retail business, a security and safety related service, or the like) on the basis of a 5G communication technology and an IoT related technology. The present invention relates to a wireless communication system. More specifically, disclosed is a method and apparatus for transmitting a control signal associated with uplink data transmission by a terminal when the terminal performs uplink transmission.

12 Claims, 53 Drawing Sheets

(30) Foreign Application Priority Data

| | | | |
|---|---|---|---|
| Apr. 28, 2017 | (KR) | ........................ | 10-2017-0055468 |
| Jul. 21, 2017 | (KR) | ........................ | 10-2017-0092416 |
| Aug. 10, 2017 | (KR) | ........................ | 10-2017-0101929 |

(58) Field of Classification Search
CPC ...... H04L 5/0053; Y02D 70/00; Y02D 70/10; Y02D 70/12; Y02D 70/126
See application file for complete search history.

(56) References Cited

U.S. PATENT DOCUMENTS

| | | | | |
|---|---|---|---|---|
| 2013/0208678 | A1 | 8/2013 | Zhang | |
| 2014/0119228 | A1 | 5/2014 | Wang et al. | |
| 2014/0321414 | A1 | 10/2014 | Chun et al. | |
| 2014/0362793 | A1 | 12/2014 | Chai et al. | |
| 2015/0078272 | A1 | 3/2015 | Kim et al. | |
| 2015/0341942 | A1 | 11/2015 | Lee et al. | |
| 2016/0006456 | A1 | 1/2016 | Muramatsu et al. | |
| 2016/0006546 | A1 | 1/2016 | Yi et al. | |
| 2016/0197659 | A1 | 7/2016 | Yu et al. | |
| 2016/0337178 | A1* | 11/2016 | Frenne et al. | ...... H04L 41/0803 |
| 2018/0027575 | A1 | 1/2018 | Shi et al. | |
| 2018/0054290 | A1* | 2/2018 | Park | ........................ H04L 5/005 |
| 2019/0245603 | A1* | 8/2019 | Yum | .................... H04B 7/0617 |
| 2019/0261329 | A1* | 8/2019 | Park | ...................... H04L 5/0048 |

FOREIGN PATENT DOCUMENTS

| | | |
|---|---|---|
| CN | 102647790 A | 8/2012 |
| CN | 105099967 A | 11/2015 |
| EP | 3 244 559 A1 | 11/2017 |
| EP | 3 479 616 B1 | 5/2021 |
| KR | 10-2014-0103926 A | 8/2014 |
| KR | 10-2015-0047482 A | 5/2015 |
| WO | 2015/020404 A1 | 2/2015 |
| WO | 2016/127927 A1 | 8/2016 |

OTHER PUBLICATIONS

CATT: "Discussion on CSI-RS overhead reduction", 3GPP Draft; R1-162280, 3rd Generation Partnership Project (3GPP). Mobile Competence Centre ; 650. Route Des Lucioles ; F-06921 Sophia-Antipolis Cedex ; France, vol. RAN WGI. No. Busan. S. Korea; Apr. 11, 2016-Apr. 15, 2016 XP051080085. Apr. 2, 2016.
NEC: "Discussion on CSI-RS with CDM8", 3GPP Draft; R1-166632. 3rd Generation Partnership Project (3GPP), Mobile Competence Centre ; 650. Route Des Lucioles ; F-06921 Sophia-Antipolis Cedex ; France, vol. RAN WGI. No. Gothenburg. Sweden; Aug. 22, 2016-Aug. 26, 2016 XP051141887. Aug. 12, 2016.
Ericsson: "CSI-RS Design for Class A FD-MIMO", 3GPP Draft; R1-157204. 3rd Generation Partnership Project (3GPP), Mobile Competence Centre ; 650. Route Des Lucioles ; F-06921 Sophia-Antipolis Cedex France, vol. RAN WGI. No. Anaheim. US; Nov. 16, 2015-Nov. 20, 2015. Nov. 15, 2015.
Samsung: "CSI-RS RE mapping with CDM-4 for class A CSI reporting", 3GPP Draft; R1-156783 CSI-RS CDM-4 Final, 3rd Generation Partnership Project (3GPP), Mobile Competence Centre; 650. Route Des Lucioles ; F-06921 Sophia-Antipolis Cedex; France, vol. RAN WGI. No. Anaheim, CA, USA; Nov. 16, 2015-Nov. 20, 2015 XP051039927. Nov. 15, 2015.
European Search Report dated Jun. 28, 2019, issued in European Application No. 17856862.2-1219 / 3506709.
Nokia et al: "Intra-cell CSI-RS design", 3GPP Draft; R1-103799, 3rd Generation Partnership Project (3GPP), Mobile Compeience Centre; 650, Route Des Lucioles ; F-06921 Sophia-Antipolis Cedex; France, vol. RAN WG1, No. Dresden, Germany; Jun. 28, 2010,Jun. 22, 2010 (Jun. 22, 2010), XP050449224.
Huawei: "Email discussion summary on CSI-RS pattern proposals", 3GPP Draft; R1-103444 Email Discussion Summary on CSI-RS Pattern Proposals, 3rd Generation Partnership Project (3GPP), Mobile Competence Centre; 650, Route Des Lucioles ; F-06921 Sophia-Antipolis Cedex; France, vol. RAN WG1, No. Dresden, Germany; Jun. 28, 2010-Jul. 2, 2010, Jul. 5, 2010 (Jul. 5, 2010), XP050598515.
European Office Action dated May 15, 2020, issued in European Application No. 1785682.2.
European Search Report dated Dec. 7, 2021, issued in European Application No. 21183997.2.
Indian Office Action dated Aug. 17, 2021, issued in Indian Application No. 201937012593.
Huawei et al., Discussion on grant-free transmission, 3GPP TSG RAN WG1 #86, R1-166095, Gothenburg, Sweden, Aug. 22-26, 2016.
Chinese Office Action dated Mar. 7, 2022, issued in Chinese Application No. 201780072784.0.
Korean Office Action dated May 26, 2022, issued in Korean Application No. 10-2022-0022794.

\* cited by examiner

FIG. 3H
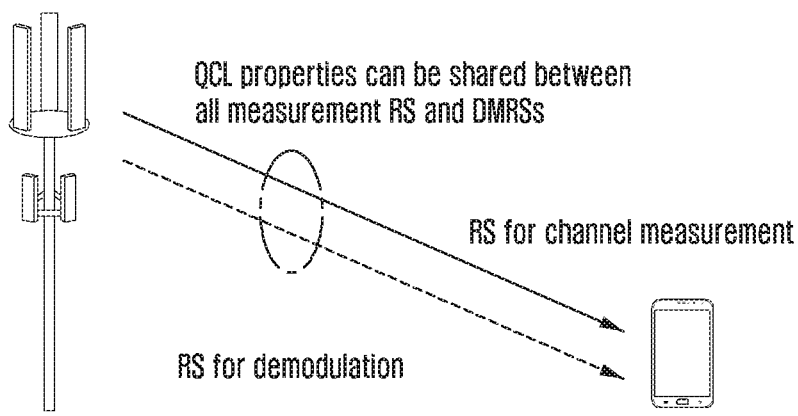
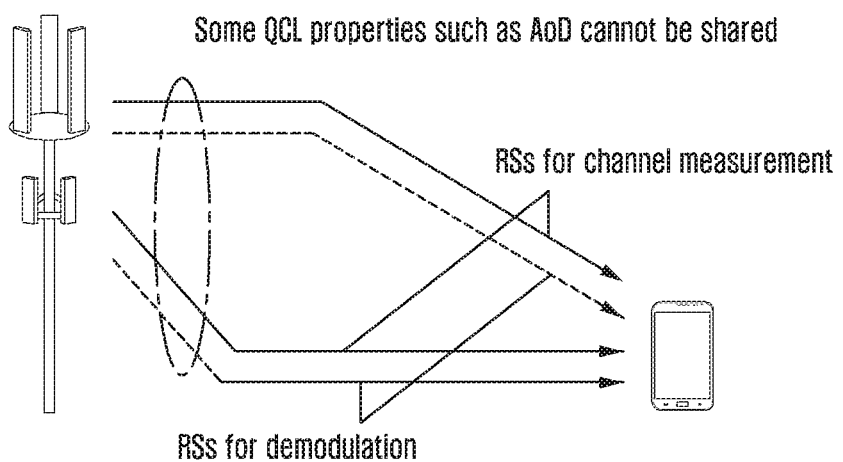

FIG. 31
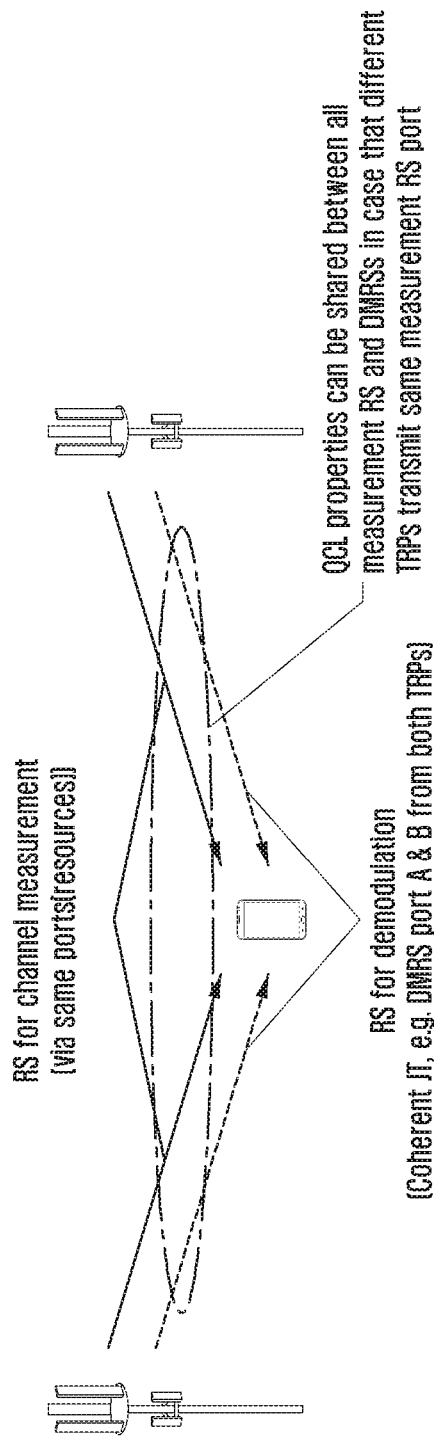
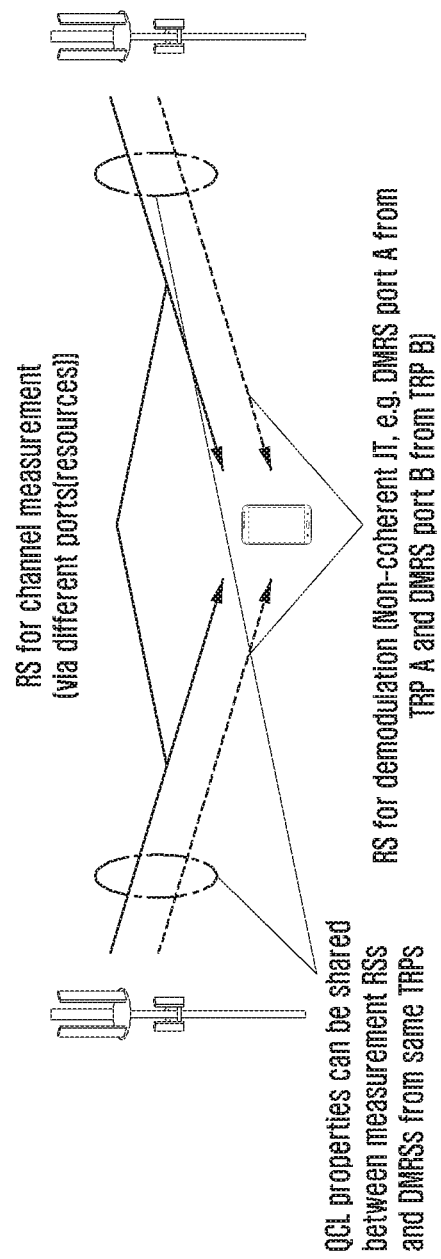

METHOD AND APPARATUS FOR TRANSMITTING UPLINK CONTROL SIGNAL IN WIRELESS CELLULAR COMMUNICATION SYSTEM

TECHNICAL FIELD

The disclosure relates to a wireless communication system. More specifically, the disclosures relates to a method and apparatus for a terminal to transmit a control signal related to uplink data transmission when performing uplink transmission.

BACKGROUND ART

In order to satisfy a wireless data traffic demand that tends to increases after the $4^{th}$-generation (4G) communication system commercialization, efforts to develop an improved 5 (5G) communication system or pre-5G communication system is being made. For this reason, the 5G communication system or pre-5G communication system is called a beyond 4G network communication system or a post LTE system.

In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system.

In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beam-forming, MIMO, and an array antenna. The application of a cloud wireless access network (cloud RAN) as the aforementioned big data processing technology may be said to be an example of convergence between the 5G technology and the IoT technology.

In a wireless communication system, specifically, in a conventional LTE system, when uplink transmission is performed, a terminal uses an MCS, a transmission resource, a TTI length, etc., allocated by a base station, without any change. However, there may be a need for a method for a terminal to perform uplink transmission even without scheduling in an uplink transmission grant from a base station.

DISCLOSURE OF INVENTION

Technical Problem

The disclosure is to provide a method and apparatus for being provided with various services within a shorter delay time through fast feedback reporting as the results of initial transmission.

Furthermore, the disclosure is to provide a method and apparatus for providing different types of services at the same time. More specifically, the disclosure is to provide a method and apparatus for efficiently providing different types of services within the same time interval by obtaining information received suitably for the characteristics of each service when different types of services are provided at the same time through embodiments.

Furthermore, the disclosure is to provide a method of estimating interference information through the same framework as an RS configuration and transmission and reception method.

Solution to Problem

A method of a user equipment according to an embodiment of the disclosure includes receiving data from a base station and transmitting, to the base station, negative ACK (NACK) for some data in a second transmission time interval (TTI) prior to a first TTI in which acknowledgement (ACK) or NACK for the data is to be transmitted when the decoding of some of the data fails.

A user equipment according to an embodiment of the disclosure includes a transceiver configured to transmit and receive signals and a controller configured to receive data from a base station and transmit, to the base station, negative ACK (NACK) for some data in a second transmission time interval (TTI) prior to a first TTI in which acknowledgement (ACK) or NACK for the data is to be transmitted when the decoding of some of the data fails.

A method of a base station according to an embodiment of the disclosure includes transmitting data to a user equipment, receiving negative ACK (NACK) for some data from the user equipment in a second transmission time interval (TTI) prior to a first TTI in which acknowledgement (ACK) or NACK for the data is to be received when the user equipment fails in the decoding of some of the data, and retransmitting data to the user equipment in response to the received NACK.

A base station according to an embodiment of the disclosure includes a transceiver configured to transmit and receive signals and a controller configured to transmit data to a user equipment, receive negative ACK (NACK) for some data from the user equipment in a second transmission time interval (TTI) prior to a first TTI in which acknowledgement (ACK) or NACK for the data is to be received when the user equipment fails in the decoding of some of the data, and retransmit data to the user equipment in response to the received NACK.

A method of a user equipment according to an embodiment of the disclosure includes receiving configuration information related to uplink transmission from a base station and transmitting uplink data to the base station in a resource region determined based on the configuration information without an uplink grant.

A user equipment according to an embodiment of the disclosure includes a transceiver configured to transmit and receive signals and a controller configured to receive configuration information related to uplink transmission from a base station and transmit uplink data to the base station in a resource region determined based on the configuration information without an uplink grant.

A method of a base station according to an embodiment of the disclosure includes transmitting configuration information related to uplink transmission to a user equipment and receiving uplink data from the user equipment in a resource region determined based on the configuration information without an uplink grant.

A base station according to an embodiment of the disclosure includes a transceiver configured to transmit and receive signals and a controller configured to transmit configuration information related to uplink transmission to a user equipment and receive uplink data from the user equipment in a resource region determined based on the configuration information without an uplink grant.

A method of a user equipment according to an embodiment of the disclosure includes receiving information related to reference signal (RS) transmission from a base station, identifying an RS resource configured with a combination of a plurality of reference signal (RS) groups based on the information, and receiving an RS on the RS resource, wherein each of the plurality of RS groups is determined based on a minimum unit of two neighboring resource elements (REs) in one symbol.

A user equipment according to an embodiment of the disclosure includes a transceiver configured to transmit and receive signals and a controller configured to receive information related to reference signal (RS) transmission from a base station, identify an RS resource configured with a combination of a plurality of reference signal (RS) groups based on the information, and receive an RS on the RS resource, wherein each of the plurality of RS groups is determined based on a minimum unit of two neighboring resource elements (REs) in one symbol.

A method of a base station according to an embodiment of the disclosure includes transmitting information related to reference signal (RS) transmission to a user equipment, identifying an RS resource configured with a combination of a plurality of reference signal (RS) groups based on the information, and transmitting an RS based on the RS resource, wherein each of the plurality of RS groups is determined based on a minimum unit of two neighboring resource elements (REs) in one symbol.

A base station according to an embodiment of the disclosure, transmit and receive signals includes a transceiver configured to transmit and receive signals and a controller configured to transmit information related to reference signal (RS) transmission to a user equipment, identify an RS resource configured with a combination of a plurality of reference signal (RS) groups based on the information, and transmit an RS based on the RS resource, wherein each of the plurality of RS groups is determined based on a minimum unit of two neighboring resource elements (REs) in one symbol.

Advantageous Effects of Invention

In accordance with an embodiment of the disclosure, efficient uplink transmission between a BS and a UE can be performed by providing an operation method for the UE to transmit control information on uplink transmission.

Furthermore, in accordance with another embodiment of the disclosure, data can be effectively transmitted using different types of services in a communication system. Furthermore, an embodiment provides a method in which data transmissions between homogeneous or heterogeneous services can coexist. Accordingly, requirements according to each service can be satisfied, and the delay of a transmission time can be reduced or at least one of frequency-time and space resources, transmit power can be efficiently used.

Furthermore, in accordance with another embodiment of the disclosure, coordination between multiple TRPs or beams is made possible because a UE measures a channel through different TRPs or beams. For example, a UE can receive at least one RS of a DL CSI-RS, an UL CSI-RS (SRS), a DMRS through one or more resources, can generate channel state information on a case where the UE independently transmits and receives signals using each TRP or beam through the received RS or a case where the UE cooperatively transmits and receives signals using two or more TRPs or beams, and can report it to a BS. In this case, the UE can measure interference in various transmission and reception scenarios through the interference measurement method provided in the disclosure, and can incorporate the measured interference into the generation of the channel state information. Furthermore, the BS can configure and notify QCL information between RSs according to circumstances through the QCL signaling method provided in the disclosure. The UE can receive the QCL information, can compensate for the time/frequency offset of RSs peripherally transmitted in time and frequency resources, and can improve channel estimation performance.

BRIEF DESCRIPTION OF DRAWINGS

FIG. 1O is a diagram showing a UE operation according to a (2-2) embodiment.

FIG. 3H is a diagram showing an example of a single point transmission-based QCL configuration.

FIG. 3I is a diagram showing an example of a multi-point transmission-based QCL configuration.

FIGS. 3OA, 3OB, 3OC, 3OD and 3OE are diagrams showing CSI-RS port mapping examples of CSI-RS resources according to an embodiment of the disclosure.

MODE FOR THE INVENTION

Figure 1A:
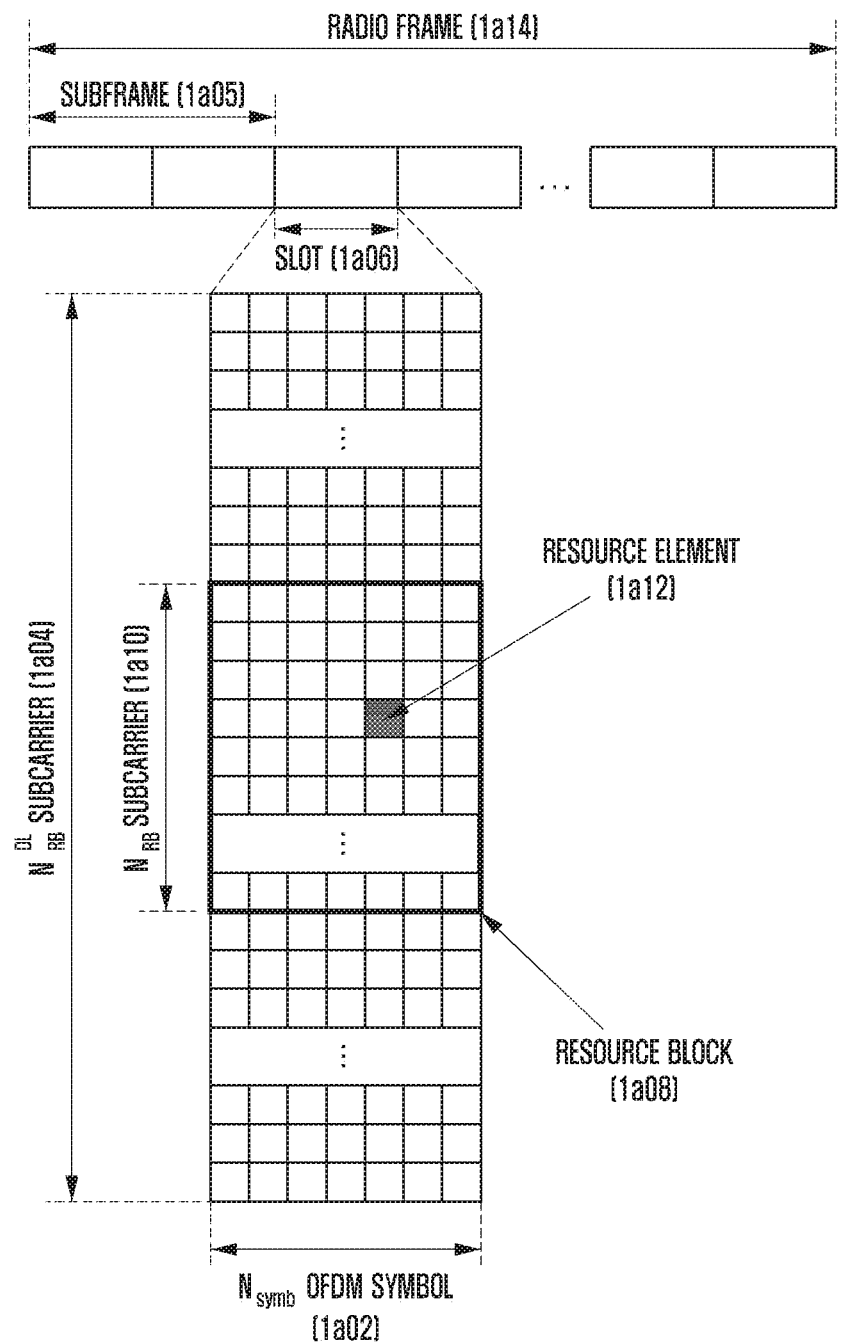
FIG. 1A is a diagram showing a downlink time-frequency domain transmission architecture of an LTE or LTE-A system.

Hereinafter, embodiments of the disclosure are described in detail with reference to the accompanying drawings. Furthermore, in describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice.

The merits and characteristics of the disclosure and a method of achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to fully understand the category of the disclosure. The disclosure is

First Embodiment

Hereinafter, embodiments of the disclosure are described in detail with reference to the accompanying drawings.

In describing the embodiments, a description of contents that are well known in the art to which the disclosure pertains and not directly related to the disclosure is omitted in order to make the gist of the disclosure clearer.

For the same reason, in the accompanying drawings, some elements are enlarged, omitted or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment or code, which includes one or more executable instructions for implementing a specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card. Furthermore, in one embodiment, "~unit" may include one or more processors.

Wireless communication systems deviate from the provision of the initial voice-oriented service and evolve into wideband wireless communication systems that provide high-speed and high-quality packet data services, for example, communication standards, such as high speed packet access (HSPA) of 3GPP, long term evolution (LTE) or evolved universal terrestrial radio access (E-UTRA), LTE-Advanced (LTE-A), LTE-Pro, high rate packet data (HRPD) of 3GPP2, a ultra mobile broadband (UMB) and 802.16e of IEEE. Furthermore, the communication standard of 5G or new radio (NR) is being made as a 5G wireless communication system.

As described above, in a wireless communication system including 5G, at least one service of an enhanced mobile broadband (eMBB), massive machine type communications (mMTC) and ultra-reliable and low-latency communications (URLLC) may be provided to a terminal. The services may be provided to the same terminal during the same time interval. In one embodiment, the eMBB may be service having an object of the high-speed transmission of a large amount of data, the mMTC may be service having an object of terminal power minimization and access of multiple terminals, and the URLLC may be service having an object of high reliability and low latency, but are not limited thereto. The three types of services may be major scenarios in an LTE system or systems, such as 5G/new radio and next radio (NR) after LTE. In one embodiment, a coexistence method of eMBB and URLLC or a coexistence method of mMTC and URLLC and an apparatus using the same are described.

If a base station has scheduled data, corresponding to an eMBB service, with respect to a terminal in a given transmission time interval (TTI), when the situation in which URLLC data must be transmitted in the TTI occur, the base station does not transmit some of eMBB data in a frequency band in which the eMBB data has already been scheduled and transmitted, but may transmit the generated URLLC data in the frequency band. A terminal in which eMBB has been scheduled and a terminal in which URLLC has been scheduled may be the same terminal or different terminals. In such a case, the possibility that the eMBB data may be damaged increases because there is a portion in which some of the already scheduled and transmitted eMBB data is not transmitted. Accordingly, in the above case, a method of processing a signal received by the terminal in which eMBB has been scheduled or the terminal in which URLLC has been scheduled and a signal reception method need to be determined. Accordingly, in one embodiment, when information according to eMBB and URLLC is scheduled by sharing some of or the entire frequency band, when information according to mMTC and URLLC is scheduled at the same time, when information according to mMTC and eMBB is scheduled at the same time or when information according to eMBB and URLLC and mMTC is scheduled at the same time, a coexistence method between heterogeneous services capable of transmitting information according to the services is described.

Hereinafter, embodiments of the disclosure are described in detail with reference to the accompanying drawings. Furthermore, in describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification. Hereinafter, a base station is a subject that performs resource assignment to a terminal, and may be at least one of an eNode B, a Node B, a BS, a radio access unit, a BS controller and a node on a network. A terminal may include a user equipment (UE), a mobile station (MS), a cellular phone, a smartphone, a computer and a multimedia system capable of performing a communication function. In the disclosure, downlink (DL) means the radio transmission path of a signal transmitted from a BS to a UE, and uplink (UL) means the radio transmission path of a signal transmitted from a UE to a BS. Furthermore, the embodiments of the disclosure are described below by taking an LTE or LTE-A system as an example, but the embodiments of the disclosure may be applied to other communication systems having a similar technical background or channel form. For example, a 5G mobile communication technology (new radio (NR)) being developed after LTE-A may be included in other communication systems. Furthermore, an embodiment of the disclosure may also be applied to other communication systems through some modification without greatly departing from the range of the disclosure based on a determination of a person who has skilled technical knowledge.

An LTE system, that is, a representative example of the broadband wireless communication system, adopts an orthogonal frequency division multiplexing (OFDM) scheme in downlink (DL) and adopts a single carrier frequency division multiple access (SC-FDMA) scheme in uplink (UL). Uplink refers to a radio link through which a terminal (or user equipment (UE)) or mobile station (MS)) transmits data or a control signal to a base station (BS or eNode B). Downlink refers to a radio link through which a BS transmits data or a control signal. Such a multi-access scheme is a method of assigning or managing time-frequency resources on which data or control information will be carried for each user in order to distinguish between the data or control information of users so that the time-frequency resources do not overlap, that is, orthogonality is established.

The LTE system adopts a hybrid automatic repeat request (HARQ) scheme of retransmitting corresponding data in a physical layer when a decoding failure occurs in initial transmission. According to the HARQ scheme, when a receiver does not precisely decode data, the receiver transmits information (negative acknowledgement (NACK)), notifying a transmitter of the decode failure, to the transmitter so that the transmitter can retransmit the corresponding data in the physical layer. The receiver combines the data retransmitted by the transmitter with the data whose decoding has previously failed, thereby increasing data reception performance. Furthermore, when the receiver accurately decodes data, the receiver transmits information (acknowledgement (ACK)), notifying the transmitter of a decoding success, to the transmitter so that the transmitter can transmit new data.

In order to satisfy a wireless data traffic demand that tends to increases after the 4th-generation (4G) communication system commercialization, efforts to develop an improved 5 (5G) communication system or pre-5G communication system is being made. For this reason, the 5G communication system or pre-5G communication system is called a beyond 4G network communication system or a post LTE system. In order to achieve a high data transfer rate, the 5G communication system is considered to be implemented in an mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

As described above, in a communication system, a plurality of services may be provided to a user. In order to provide a plurality of such services to a user, there is a need for a method capable of providing each service suitable for characteristics within the same time interval and an apparatus using the same. Furthermore, given services may require a faster transmission time different from that of other services. That is, given services require a less transmission time.

An embodiment of this specification has been proposed to solve the above-described problem, and provides a method and apparatus for providing different types of services at the same time.

FIG. 1A is a diagram showing a basic structure of a frequency domain, that is, a radio resource region in which data or a control channel is transmitted in downlink in an LTE system or a similar system thereof.

Referring to FIG. 1A, a transverse axis indicates a time domain and a longitudinal axis indicates a frequency domain. A minimum transmission unit in the time domain is an OFDM symbol, $N_{symb}$ OFDM symbols 1a02 gather to configure one slot 1a06, and two slots gather to configure one subframe 1a05. The length of the slot is 0.5 ms, and the length of the subframe is 1.0 ms. Furthermore, a radio frame 1a14 is a time domain period configured with 10 subframes. A minimum transmission unit in the frequency domain is a subcarrier, the bandwidth of the entire system transmission bandwidth is configured with a total of $N_{BW}$ subcarriers 1a04. However, such a detailed numerical value may be variably applied.

In the time-frequency domain, a basic unit of a resource is a resource element (RE) 1a12 and may be indicated as an OFDM symbol index and a subcarrier index. A resource block (RB) 1a08 (or physical resource block (PRB)) may be defined as $N_{symb}$ contiguous OFDM symbols 1a02 in the time domain and $N_{RB}$ contiguous subcarriers 1a10 in the frequency domain. Accordingly, in one slot, one RB 1a08 may include $N_{symb} \times N_{RB}$ REs 1a12. In general, a frequency domain minimum allocation unit of data is an RB. In the LTE system, in general, the $N_{symb}=7$, $N_{RB}=12$, and $N_{BW}$ and $N_{RB}$ may be proportional to the bandwidth of a system transmission band. A data rate increases in proportion to the number of RBs scheduled in a UE. An LTE system may define and operate 6 transmission bandwidths. In the case of an FDD system in which downlink and uplink are divided and operated by frequency, a downlink transmission bandwidth and an uplink transmission bandwidth may be different. A channel bandwidth indicates an RF bandwidth corresponding to a system transmission bandwidth. Table 1a shows a correspondence relation between system transmission bandwidths and channel bandwidths defied in an LTE system. For example, in an LTE system having a 10 MHz channel bandwidth, a transmission bandwidth may be configured with 50 RBs.

TABLE 1a

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within the first N OFDM symbols within a subframe. In one embodiment, in general, N={1, 2, 3}. Accordingly, an N value may be variably applied to each subframe depending on the amount of control information to be transmitted in a current subframe. The transmitted control information may include a control channel transmission interval indicator indicating that the control information is transmitted over how many OFDM symbols, scheduling information on downlink data or uplink data, information on HARQ ACK/NACK.

In an LTE system, scheduling information on downlink data or uplink data is delivered from a BS to a UE through downlink control information (DCI). The DCI is defined according to various formats, and may indicate whether the information is scheduling information (UL grant) on uplink data or scheduling information (DL grant) on downlink data depending on each format, whether the information is compact DCI whose size of control information is small, whether spatial multiplexing using multiple antennas is applied, whether the information is DCI for power control, etc. For example, the DCI format 1, that is, scheduling control information (DL grant) on downlink data may include at least one of the following pieces of control information.

Resource allocation type 0/1 flag: indicates whether a resource assignment method is type 0 or type 1. In type 0, a resource is assigned in a resource block group (RBG) unit by applying a bitmap method. In an LTE system, a basic unit of scheduling is an RB represented as time and frequency domain resources. An RBG is configured with a plurality of RBs, and becomes a basic unit of scheduling in a type 0 method. In type 1, a given RB is assigned within an RBG.

Resource block assignment: indicates an RB assigned to data transmission. A represented resource is determined based on a system bandwidth and resource assignment method.

Modulation and coding scheme (MCS): indicates a modulation scheme used for data transmission and the size of a transport block (TB), that is, data to be transmitted.

HARQ process number: indicates the process number of an HARQ.

New data indicator: indicates whether transmission is HARQ initial transmission or retransmission.

Redundancy version: indicates a redundancy version of an HARQ.

Transmit power control (TPC) command for physical uplink control channel (PUCCH): indicates a transmit power control command for a PUCCH, that is, an uplink control channel.

The DCI may be transmitted on a physical downlink control channel (PDCCH) (or control information, and they are hereinafter interchangeably used) or an enhanced PDCCH (EPDCCH) (or enhanced control information, and they are hereinafter interchangeably used), that is, a downlink physical control channel, through a channel coding and modulation process.

In general, the DCI is independently scrambled with a given radio network temporary identifier (RNTI) (or UE ID) with respect to each UE. After cyclic redundancy check (CRC) is added to the DCI and subject to channel coding, the DCI may be configured with each independent PDCCH and transmitted. In the time domain, a PDCCH is mapped and transmitted during a control channel transmission interval. The frequency domain mapping location of the PDCCH may be determined by the ID of each UE and may be spread and transmitted in the entire system transmission bandwidth.

Downlink data may be transmitted on a physical downlink shared channel (PDSCH), that is, a physical channel for downlink data transmission. The PDSCH may be transmitted after a control channel transmission interval. A detailed mapping location of the PDSCH in the frequency domain and scheduling information, such as a modulation scheme, are determined based on DCI transmitted through a PDCCH.

A BS notifies a UE of a modulation scheme applied to a PDSCH to be transmitted and the size of data to be transmitted (transport block size (TBS)) through an MCS among control information that configures the DCI. In one embodiment, the MCS may be configured with 5 bits or bits greater or smaller than 5 bits. The TBS corresponds to a size before channel coding for error correction is applied to a data transport block (TB) to be transmitted by the BS.

A modulation scheme supported in an LTE system includes quadrature phase shift keying (QPSK), quadrature amplitude modulation (16QAM), and 64QAM. Modulation orders (Qm) correspond to 2, 4 and 6, respectively. That is, in the case of QPSK modulation, 2 bits may be transmitted per symbol. In the case of 16QAM modulation, 4 bits may be transmitted per symbol. In the case of 64QAM modulation, 6 bits may be transmitted per symbol. Furthermore, a modulation method of 256QAM or more may be used depending on system modification.

Figure 1B:
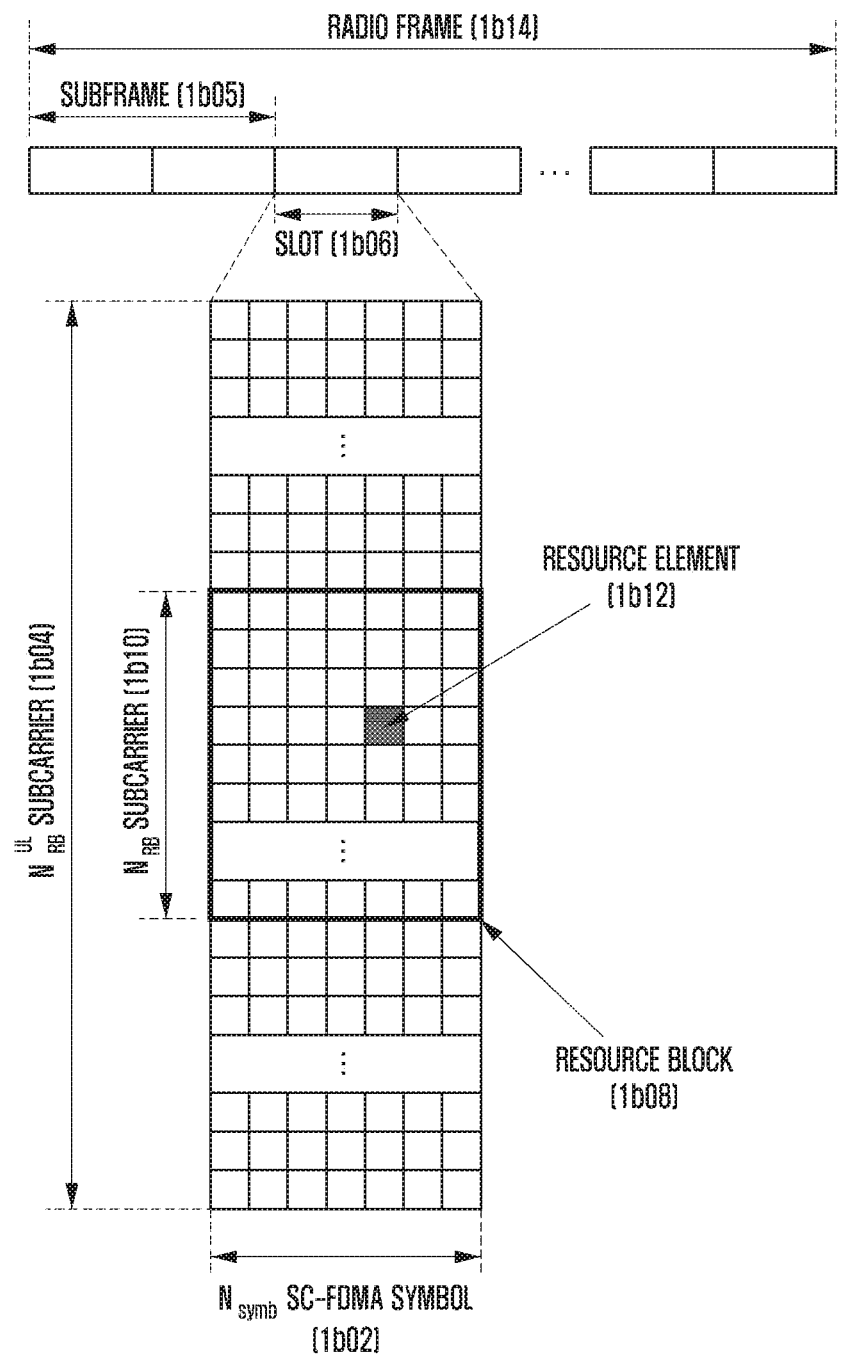
FIG. 1B is a diagram showing an uplink time-frequency domain transmission architecture of an LTE or LTE-A system.

FIG. 1B is a diagram showing a basic structure of a time-frequency domain, that is, a radio resource region in which a data or control channel is transmitted in uplink in an LTE-A system.

Referring to FIG. 1B, a transverse axis indicates a time domain, and a longitudinal axis indicates a frequency domain. A minimum transmission unit in the time domain is an SC-FDMA symbol 1b02, and $N_{symb}^{UL}$ SC-FDMA symbols may gather to configure one slot 1b06. Furthermore, two slots gather to configure one subframe 1b05. A minimum transmission unit in the frequency domain is a subcarrier. The entire system transmission bandwidth 1b04 is configured with a total of $N_{BW}$ subcarriers. $N_{BW}$ may have a value proportional to a system transmission bandwidth.

In the time-frequency domain, a basic unit of a resource is a resource element (RE) 1b12 and may be defined as an SC-FDMA symbol index and a subcarrier index. A resource block pair (RB pair) 1b08 may be defined as $N_{symb}^{UL}$ contiguous SC-FDMA symbol in the time domain and $N_{SC}^{RB}$ contiguous subcarriers in the frequency domain. Accordingly, one RB is configured with $N_{symb}^{UL} \times N_{SC}^{RB}$ REs. In general, a minimum transmission unit of data or control information is an RB unit. A PUCCH is mapped to a frequency domain corresponding to 1 RB and transmitted during 1 subframe.

In an LTE system, the timing relation of a PDSCH, that is, a physical channel for downlink data transmission or a PUCCH or PUSCH, that is, an uplink physical channel in which HARQ ACK/NACK corresponding to a PDCCH/EPDDCH including semi-persistent scheduling release (SPS release) is transmitted, may be defined. For example, in an LTE system operating according to frequency division duplex (FDD), HARQ ACK/NACK corresponding to a PDSCH transmitted in an (n−4)-th subframe or a PDCCH/EPDCCH including SPS release may be transmitted as a PUCCH or PUSCH in an n-th subframe.

In an LTE system, a downlink HARQ adopts an asynchronous HARQ method having data retransmission timing not fixed. That is, when feedback for HARQ NACK is received from a UE with respect to initial transmission data transmitted by a BS, the BS freely determines the transmission timing of retransmission data according to a scheduling operation. The UE may buffer data determined to be an error as a result of the decoding of data received for an HARQ operation, and may perform combining with next retransmission data.

When a UE receives a PDSCH, including downlink data transmitted by a BE, in a subframe n, the UE transmits uplink control information, including the HARQ ACK or NACK of the downlink data, to the BS through a PUCCH or PUSCH in a subframe n+k. In this case, the k may be differently defined depending on the FDD or time division duplex (TDD) of an LTE system and a subframe configuration thereof. For example, in the case of an FDD LTE system, the k is fixed to 4. In the case of a TDD LTE system, the k may be changed depending on a subframe configuration and subframe number. Furthermore, when data transmission is performed through a plurality of carriers, the value of k may be differently applied based on a TDD configuration of each carrier.

In an LTE system, unlike a downlink HARQ, an uplink HARQ adopts a synchronous HARQ method having data transmission timing fixed. That is, an uplink/downlink timing relation between a physical uplink shared channel (PUSCH), that is, a physical channel for uplink data transmission, a PDCCH, that is, a downlink control channel preceding the PUSCH, and a physical hybrid indicator channel (PHICH), that is, a physical channel in which downlink HARQ ACK/NACK corresponding to the PUSCH is transmitted, may be transmitted and received by the following rule.

When a UE receives a PDCCH, including uplink scheduling control information transmitted by a BS or a PHICH in which downlink HARQ ACK/NACK is transmitted in a subframe n from a BS, the UE transmits uplink data, corresponding to the control information, through a PUSCH in a subframe n+k. In this case, the k may be differently defined depending on the FDD or time division duplex (TDD) of an LTE system and a configuration thereof. For example, in the case of an FDD LTE system, the k may be fixed to 4. In the case of a TDD LTE system, the k may be changed depending on a subframe configuration and a subframe number. Furthermore, when data transmission is performed through a plurality of carriers, the value of k may be differently applied depending on a TDD configuration of each carrier.

Furthermore, when the UE receives a PHICH, including information related to downlink HARQ ACK/NACK, from a BS in a subframe i, the PHICH corresponds to a PUSCH transmitted by the UE in a subframe i−k. In this case, the k may be differently defined depending on the FDD or TDD of an LTE system and a configuration thereof. For example, in the case of an FDD LTE system, the k is fixed to 4. In the case of a TDD LTE system, the k may be changed depending on a subframe configuration and a subframe number. Furthermore, when data transmission is performed through a plurality of carriers, the value of k may be differently applied depending on a TDD configuration of each carrier.

The wireless communication system has been described on the basis of an LTE system, and the contents of the disclosure are not limited to the LTE system and may be applied to various wireless communication systems, such as NR and 5G. Furthermore, in one embodiment, if the contents are applied to other wireless communication systems, the k value may be changed and applied in systems using FDD and a corresponding modulation scheme.

Figure 1C:
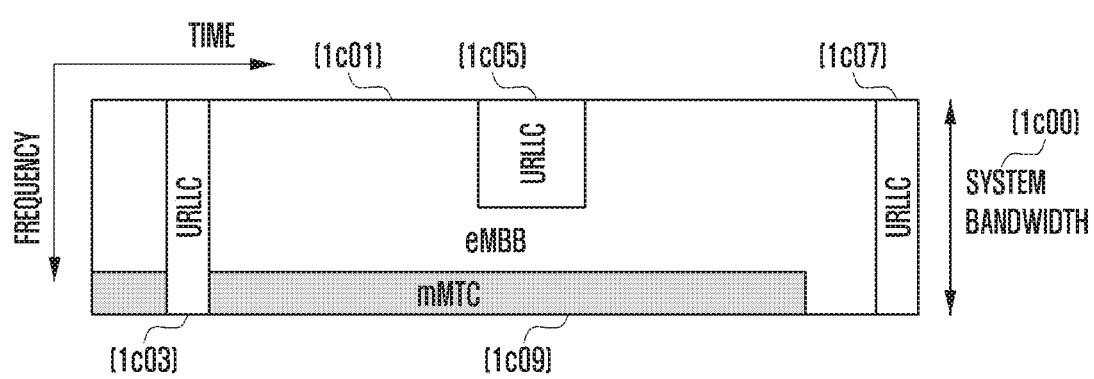
FIG. 1C is a diagram showing the state in which data for an eMBB, URLLC and mMTC has been assigned in frequency-time resources in a communication system.
Figure 1D:
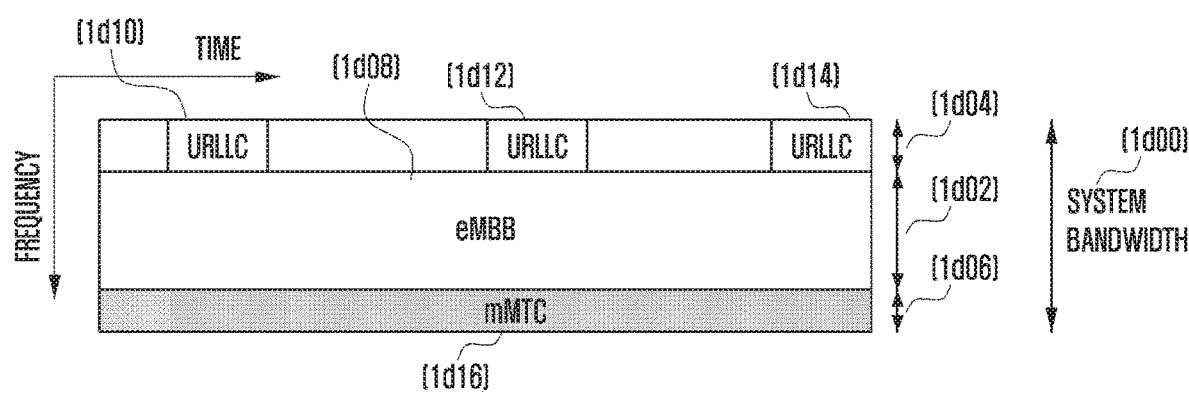
FIG. 1D is a diagram showing the state in which data for an eMBB, URLLC and mMTC has been assigned in frequency-time resources in a communication system.

FIGS. 1C and 1D show the state in which data for an eMBB, URLLC and mMTC, that is, services taken into consideration in a 5G or NR system, are assigned in frequency-time resources.

From FIGS. 1C and 1D, a method of assigning frequency and time resources for information transmission in each system may be seen.

First, FIG. 1C shows the state of data for an eMBB, URLLC, and mMTC in the entire system frequency band 1c00. If URLLC data 1c03, 1c05, and 1c07 are generated and need to be transmitted while an eMBB 1c01 and mMTC 1c09 are assigned and transmitted in a given frequency band, the portions to which the eMBB 1c01 and the mMTC 1c09 have already been assigned may be empty or may not be transmitted and the URLLC data 1c03, 1c05 and 1c07 may be transmitted. The URLLC data may be assigned (1c03, 1c05 and 1c07) to part of the resource 1c01 to which the eMBB has been assigned and transmitted because it is necessary to reduce a delay time taken for the URLLC during the service. If the URLLC is additionally assigned and transmitted in the URLLS in the resource to which the eMBB has been assigned, eMBB data may not be transmitted in a redundant frequency-time resource. Accordingly, the transmission performance of the eMBB data may be reduced. That is, in this case, an eMBB data transmission failure may occur due to the URLLC assignment.

In FIG. 1D, the entire system frequency band 1d00 may be divided and used to transmit services and data in sub-bands 1d02, 1d04 and 1d06. Information related to the subband configuration may be pre-determined and may be transmitted from a BS to a UE through higher signaling. Alternatively, the information related to the subbands may be randomly divided by a BS or a network node, and services may be divided to a UE without transmitting separate subband configuration information. FIG. 1D shows the state in which the subband 1d02 is used for eMBB data transmission, the subband 1d04 is used for URLLC data transmission, and the subband 1d06 is used for mMTC data transmission.

In overall embodiments, the length of a transmission time interval (TTI) used for URLLC transmission may be shorter than the length of a TTI used for eMBB or mMTC transmission. Furthermore, a response of information related to URLLC may be transmitted faster than that of eMBB or mMTC. Accordingly, information can be transmitted and received with low delay.

An eMBB service described hereinafter is called a first type service, and data for an eMBB is called first type data. The first type service or the first type data is not limited to eMBB and may correspond to a case where high-speed data transmission is necessary or broadband transmission is necessary. Furthermore, an URLLC service is called a second type service, and data for URLLC is called second type data. The second type service or the second type data is not limited to URLLC and may correspond to other systems that require a low latency time or high reliability transmission or that require a low latency time and high reliability at the same time. Furthermore, an mMTC service is called a third type service, and data for mMTC is called third type data. The third type service or the third type data is not limited to mMTC, and may correspond to a case where low speed or wide coverage or low power is required. Furthermore, when embodiments are described, the first type service may be understood as including or not including the third type service.

The structure of a physical layer channel used for each type in order to transmit the three types of services or data may be different. For example, at least one of the length of a transmission time interval (TTI), a assignment unit of a frequency resource, the structure of a control channel, and a mapping method of data may be different.

The three types of services and the three types of data have been illustrated above, but more types of services and corresponding data may be present. Even in this case, the contents of the disclosure may be applied.

In order to describe a method and apparatus proposed in one embodiment, terms "physical channel" and "signal" in a conventional LTE or LTE-A system may be used. However, the contents of the disclosure may be applied to wireless communication systems other than LTE and LTE-A systems.

An embodiment, as described above, proposes a detailed method for defining transmission and reception operations of a UE and BS for first type, second type, third type service or data transmission and operating UEs in which different types of services or data are scheduled within the same system. In the disclosure, the first type, second type and third type UE refer to UEs in which the first type, second type and third type service or data have been scheduled. In one embodiment, a first type UE, second type UE and third type UE may be the same UE or different UEs.

In the following embodiments, at least one of an uplink scheduling grant signal and a downlink data signal is called a first signal. Furthermore, in the disclosure, at least one of an uplink data signal for an uplink scheduling grant and HARQ ACK/NACK for a downlink data signal is called a second signal. In one embodiment, from among signals from a BS to a UE, a signal that waits for a response from the UE may be a first signal, and a response signal from the UE corresponding to the first signal may be a second signal. Furthermore, in one embodiment, the service type of a first signal may be at least one of an eMBB, URLLC and mMTC, and the service type of a second signal may also correspond to the at least one.

In the following embodiments, the TTI length of a first signal is a time value related to the transmission of the first signal, and may indicate the length of the time when the first signal is transmitted. Furthermore, in the disclosure, the TTI length of a second signal is a time value related to the transmission of the second signal, and may indicate the length of time when the second signal is transmitted. The TTI length of a third signal is a time value related to the transmission of the third signal, and may indicate the length of time when the third signal is transmitted. Furthermore, in the disclosure, second signal transmission timing is information on when a UE transmits the second signal and when a BS receives the second signal, and may be called second signal transmission and reception timing.

The contents of the disclosure may be applied to FDD and TDD systems.

Hereinafter, in the disclosure, higher signaling is a method for a BS to transmit a signal to a UE using a downlink data channel of a physical layer or a method for a UE to transmit a signal to a BS using an uplink data channel of a physical layer. Higher signaling may also be called RRC signaling, PDCP signaling or a MAC control element (MAC CE).

The contents of the disclosure may be applied to FDD and TDD systems.

Figure 1E:
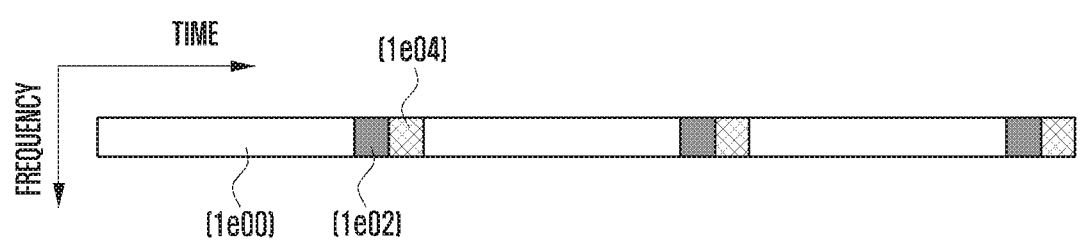
FIG. 1E is a diagram showing a self-contained structure in which uplink and downlink are present in one subframe in a communication system.

FIG. 1E is a diagram showing a self-contained structure in which uplink and downlink are present in one subframe in a communication system.

In FIG. 1E, uplink 1e04, downlink 1e00, and a guard period 1e02 necessary for switching between them are configured in one subframe. The guard period 1e02 is configured as time necessary for processing for switching from the downlink to the uplink between a BS and a UE and time necessary for transmission time alignment between a BS and a UE. Accordingly, the guard period 1e02 may have a different time value depending on performance of the UE and the BS and the distance between the UE and the BS. Furthermore, the uplink 1e04 and the downlink 1e00 may have their roles changed, and the time length may be represented differently from that shown in the drawing. In the disclosure, a condition including the downlink 1e00, the guard period 1e02 and the uplink 1e04 is taken into consideration.

Figure 1F:
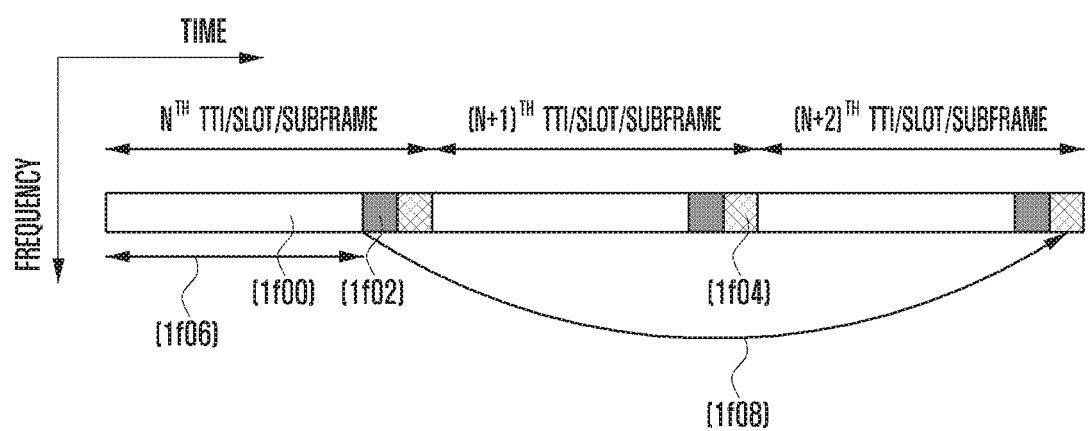
FIG. 1F is a diagram showing the state in which the results of initial transmission are fed back in a self-contained structure on time division duplexing (TDD).

FIG. 1F is a diagram showing the state in which the results of initial transmission are fed back in a self-contained structure on time division duplexing (TDD).

FIG. 1F shows a situation 1f08 in which a UE reports decoding results for corresponding initial downlink transmission 1f06 using an (n+2)-th uplink resource 1f04 in the situation in which the initial transmission occurs as downlink 1f00 in an n-th subframe or slot or a transmission time interval (TTI)). That is, the UE may determine the decoding results for the downlink initial transmission after the downlink of the n-th subframe or slot or TTI is terminated. Furthermore, feedback for the corresponding n-th downlink initial transmission results may be n+1, n+3, n+4 not the n+2. The corresponding figure has been drawn on the assumption of n+2. Values to be described hereinafter are only examples described in the disclosure and may be applied as different values. The decoding results are reported as two types of a success or failure for initial transmission.

Figure 1G:
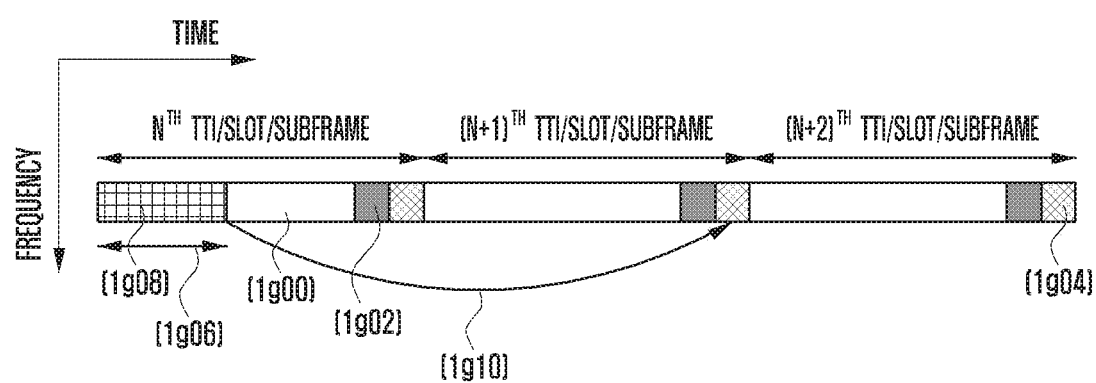
FIG. 1G is a diagram showing the state in which fast feedback for the results of some of initial transmission is performed on a self-contained structure of TDD.

FIG. 1G is a diagram showing the state in which fast feedback for the results of some of initial transmission is performed on a self-contained structure of TDD.

FIG. 1G shows a situation 1g10 in which in order to provide notification of faster feedback transmission results than that in an n-th subframe or slot or transmission interval, a UE reports the results of some (1g08) of n-th downlink initial transmission through an uplink resource in an (n+1)-th subframe or slot. A case where the corresponding situation is possible is described as follows. Then n-th downlink initial transmission is configured as one transport block 1g00, and the one transport block is configured with several code block units. The UE determines that the decoding of corresponding transport blocks has been successful only when the decoding of all the corresponding code blocks is successful, and reports it to a BS. When at least one of the corresponding code blocks fails in the decoding, the UE determines that the decoding of a corresponding transport block has failed, and reports the results of the decoding to the BS. Accordingly, if the UE fails in the decoding of an initial code block for the n-th downlink initial transmission data 1g00 in the situation in which the UE ca sequentially a decode code block configuring a corresponding transport block during an n-th downlink transmission interval not after an n-th downlink transmission interval, the UE may report a decoding failure result of the corresponding transport block to the BS regardless of the decoding results of a subsequent code block. Accordingly, in FIG. 1F, if a feedback result report for the n-th downlink initial transmission has been performed through an (n+2)-th uplink resource, when a failure of the n-th downlink initial transmission occurs in FIG. 1G, a corresponding feedback result report may be performed earlier through an (n+1)-th uplink resource. That is, the corresponding results may be notified prior to 1 or 2 subframes or slots or transmission intervals compared to the situation of FIG. 1F. In this case, in order to provide notification (1g10) of the n-th downlink decoding results through the (n+1)-th uplink resource, some code block set 1g08 that configures some interval (1g06) of the n-th downlink initial transmission and the transport block 1g00 in the initial transmission needs to be previously configured. Accordingly, the some interval 1g06 of the initial transmission needs to be previously configured by taking into consideration several values, such as performance of a UE and a BS and the distance between a UE and a BS. Furthermore, it is to be noted that a corresponding operation is easy only when several code blocks configuring one transport block are configured by frequency first mapping not time first mapping. The uplink fast report 1g10 in the (n+1) place for the results of the part 1g06 of the n-th downlink initial transmission occurs when the decoding of the part 1g06 of the corresponding initial transmission fails. If the decoding of the part 1g06 of the corresponding initial transmission is successful, the uplink fast report 1g10 in the (n+1) place does not occurs. The reason for this is that the decoding of the remaining portions may fail although the decoding of the part 1g06 of the initial transmission is successful. Accordingly, to report the decoding success results of the part 1g06 of the initial transmission is meaningless. Accordingly, in this case, the UE provides notification of the decoding results through (n+2)-th uplink after the n-th downlink initial transmission is fully terminated as in FIG. 1F. In the disclosure, the n-th faster feedback report may be notified through an n-th uplink resource not the (n+1) uplink resource. Furthermore, it is assumed that part of the n-th downlink initial transmission determined for the faster feedback report is first type data and the remaining data is second type data. That is, it is assumed that some set of code blocks configuring one transport block used for initial transmission is first type data and the remaining code block set is second type data. Furthermore, one transport block may be divided into three or four types not the two types, and feedback reports may be differently performed. A method of dividing the first type data and the second type data may be determined based on values, such as the decoding processing ability of a UE, the size of a corresponding transport block, and the distance between the UE and a BS. Corresponding information may be dynamically shared between the UE and the BS through control information in advance or may be semi-statically shared between the UE and the BS by obtaining system information. Furthermore, if values, that is, criteria by which the first type data and the second type data are divided, may be values previously shared between a UE and a BS, the BS and the UE may operate on the assumption that they can autonomously determine the values by implicitly calculating the values and are aware of the values. For example, assuming that a UE receives $\alpha$, that is, the size of one transport block (TB), the UE may calculate the size of first type data as $\alpha \times \beta$, may define it as a corresponding value, and may operate. In this case, $\beta$ is a value between 0 and 1 and is taken into consideration as a reference value for reporting decoding results through a corresponding uplink resource by processing the first type data. Furthermore, the UE may calculate second type data as $\alpha \times (1-\beta)$, may define it as a corresponding value, and may operate. In the situation in which various transport block sizes are present, a UE and a BS may previously select one of various $\beta$ values based on the decoding processing ability of the UE and the UE may be notified of the selected value or the UE may autonomously select one of various $\beta$ values and report it to the BS. Alternatively, in addition to the method, an operation of determining the size of first type data to be an absolute value and of sharing it between a BS and a UE in advance is possible.

In accordance with the method, a feedback report for first type data on n-th downlink provides notification of only a decoding failure of the corresponding data on (n+1)-th uplink, and a feedback report for first type data and second type data on n-th downlink provides notification of a decoding success and failure of the corresponding data on (n+2)-th uplink. Accordingly, when a BS receives a decoding failure in the (n+1)-th uplink resource, it can transmit a transport block, used for initial transmission, again more rapidly compared to the case where the BS receives the decoding failure in the (n+2)-th uplink resource. For example, when a UE reports feedback as a failure in the (n+1)-th, a BS may perform retransmission on a corresponding transport block in an (n+3)-th. When a UE reports feedback as a failure in the (n+2)-th, a BS may perform retransmission on a corresponding transport block in an (n+4)-th.

A feedback report for the first type data on the n-th downlink provides notification of a decoding success and failure of the corresponding data on the (n+1)-th uplink using a method different from the method. A feedback report for the second type data on the n-th downlink provides notification of a decoding success and failure of the corresponding data on the (n+2)-th uplink using a method different from the method. If such a method is used, when a UE reports the feedback as a failure in the (n+1)-th, a BS may perform retransmission on the first type data in the (n+3)-th. When a UE reports the feedback as a failure in the (n+2)-th, a BS may perform retransmission on the second type data in the (n+4)-th. That is, in the above-described situation, a method for a UE to divide one transport block into first type data and second type data and to transmit each feedback result report to a BS in a different subframe or slot or TTI through uplink and for the BS to perform each retransmission based on a corresponding feedback result is taken into consideration.

The method may be performed as a retransmission operation for retransmission in addition to a retransmission operation for initial transmission.

Figure 1H:
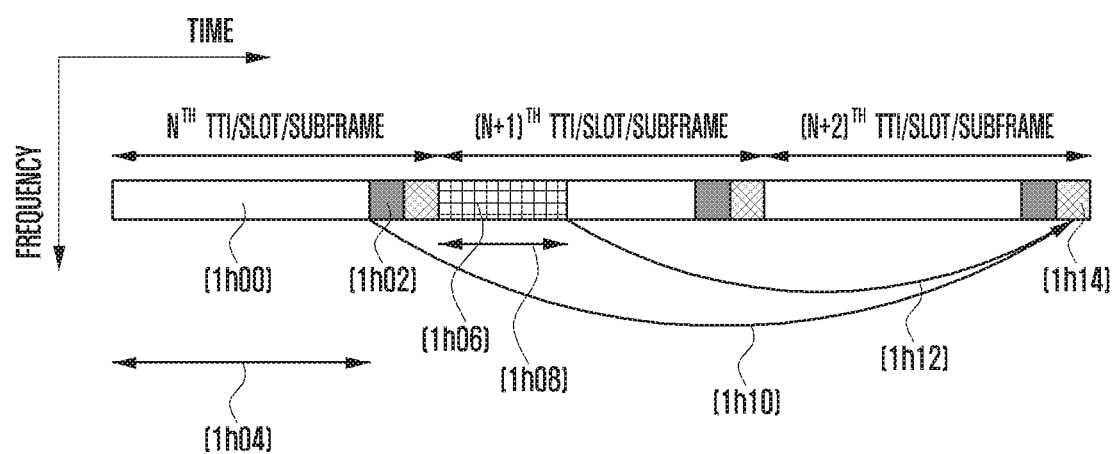
FIG. 1H is a diagram showing the state in which feedback for the results of initial transmission and fast feedback for the results of some of the initial transmission use the same resource on a self-contained structure of TDD.

FIG. 1H is a diagram showing the state in which feedback for the results of initial transmission and fast feedback for the results of part of the initial transmission use the same resource on a self-contained structure of TDD.

FIG. 1H shows a situation 1h10 in which feedback results for downlink (1h00) initial transmission 1h04 in an n-th subframe or slot or TTI are reported as uplink 1h14 in an (n+2)-th subframe or slot or TTI. Furthermore, this figure shows a situation 1h12 in which fast feedback results for part 1h08 of downlink (1h06) initial transmission in an (n+1)-th subframe or slot or TTI are reported as the uplink 1h14 in the (n+2)-th subframe or slot or TTI. A feedback report for each transmission in the n-th and the (n+1)-th may be supported as the (n+2)-th uplink 1h14 using various methods. First, if UEs are the same or different, the feedback of n-th transmission and the feedback of (n+1)-th transmission may be notified using different feedback times and frequency resources. Furthermore, if UEs are the same, the feedback of n-th transmission and the feedback of (n+1)-th transmission may be grouped and notified using the same feedback time and frequency resource. That is, if the feedback of n-th transmission and the feedback of (n+1)-th transmission are successful, feedback indicative of a success is notified in the (n+2)-th uplink transmission. When at least one of the feedbacks of the n-th transmission and the (n+1)-th transmission fails, feedback indicative of a failure is notified in the (n+2)-th uplink transmission. A UE may be directly notified of corresponding-related information through control information prior to initial transmission. Alternatively, a UE may implicitly perform a corresponding operation through a corresponding resource relation. That is, if two or more transmission reports overlap in the uplink of the (n+2)-th, a UE may make each report or make all the reports at once using the same resource depending on the condition. Alternatively, in the situation in which the report of the first type data of the (n+1)-th provides notification of only failure information, an n-th downlink transmission report is transmitted using a resource in which the first type data is used. For example, if a first time-frequency resource 1m02 in FIG. 1M is used when the report of the first type data fails and a second time-frequency resource 1m04 in FIG. 1M is used when the report of the first type data does not fail, a BS may detect a feedback result report for the first type data through energy detection in the corresponding two resource regions. Furthermore, the feedback result report for the n-th downlink initial transmission is performed through the first time-frequency resource 1m02 when the feedback results of the (n+1)-th first type downlink data fails. Alternatively, when the feedback results of the (n+1)-th first type downlink data is successful, they are reported through the second time-frequency resource 1m04. The corresponding first time-frequency resource and second time-frequency resource may be differently configured based on different times or frequency locations.

Figure 1I:
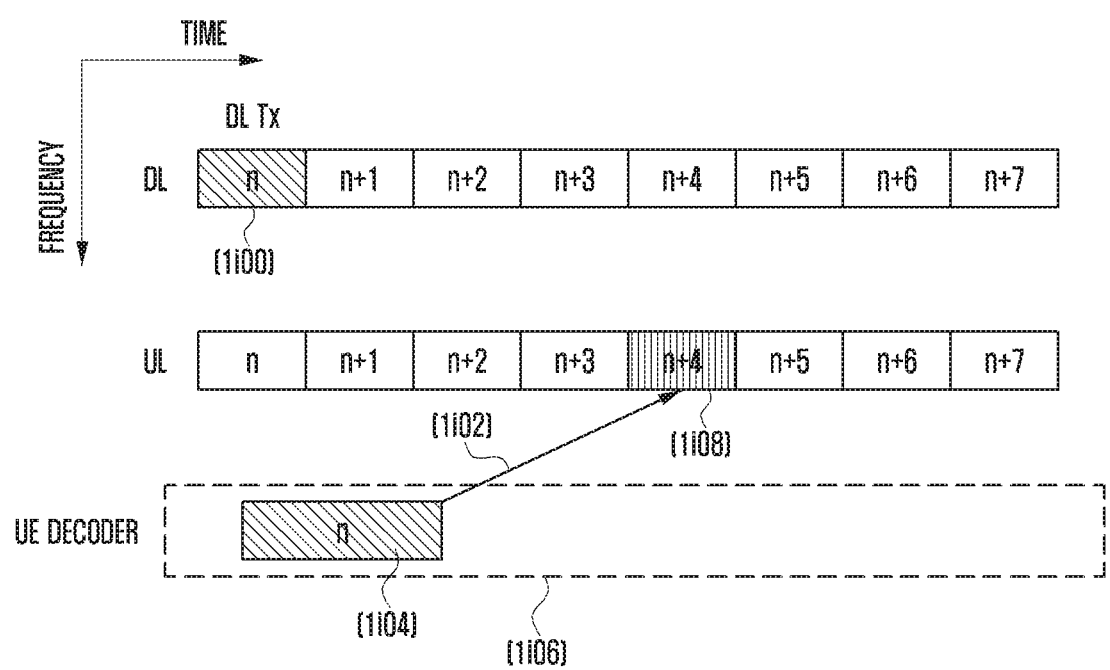
FIG. 1I is a diagram showing the state in which the results of initial transmission are fed back in frequency division duplexing (FDD).

FIG. 1I is a diagram showing the state in which the results of initial transmission are fed back in frequency division duplexing (FDD).

FIG. 1I shows a situation 1i02 in which the decoding results of a corresponding transport block is fed back as (n+4)-th uplink 1i08 with respect to the transport block 1i04 transmitted on n-th downlink 1i00. When a UE receives the transport block on the n-th downlink, it decodes code blocks configuring the transport block transmitted on the corresponding n-th downlink through its own decoder 1i06. In order to report corresponding decoding results through uplink a different value other than n+4 may be applied. This is determined based on performance of a BS and a UE and the distance between the BS and the UE.

Figure 1J:
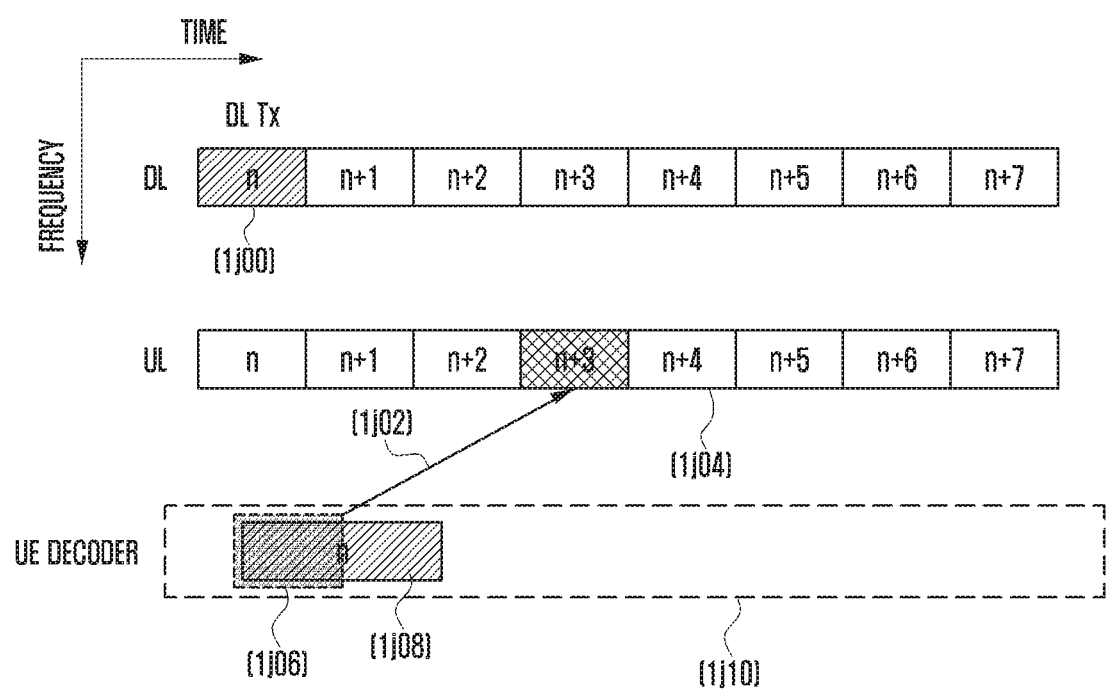
FIG. 1J is a diagram showing the state in which fast feedback for the results of some of initial transmission is performed in FDD.

FIG. 1J is a diagram showing the state in which fast feedback for the results of part of initial transmission is performed in FDD.

FIG. 1J shows a situation 1j04 in which a UE reports the decoding results of only first type data 1j06, that is, some of code blocks configuring a transport block 1j08, in (n+3)-th uplink 1j04 with respect to the transport block transmitted in n-th downlink 1j00. In this case, the corresponding report may report only a decoding failure of the part 1j04 of the transport block or may report both a success and a failure. An n+2, n+11 value faster than n+3 may be used as a feedback transmission report based on performance of a UE and a BS, the distance between the UE and the BS, and the size of part 1j04 of the transport block. This is determined based on the decoding processing ability of a UE, the size of configured first type data, and the distance between the UE and the BS. Furthermore, if values, that is, criteria by which first type data and second type data, that is, the remaining data other than the first type data in a transport block, are divided, are values previously shared between a UE and a BS, the BS and the UE may operate on the assumption that they can autonomously determine the corresponding values by implicitly calculating the values and are aware of the values. For example, assuming that a UE receives $\alpha$, that is, the size of one transport block (TB), the UE may calculate the size of first type data as α×β, may define it as a corresponding value, and may operate. In this case, β is a value between 0 and 1 and is taken into consideration as a reference value for reporting decoding results through a corresponding uplink resource by processing the first type data. Furthermore, the UE may calculate second type data as α×(1−β), may define it as a corresponding value, and may operate. In the situation in which various transport block sizes are present, a UE and a BS may previously select one of various β values based on the decoding processing ability of the UE and the UE may be notified of the selected value or the UE may autonomously select one of various β values and report it to the BS. Alternatively, in addition to the method, an operation of determining the size of first type data to be an absolute value and of sharing it between a BS and a UE in advance is possible. The sharing of information between the UE and the BS may be performed using a dynamic method through control information and a semi-static method through system control information broadcasting.

Figure 1K:
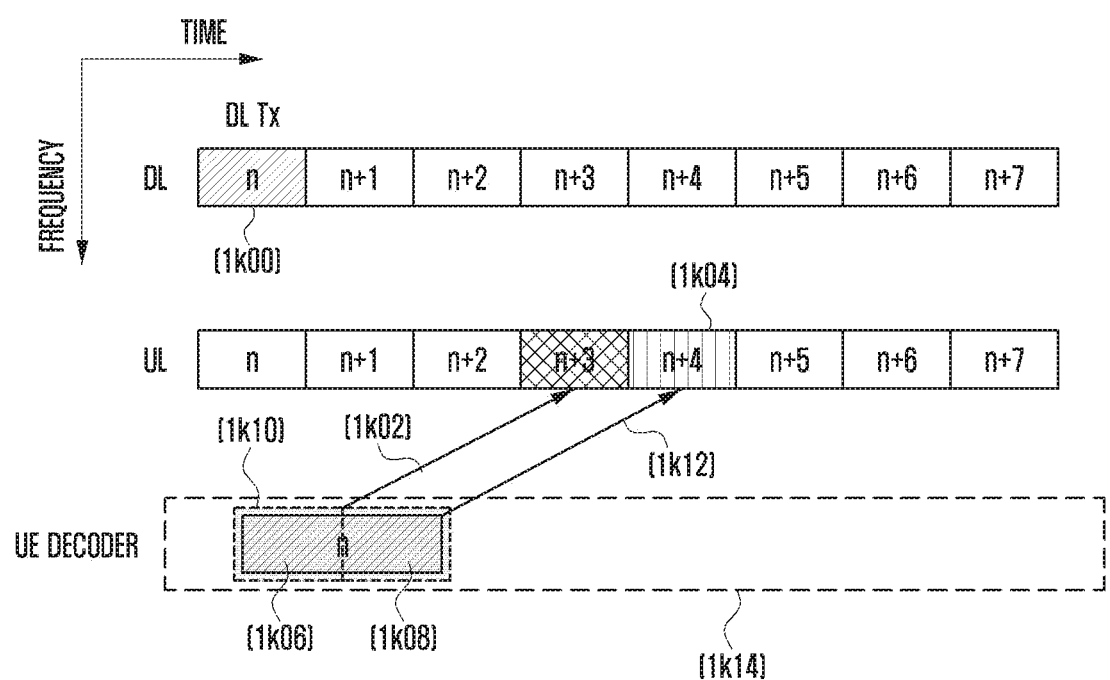
FIG. 1K is a diagram showing the state in which feedbacks for the results of some of initial transmissions are differently performed in FDD.

FIG. 1K is a diagram showing the state in which feedbacks for the results of part of initial transmissions are differently performed in FDD.

FIG. 1K shows the situation in which the decoding results of a transport block 1k10 transmitted in an n-th downlink 1k00 is reported (1k02, 1k12) through (n+3)-th uplink and (n+4)-th uplink 1k04, respectively. In this case, part of the n-th downlink transport block 1k10 for reporting feedback through the (n+3)-th uplink is called first type data 1k06, and the remaining portion for reporting feedback through the (n+4)-th uplink is called second type data 1k08. In the above-described situation, the data decoding results reported in the (n+3)-th uplink and the (n+4)-th uplink are divided into a success or failure and reported. A BS performs first type data retransmission or second type data retransmission in a different subframe or slot or TTI through a feedback result report received through each uplink resource. The size of the first type and the second type data is determined based on performance of a UE and a BS and the distance between the UE and the BS. Furthermore, the UE and the BS may be explicitly aware of information on the size of the corresponding first type and second type data through signaling exchange in advance or may be implicitly aware of the information through a different reference value. The reference value may be determined based on a timing advance value or a UE performance value. Accordingly, a BS determines that a UE has set which values with respect to the first type data and the second type data and has reported the feedback for the (n+3)-th or the (n+4)-th uplink based on the value, and determines data used for retransmission based on the determination.

Figure 1L:
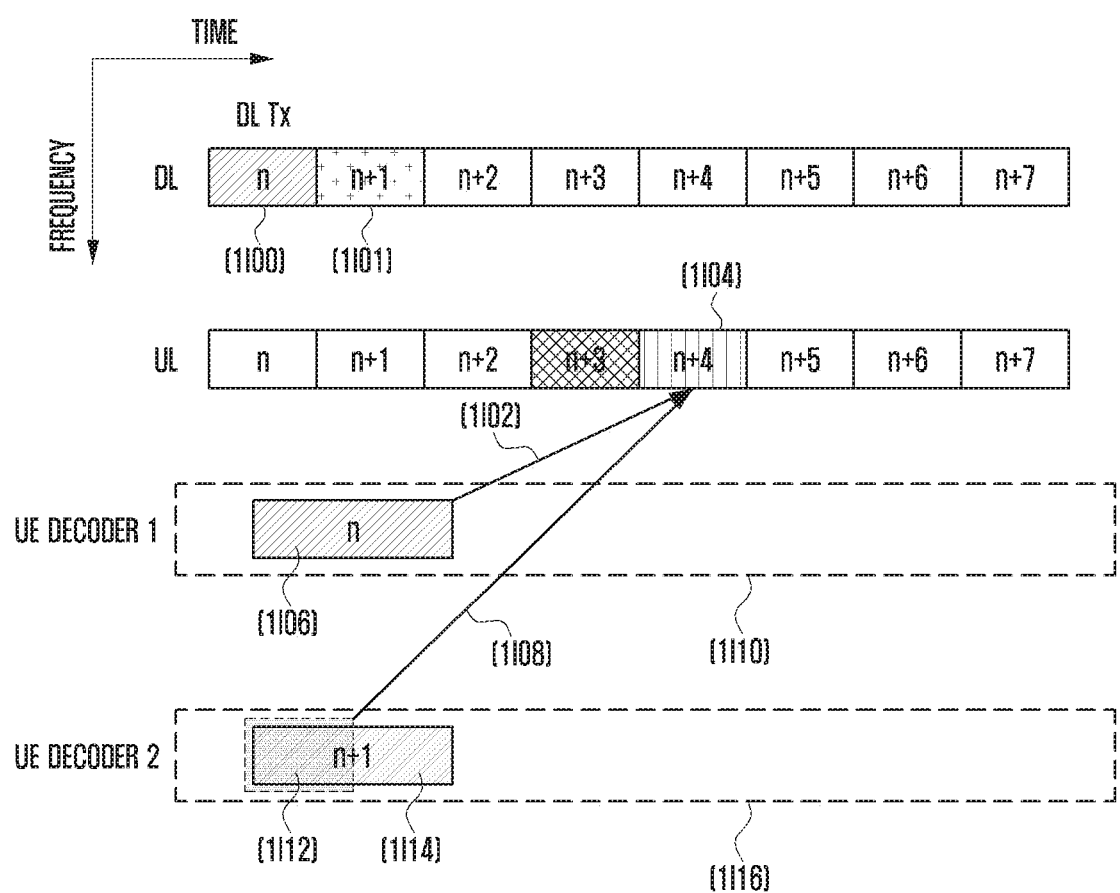
FIG. 1L is a diagram showing the state in which feedback for the results of initial transmission and fast feedback for the results of some of initial transmission use the same resource in FDD.
Figure 1M:
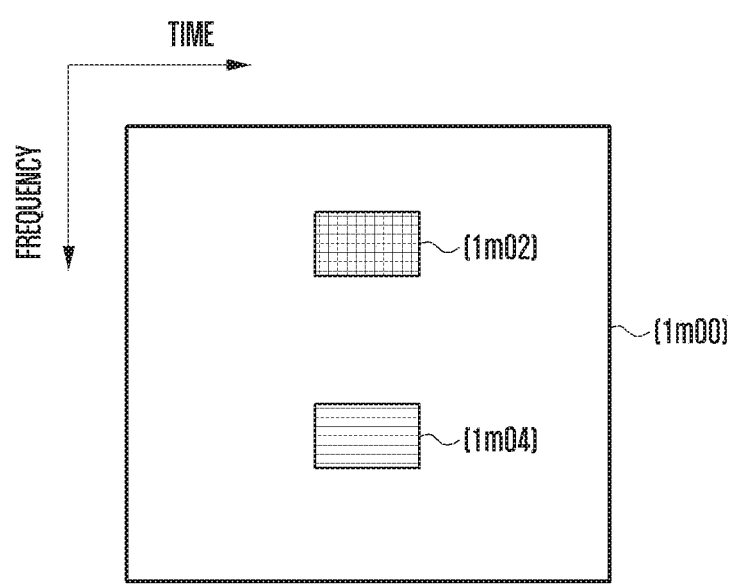
FIG. 1M is a diagram showing the state of time-frequency resources for reporting fast feedback and feedback together.

FIG. 1L is a diagram showing the state in which feedback for the results of initial transmission and fast feedback for the results of part of initial transmission use the same resource in FDD.

FIG. 1L shows the situation in which a feedback result report 1/02 for an n-th downlink (1/00) transport block and a feedback result report 1/08 for part of the (n+1)-th downlink (1/01) transport block occur in (n+4)-th uplink 1/04. Feedback reports for respective downlink transmissions in the n-th and the (n+1)-th may be supported through the (n+4)-th uplink 1/14 using various methods. First, if UEs are the same or different, the feedback of the n-th downlink transmission and the feedback of the (n+1)-th downlink transmission may be differently notified using different feedback times and frequency resources. Furthermore, if UEs are the same, the feedback of the n-th downlink transmission and the feedback of the (n+1)-th downlink transmission may be grouped and notified using the same feedback time and frequency resource. That is, when both the feedback of the n-th downlink transmission and the feedback of the (n+1)-th downlink transmission are successful, feedback indicative of a success may be notified in the (n+4)-th uplink transmission. When a failure occurs in at least one of the n-th downlink transmission and the (n+1)-th downlink transmission, feedback indicative of a failure is notified in the (n+4)-th uplink transmission. A UE may be directly notified of corresponding-related information through control information prior to initial transmission or a UE may implicitly perform a corresponding operation through a corresponding resource relation. That is, when two or more transmission reports overlap in the uplink of the (n+4)-th, they may be differently made or may be made at once using the same resource according to the condition. Alternatively, in the situation in which the report of the first type data of the (n+1)-th provides notification of only failure information, the n-th downlink transmission report is transmitted using a resource in which the first type data is used. For example, if a first time-frequency resource 1m02 is used in FIG. 1M when the report of first type data fails and a second time-frequency resource 1m04 is used in FIG. 1M when the report of the first type data does not fail, a BS may detect a feedback result report for the first type data through energy detection in corresponding two resource regions. Furthermore, a feedback result of the n-th downlink initial transmission is reported through the first time-frequency resource 1m02 when a feedback result of the (n+1)-th first type downlink data fails. Alternatively, when a feedback result of the (n+1)-th first type downlink data is successful, it is reported through the second time-frequency resource 1m04. The corresponding first time-frequency resource and second time-frequency resource may be differently configured based on different time or frequency locations within the (n+1)-th uplink subframe or slot or TTI.

FIG. 1M is a diagram showing the state of time-frequency resources for reporting fast feedback and feedback together.

FIG. 1M shows methods of reporting the feedback of two initial transmissions as described above. In the situation in which the first feedback method is to report only a failure for corresponding transmission and the second feedback method is to report a success and failure for corresponding transmission, when a UE provides notification of a second feedback result through the first time-frequency resource 1m02, it implicitly provides notification that a first feedback result is a failure. Furthermore, when the UE provides notification of a second feedback result through the second time-frequency resource 1m04, it implicitly provides notification that the second feedback result is a success. Accordingly, a BS can decode the feedback results through a first time-frequency and a second time-frequency, and can determine the first feedback and second feedback results at the same time.

(1-1) Embodiment

Figure 1N:
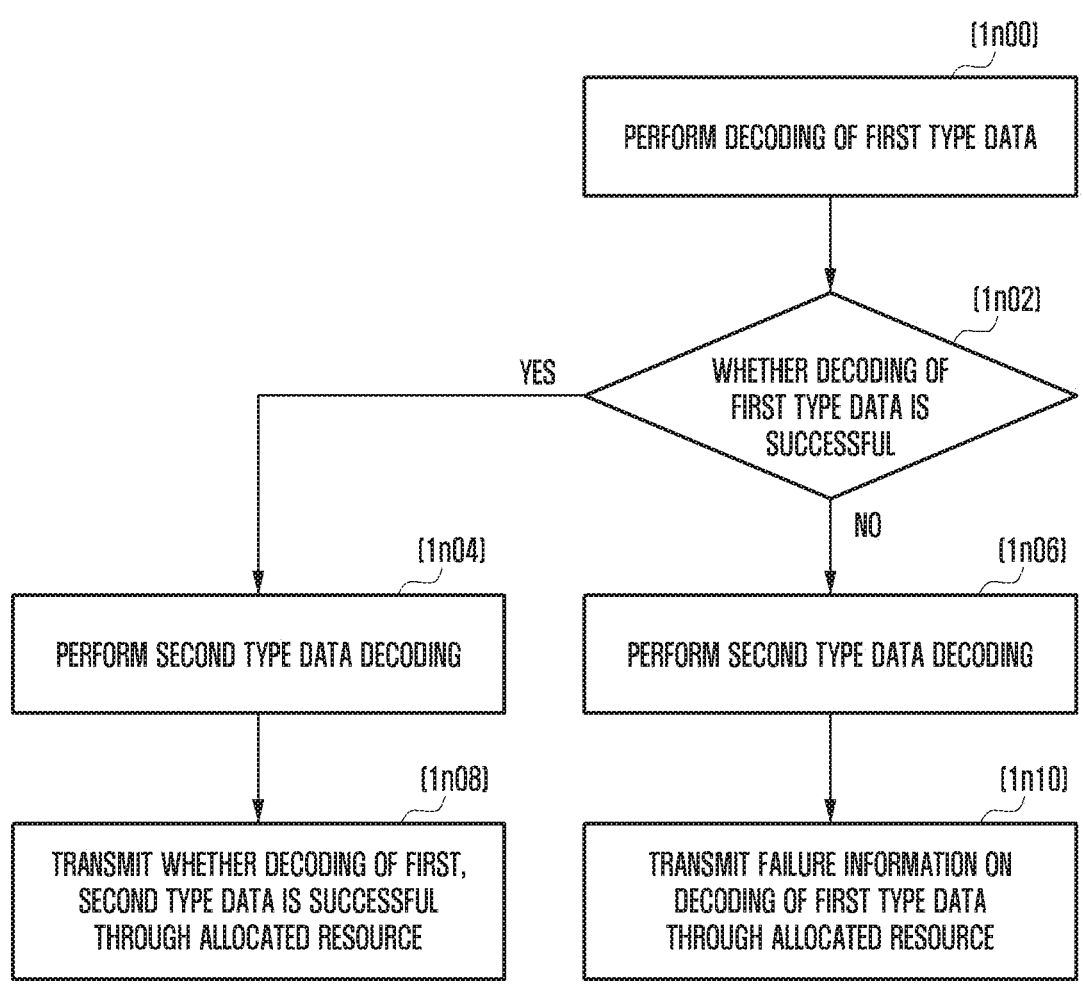
FIG. 1N is a diagram showing a UE operation according to a (2-1) embodiment.
Figure 10:
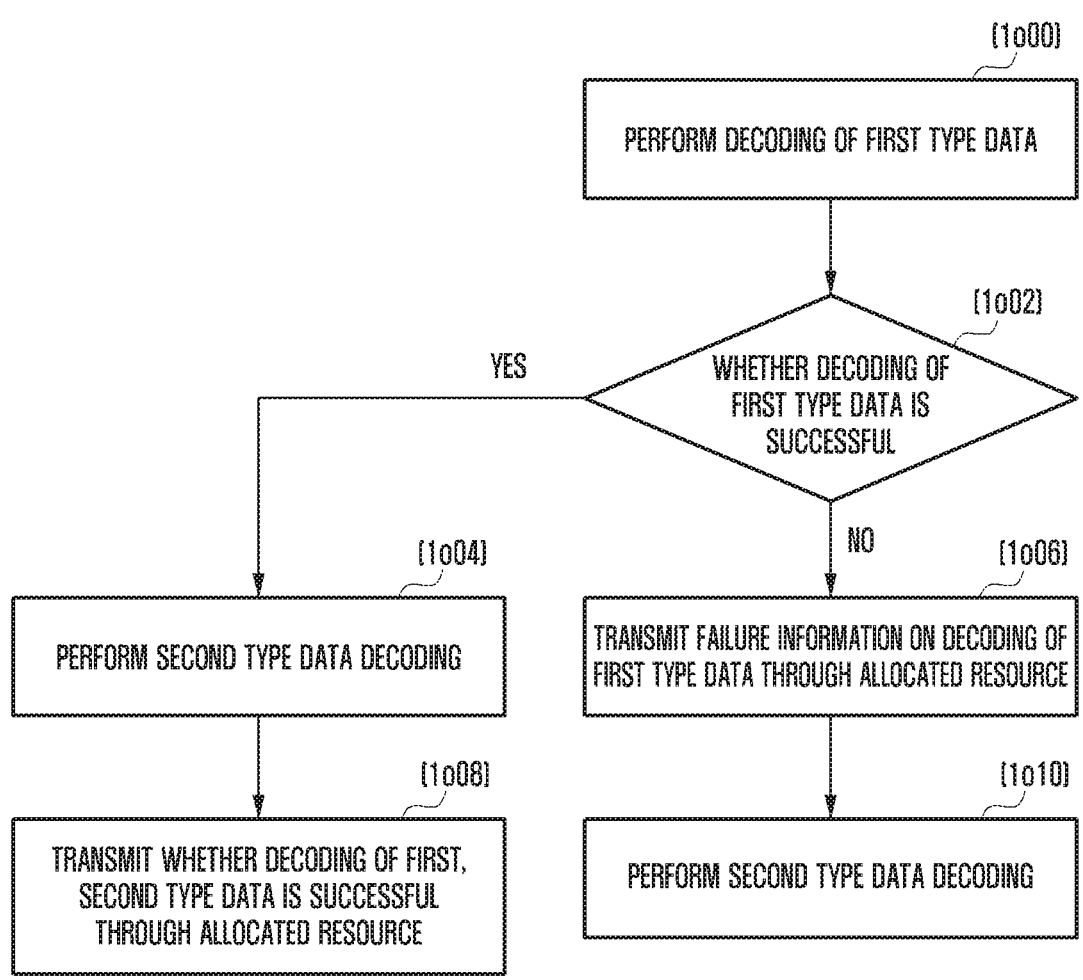

FIG. 1N is a diagram showing a UE operation according to a (2-1) embodiment.

In FIG. 1N, a UE sequentially decodes first type data, and determines whether or not to report a decoding result of second type data based on a corresponding result. That is, when the decoding result of the first type data fails, a feedback report can be immediately performed based on only a result of the first type data because the transmission of a corresponding transport block is finally reported to a BS as a decoding failure. In this case, it is assumed that although the decoding of the first type data fails, the UE reports the failure of a corresponding transport block, but performs the decoding of the second type data. Although the decoding of the corresponding second type data appears in future retransmission again, an operation in which the decoding is taken into consideration is incorporated because a soft combining method is used.

Specifically, the UE first performs the decoding of the first type data (1n00). When the decoding of the first type data (1n02) fails, the UE decodes the second type data (1n06) and transmits decoding failure information on the first type data to a BS through an assigned uplink resource (1n10). When the decoding of the first type data (1n02) is successful, the UE decodes second type data (1n04) and transmits success information on the success of the first, second type data and failure information on the second type data to a BS through an assigned uplink resource based on a decoding result of the second type data (1n08).

(1-2) Embodiment

FIG. 1O is a diagram showing a UE operation according to a (2-2) embodiment.

In FIG. 1O, a UE sequentially decode first type data, and determines whether or not to report a decoding result of second type data based on a corresponding result. That is, when the decoding result of the first type data fails, when the decoding result of the first type data fails, a feedback report can be immediately performed based on only a result of the first type data because the transmission of a corresponding transport block is finally reported to a BS as a decoding failure. In this case, it is assumed that although the decoding of the first type data fails, the UE reports the failure of a corresponding transport block, but does not perform the decoding of the second type data. The UE may not perform the decoding of the second type data together for a feedback report through a corresponding assigned uplink resource for the first type. In such a situation, the UE performs the decoding of the second type data after reporting a decoding result for the first type.

Specifically, the UE first performs the decoding of the first type data (1o00). When the decoding of the first type data (1o02) fails, the UE transmits decoding failure information on the first type to a BS through an assigned uplink resource (1o06). When the decoding of the first type data (1o02) is successful, the UE decodes the second type data (1o04), and transmits success information on the first, second type data or failure information on the second type to a BS through an assigned uplink resource based on a decoding result of the second type data (1o08).

(1-3) Embodiment

Figure 1P:
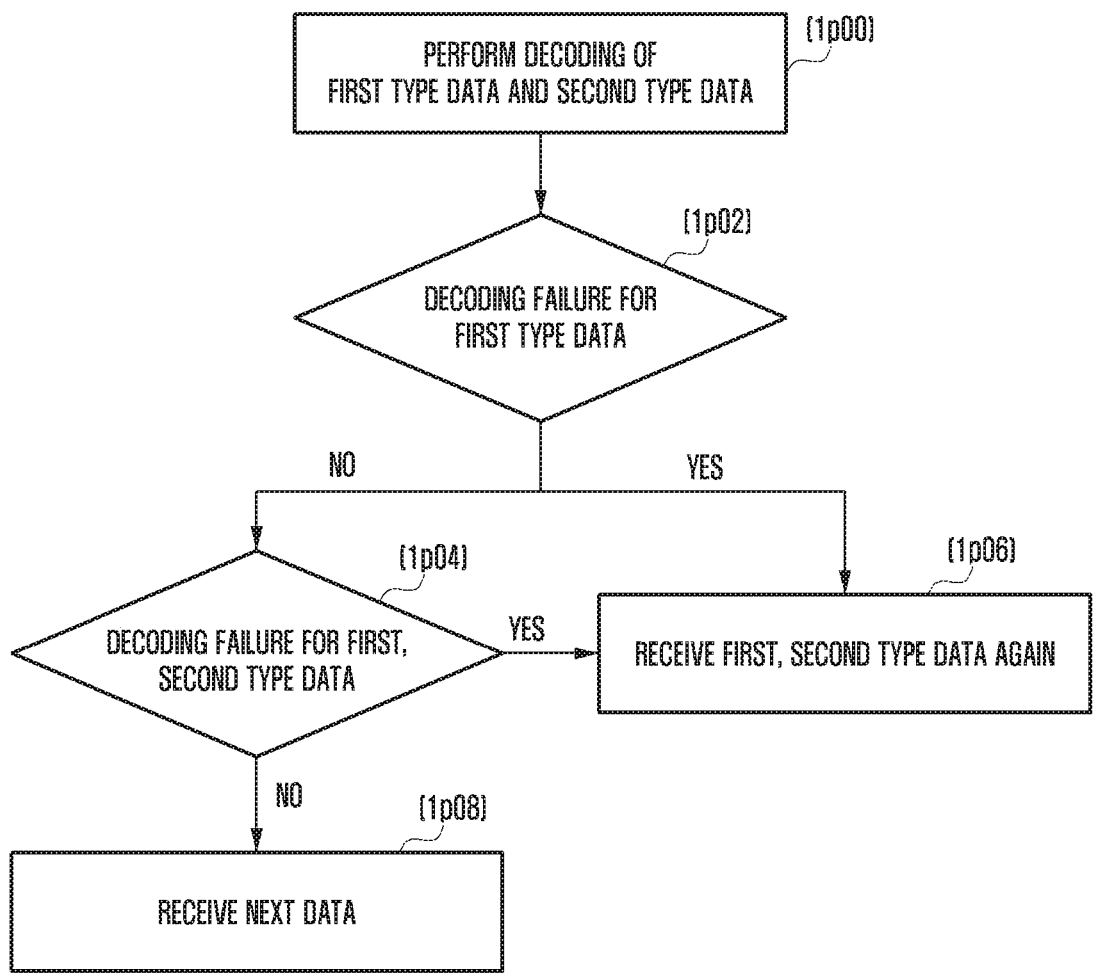
FIG. 1P is a diagram showing a UE operation according to a (2-3) embodiment.

FIG. 1P is a diagram showing a UE operation according to a (2-3) embodiment.

In FIG. 1P, a UE first performs the decoding of first type data. When the decoding of the first type data fails, the UE expects that a transport block including both the first type data and second type data will be retransmitted in downlink transmission in a subsequent operation. When the decoding of the first type data is successful and the decoding of the second type data then fails, the UE expects that a transport block including both the first type data and the second type data will be retransmitted in downlink transmission in a subsequent operation.

In summary, the UE fails in at least decoding (1p02, 1p04) of the first type data or the second type data, and receives data, including both the first type data and the second type data, again in a subsequently configured downlink resource (1p06). When the UE succeeds in both the first type data or the second type data, it receives next new data in a subsequently configured downlink resource (1p08).

(1-4) Embodiment

Figure 1Q:
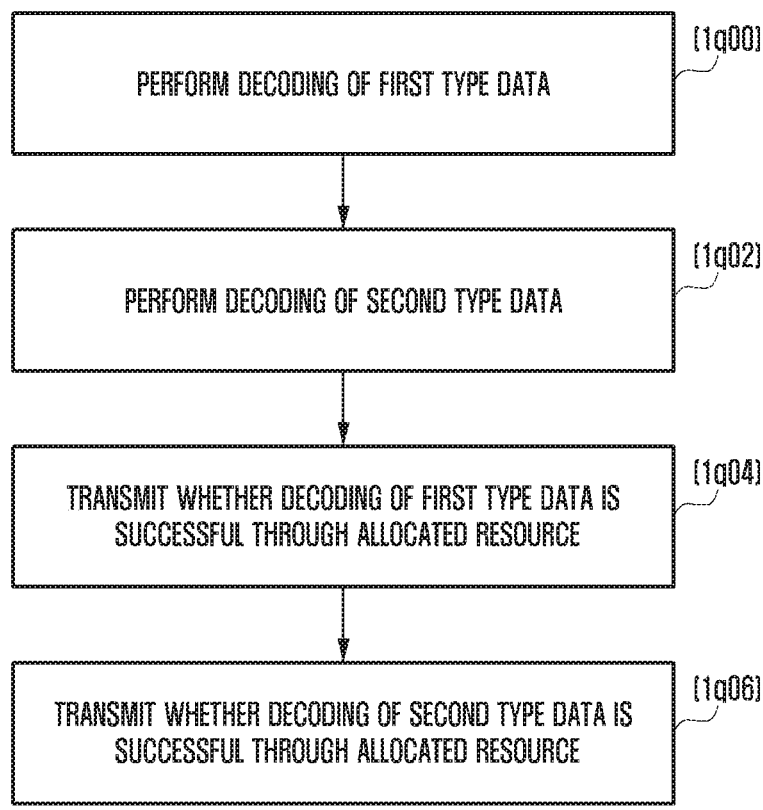
FIG. 1Q is a diagram showing a UE operation according to a (2-4) embodiment.

FIG. 1Q is a diagram showing a UE operation according to a (2-4) embodiment.

FIG. 1Q shows a procedure for a UE to decode each datum and to feed back a result thereof in the situation in which one downlink transport block has been divided into first type data and second type data.

Specifically, a UE sequentially decodes first type data (1q00) and decodes second type data (1q02). The UE feeds a decoding result of the first type back through a corresponding configured uplink resource (1q04), and feeds a decoding result of the second type data back through a corresponding configured uplink resource (1q06).

(1-5) Embodiment

Figure 1R:
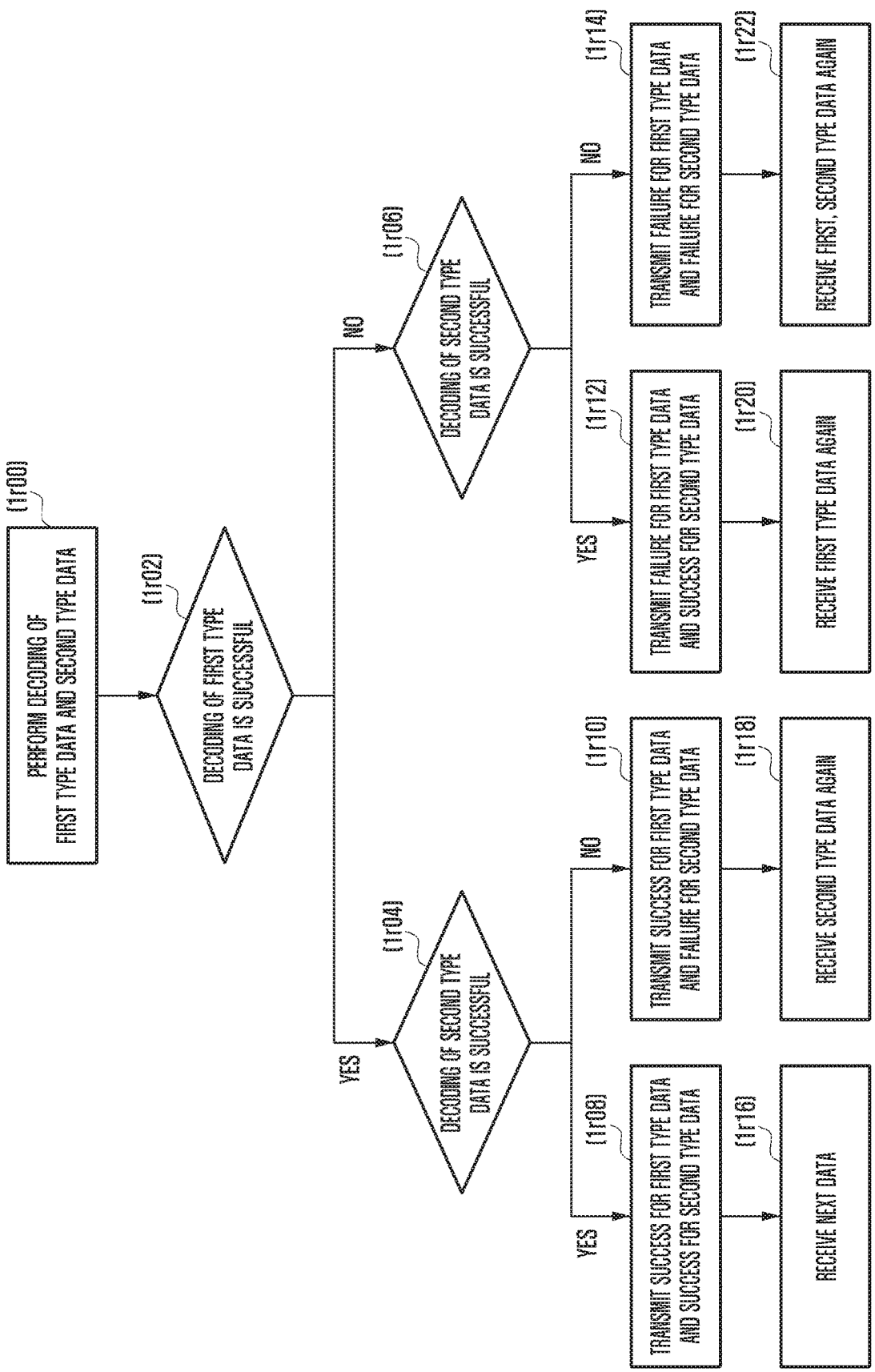
FIG. 1R is a diagram showing a UE operation according to a (2-5) embodiment.

FIG. 1R is a diagram showing a UE operation according to a (2-5) embodiment.

FIG. 1R shows the situation in which a UE decodes each datum and feeds a result thereof back and a corresponding subsequent operation is included in the situation in which one downlink transport block has been divided into first type data and second type data.

Specifically, in FIG. 1R, the UE first performs the decoding of the first type data and the second type data (1r00). When both the decoding of the first type data and the decoding of the second type data are successful (1r02, 1r04), the UE reports success information on the first type data and the second type data to a BS (1r08). Furthermore, the UE receives next new data through a subsequently configured downlink resource (1r16). When the decoding of the first type data is successful (1r02) and the decoding of the second type data fails (1r04), the UE transmits success information on the first type data and failure information on the second type data to a BS (1r10). Furthermore, the UE receives the second type data again through a subsequently configured downlink resource (1r18). When the decoding of the first type data fails (1r02) and the decoding of the second type data is successful (1r06), the UE transmits the failure of the first type data and the success of the second type data to a BS (1r12). Furthermore, the UE receives the first type data again through a subsequently configured downlink resource (1r20). When both the decoding of the first type data and the decoding of the second type data fail (1r02, 1r06), the UE transmits failure information on the first type data and the second type data to a BS (1r14). Furthermore, the UE receives both the first, second type data again through a subsequently configured downlink resource (1r22).

(1-6) Embodiment

Figure 1S:
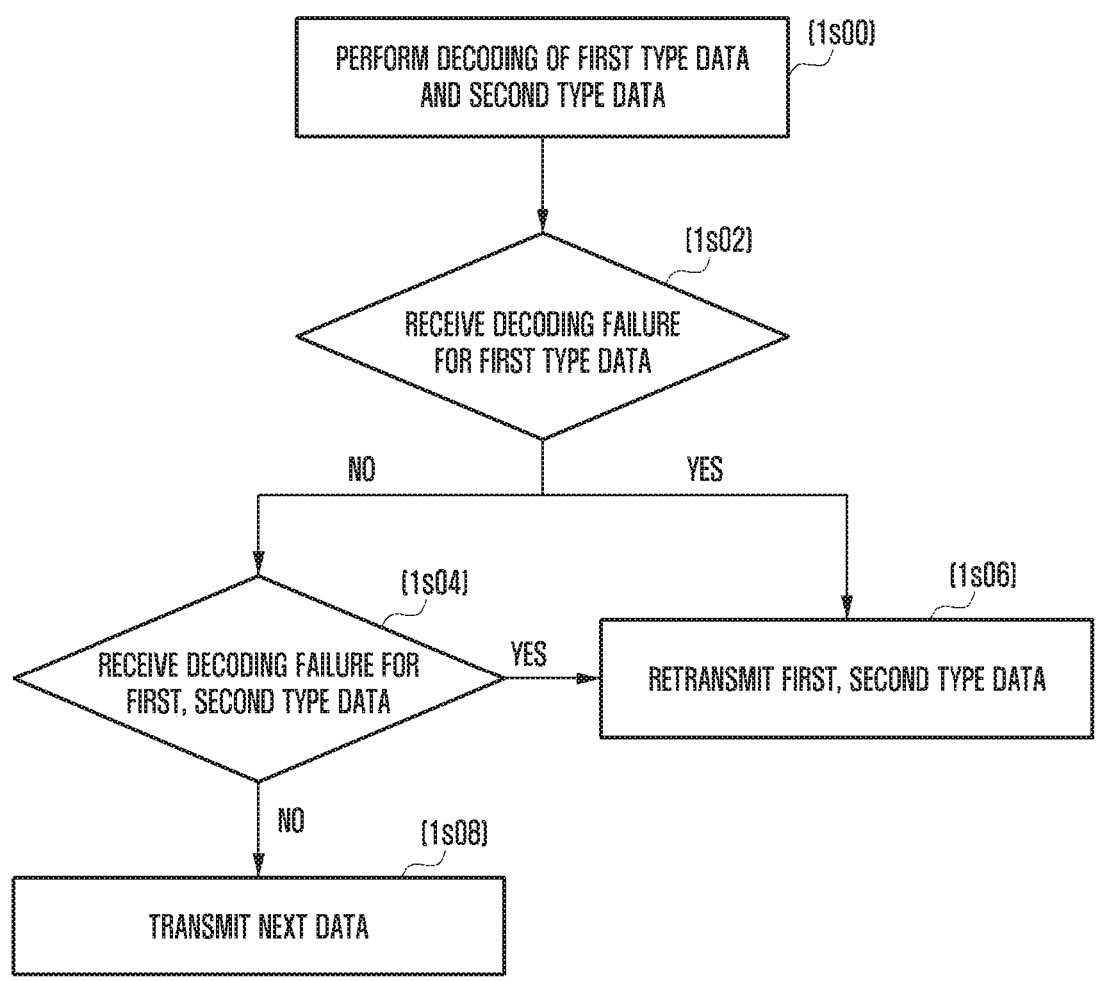
FIG. 1S is a diagram showing a BS operation according to a (2-6) embodiment.

FIG. 1S is a diagram showing a BS operation according to a (2-6) embodiment.

FIG. 1S shows the situation in which a BS adaptively retransmits first type data and second type data when it receives feedback for the first type data and feedback for the second type data, respectively, from a UE. That is, when the BS receives a feedback result of the first type data as a failure, it transmits one transport block, including the first type data and the second type data, in a subsequent downlink-assigned resource regardless of the reception of feedback for the second type data. If the BS does not receive feedback for the first type data and receives a feedback result of the first, second type data as a failure, the BS transmits one transport block, including the first type data and the second type data, in a subsequent downlink-assigned resource. If the BS does not receive feedback for the first type data from a UE and receives feedback for the first, second type data as a success, the BS transmits a next new transport block in a subsequent downlink-assigned resource.

Specifically, the BS transmits one transmission block, configured with the first type data and the second type data, in downlink (1s00). Thereafter, when the BS receives a failure of the decoding (1s02) of the first type data or a failure of the decoding (1s04) of the second type data, the BS retransmits the transport block, including the first type data and the second type data, again in a subsequent operation (1s06). When the BS receives a success of the decoding (1s02) of the first type data and a success of the decoding (1s04) of the second type data, the BS transmits next new data (1s08).

(1-7) Embodiment

Figure 1T:
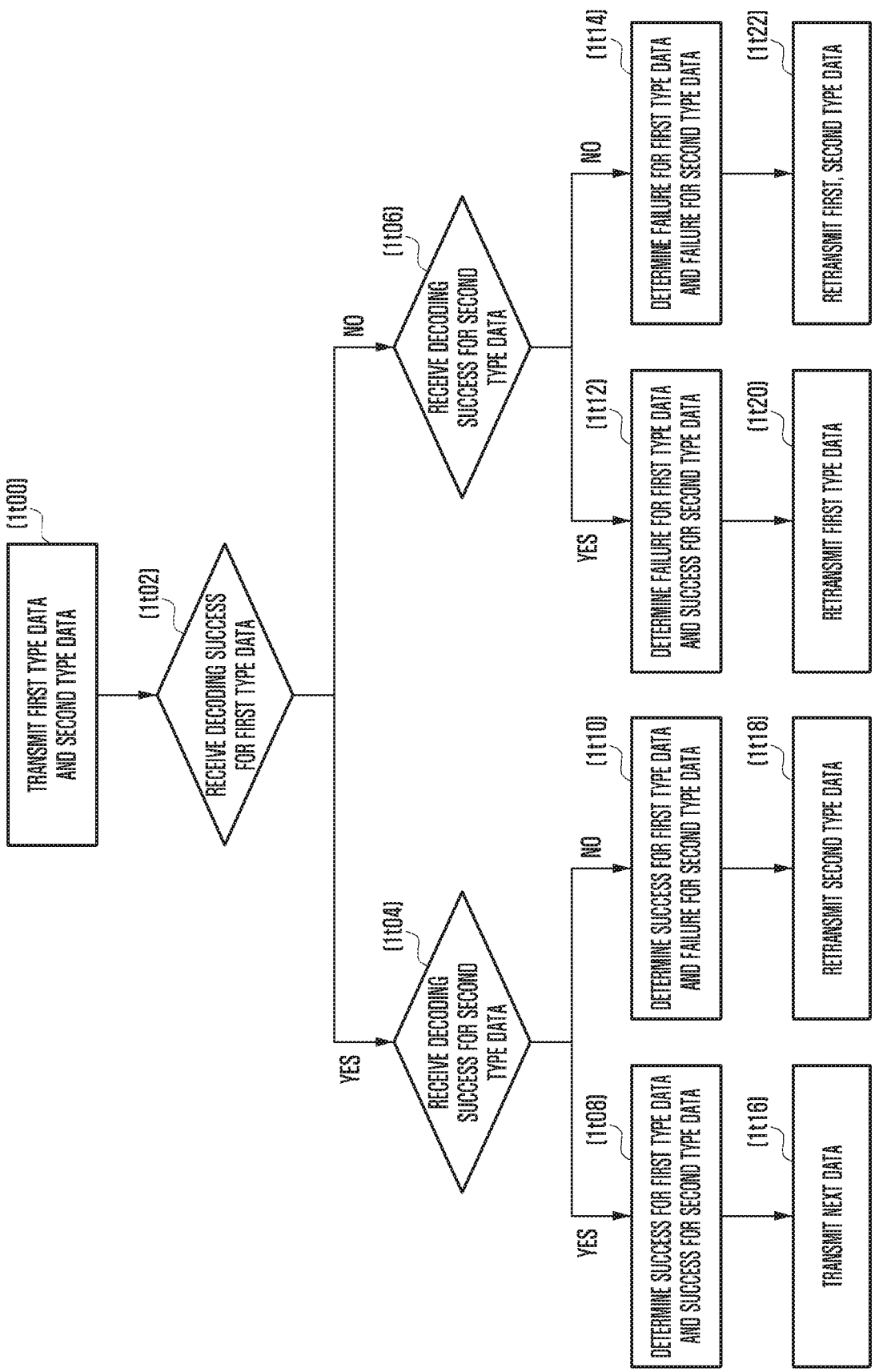
FIG. 1T is a diagram showing a BS operation according to a (2-7) embodiment.

FIG. 1T is a diagram showing a BS operation according to a (2-7) embodiment.

FIG. 1T shows the situation in which a BS differently receives feedback for first type data and feedback for second type data. The BS first receives the feedback for the first type data and then receives the feedback for the second type data. The BS transmits only the first type data in a corresponding assigned downlink resource based on a feedback result of the first type data regardless of their feedback results. Furthermore, the BS transmits only the second type data in a corresponding assigned downlink resource based on a feedback result of the second type data. That is, this corresponds to an operation in which in initial transmission, one transmission block including the first type data and the second type data is transmitted to a UE, but retransmission is performed based on a corresponding result in a different downlink resource.

Specifically, the BS transmits one transmission block including the first type data and the second type data (1t00). When the BS receives a decoding success of the first type data and the second type data from a UE (1t02, 1t04), the BS determines the transmission of the first type data and the second type data to be successful (1t08). Furthermore, the BS transmits next new data through a subsequently configured downlink resource (1t16). When the BS receives a report for a decoding success (1t02) of the first type data from the UE and receives a report for a decoding failure (1t04) of the second type data, the BS determines the transmission of the first type data to be successful and determines the transmission of the second type data to have failed (1t10). Furthermore, the BS retransmits the second type data through a subsequently configured downlink resource (1t18). When the BS receives a report for a decoding failure (1t02) of the first type data from the UE and receives a report for a decoding success (1t06) of the second type data, the BS determines the transmission of the first type data to be a failure and determines the transmission of the second type data to be successful (1t12). Furthermore, the BS retransmits the first type data a subsequently configured downlink resource (1t20). When the BS receives failure reports (1t02, 1t06) for the decoding of the first type data and the second type data from the UE, the BS determines that the transmission of both the first type data and the second type data has failed (1t14). Furthermore, the BS retransmits both the first type data and the second type data through a subsequently configured downlink resource (1t22).

Figure 1U:
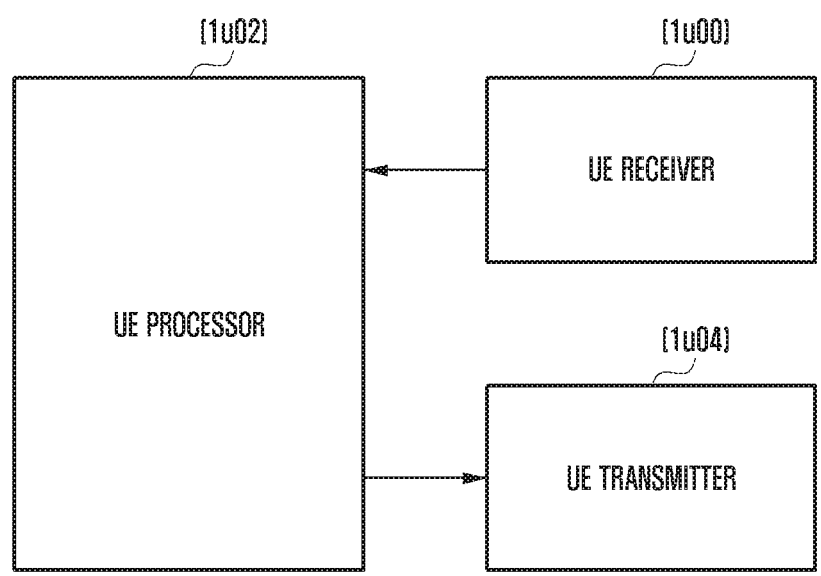
FIG. 1U is a block diagram showing the structure of a UE according to embodiments.

FIG. 1U is a block diagram showing the structure of a UE according to embodiments.

Referring to FIG. 1U, the UE of the disclosure may include a UE receiver 1u00, a UE transmitter 1u04, a UE processor 1u02. The UE receiver 1u00 and the UE transmitter 1u04 may be commonly called a transceiver in one embodiment. The transceiver may transmit and receive signals to and from a BS. The signal may include control information and data. To this end, the transceiver may be configured with an RF transmitter configured to up-convert and amplify the frequency of a transmitted signal, an RF receiver configured to low-noise amplify a received signal and to down-convert a frequency, etc. Furthermore, the transceiver may receive a signal through a radio channel, may transmit the signal to the UE processor 1u02, and may transmit a signal, output by the UE processor 1u02, through a radio channel. The UE processor 1u02 may control a series of processes so that the UE operates according to the embodiments. For example, the UE processor 1u02 may control the UE receiver 1u00 to receive a signal, including second signal transmission timing information, from a BS and to interpret the second signal transmission timing. Thereafter, the UE receiver 1u04 may transmit a second signal at the timing.

Figure 1V:
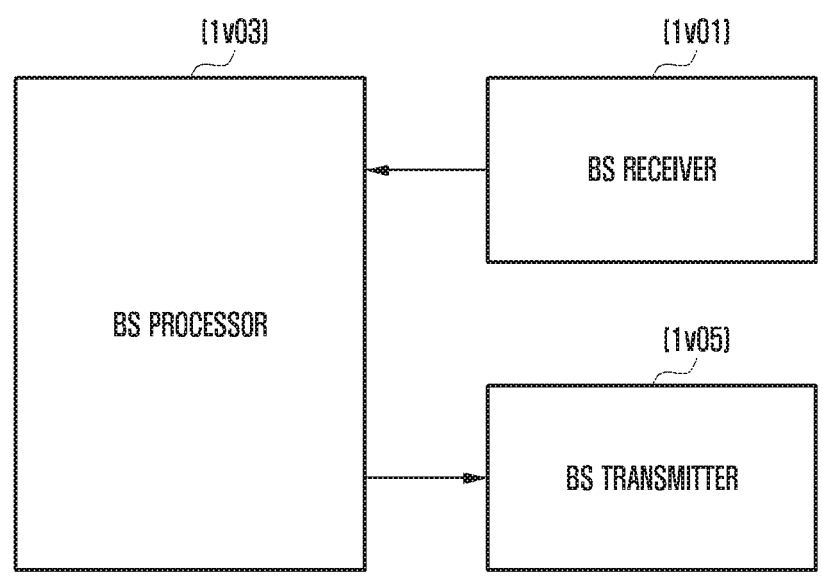
FIG. 1V is a block diagram showing the structure of a BS according to embodiments.

FIG. 1V is a block diagram showing the structure of a BS according to embodiments.

Referring to FIG. 1V, in one embodiment, the BS may include at least one of a BS receiver 1v01, a BS transmitter 1v05 and a BS processor 1v03. The BS receiver 1v01 and the BS transmitter 1v05 may be commonly called a transceiver in one embodiment of the disclosure. The transceiver may transmit and receive signals to and from a UE. The signal may include control information and data. To this end, the transceiver may be configured with an RF transmitter configured to up-convert and amplify the frequency of a transmitted signal, an RF receiver configured to low-noise amplify a received signal and to down-convert a frequency. Furthermore, the transceiver may receive a signal through a radio channel, may output the signal to the BS processor 1v03, and may transmit a signal, output by the UE processor 1v03, through a radio channel. The BS processor 1v03 may control a series of processes so that the BS operates according to the embodiments of the disclosure. For example, the BS processor 1v03 may control to determine second signal transmission timing and to generate second signal transmission timing information to be transmitted to a UE. Thereafter, the BS transmitter 1v05 may transmit the timing information to the UE, and the BS receiver 1v01 may receive a second signal at the timing.

Furthermore, in accordance with one embodiment of the disclosure, the BS processor 1v03 may control to generate downlink control information (DCI) including the second signal transmission timing information. In this case, the DCI may indicate that it is the second signal transmission timing information.

The embodiments of the disclosure disclosed in the specification and drawings have suggested given examples in order to easily describe the technical contents of the disclosure and to help understanding of the disclosure, and are not intended to limit the scope of the disclosure. That is, it is evident to those skilled in the art to which the disclosure pertains that other modified examples based on technical spirit of the disclosure may be practiced. Furthermore, the embodiments may be combined and operated, if necessary. For example, some of the embodiment 1-1, the embodiment 1-2 and the embodiment 1-3 of the disclosure may be combined, so a BS and a UE operate based on them. Furthermore, the embodiments have been presented based on an NR system, and other modified examples based on the technical spirit of the embodiments may be applied to other systems, such as FDD or TDD LTE systems.

Furthermore, the preferred embodiments of the disclosure have been disclosed in this specification and drawings. Although specific terms have been used, they are used in common meanings in order to easily describe the technical contents of the disclosure and to help understanding of the disclosure, but are not intended to limit the scope of the disclosure. It is evident to a person having ordinary skill in the art to which the disclosure pertains that other modified examples based on the technical spirit of the disclosure are possible in addition to the disclosed embodiments.

Second Embodiment

Hereinafter, embodiments of the disclosure are described in detail with reference to the accompanying drawings.

In describing the embodiments, a description of contents that are well known in the art to which the disclosure pertains and not directly related to the disclosure is omitted in order to make the gist of the disclosure clearer.

For the same reason, in the accompanying drawings, some elements are enlarged, omitted or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment or code, which includes one or more executable instructions for implementing a specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card. Furthermore, in one embodiment, "~unit" may include one or more processors.

Wireless communication systems deviate from the provision of the initial voice-oriented service and evolve into wideband wireless communication systems that provide high-speed and high-quality packet data services, for example, communication standards, such as high speed packet access (HSPA) of 3GPP, long term evolution (LTE) or evolved universal terrestrial radio access (E-UTRA), LTE-Advanced (LTE-A), LTE-Pro, high rate packet data (HRPD) of 3GPP2, a ultra mobile broadband (UMB) and 802.16e of IEEE. Furthermore, the communication standard of 5G or new radio (NR) is being made as a 5G wireless communication system.

As described above, in a wireless communication system including 5G, at least one service of an enhanced mobile broadband (eMBB), massive machine type communications (mMTC) and ultra-reliable and low-latency communications (URLLC) may be provided to a terminal. The services may be provided to the same terminal during the same time interval. In all the following embodiments of the disclosure, the eMBB may be service having an object of the high-speed transmission of a large amount of data, the mMTC may be service having an object of terminal power minimization and access of multiple terminals, and the URLLC may be service having an object of high reliability and low latency, but are not limited thereto. Furthermore, in all the following embodiments of the disclosure, the TTI of URLLC service may be assumed to be shorter than the TTI of eMBB and mMTC services, but is not limited thereto. The three types of services may be major scenarios in an LTE system or systems, such as 5G/new radio and next radio (NR) after LTE.

Hereinafter, embodiments of the disclosure are described in detail with reference to the accompanying drawings.

Furthermore, in describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification. Hereinafter, a base station is a subject that configures some of or all of pieces of control information of a UE and assigns resources, and may be at least one of an eNode B, a Node B, a BS, a radio access unit, a BS controller, a transmission and reception point (TRP) or a node on a network. A terminal may include a user equipment (UE), a mobile station (MS), a cellular phone, a smartphone, a computer and a multimedia system capable of performing a communication function.

In the disclosure, downlink (DL) means the radio transmission path of a signal transmitted from a BS to a UE, and uplink (UL) means the radio transmission path of a signal transmitted from a UE to a BS. Furthermore, the embodiments of the disclosure are described below by taking an LTE or LTE-A system as an example, but the embodiments of the disclosure may be applied to other communication systems having a similar technical background or channel form. For example, a 5G mobile communication technology (new radio (NR)) being developed after LTE-A may be included in other communication systems. Furthermore, an embodiment of the disclosure may also be applied to other communication systems through some modification without greatly departing from the range of the disclosure based on a determination of a person who has skilled technical knowledge.

An LTE system, that is, a representative example of the broadband wireless communication system, adopts an orthogonal frequency division multiplexing (OFDM) scheme in downlink (DL) and adopts a single carrier frequency division multiple access (SC-FDMA) scheme in uplink (UL). Uplink refers to a radio link through which a terminal (or user equipment (UE)) or mobile station (MS)) transmits data or a control signal to a base station (BS or eNode B). Downlink refers to a radio link through which a BS transmits data or a control signal. Such a multi-access scheme is a method of assigning or managing time-frequency resources on which data or control information will be carried for each user in order to distinguish between the data or control information of users so that the time-frequency resources do not overlap, that is, orthogonality is established.

The LTE system adopts a hybrid automatic repeat request (HARQ) scheme of retransmitting corresponding data in a physical layer when a decoding failure occurs in initial transmission. According to the HARQ scheme, when a receiver does not precisely decode data, the receiver transmits information (negative acknowledgement (NACK)), notifying a transmitter of the decode failure, to the transmitter so that the transmitter can retransmit the corresponding data in the physical layer. The receiver combines the data retransmitted by the transmitter with the data whose decoding has previously failed, thereby increasing data reception performance. Furthermore, when the receiver accurately decodes data, the receiver transmits information (acknowledgement (ACK)), notifying the transmitter of a decoding success, to the transmitter so that the transmitter can transmit new data.

Figure 2A:
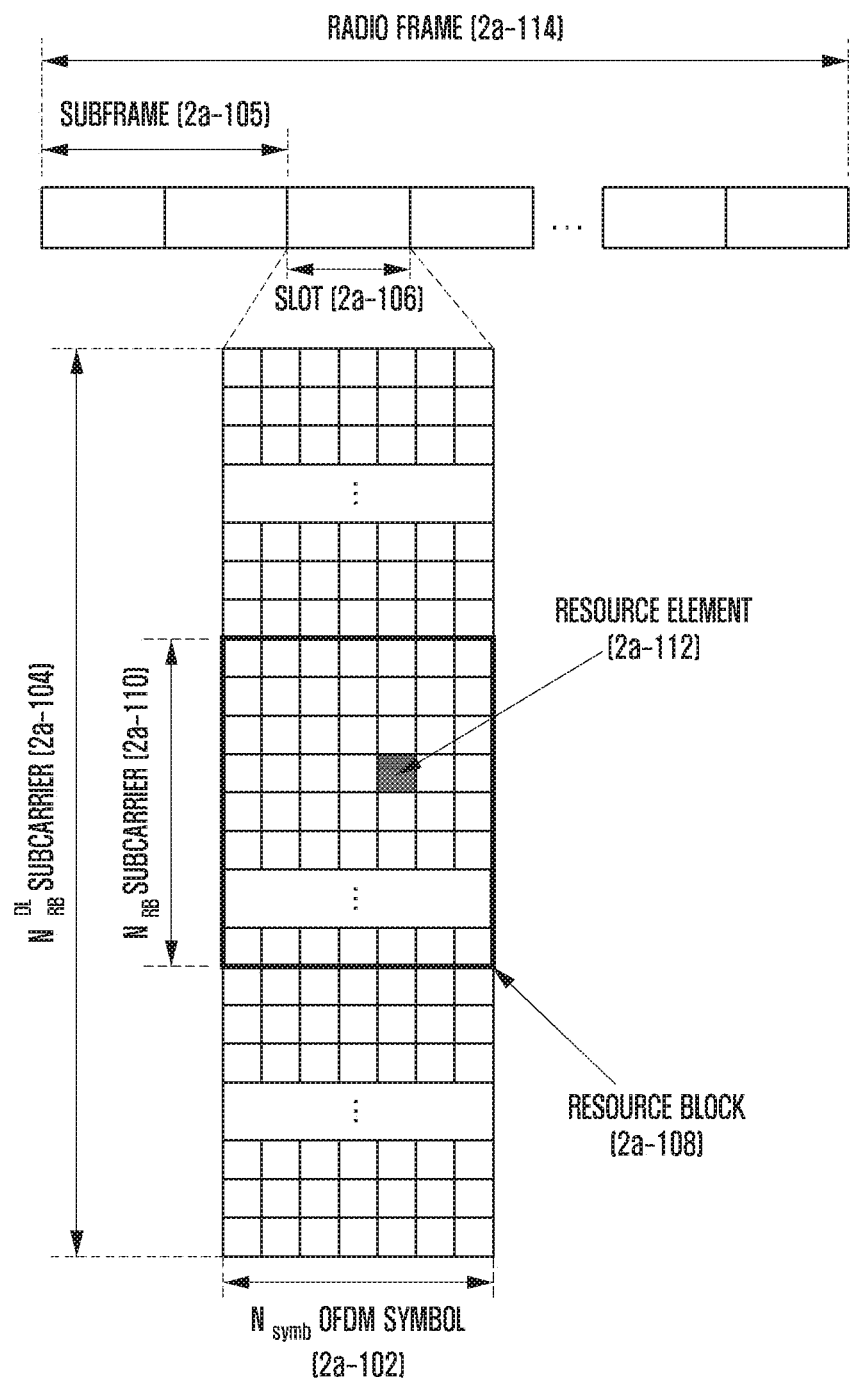
FIG. 2A is a diagram showing a basic structure of a time-frequency domain, that is, a radio resource region in which a data or a control channel is transmitted in downlink, in an LTE system or a similar system thereof.

FIG. 2A is a diagram showing a basic structure of a time-frequency domain, that is, a radio resource region in which a data or control channel is transmitted in downlink, in an LTE system or a similar system thereof.

Referring to FIG. 2A, a transverse axis indicates a time domain and a longitudinal axis indicates a frequency domain. A minimum transmission unit in the time domain is an OFDM symbol, $N_{symb}$ OFDM symbols 2a-102 gather to configure one slot 2a-106, and two slots gather to configure one subframe 2a-105. The length of the slot is 0.5 ms, and the length of the subframe is 1.0 ms. Furthermore, a radio frame 2a-114 is a time domain period configured with 10 subframes. A minimum transmission unit in the frequency domain is a subcarrier, the bandwidth of the entire system transmission bandwidth is configured with a total of $N_{BW}$ subcarriers 2a-104. However, such a detailed numerical value may be variably applied.

In the time-frequency domain, a basic unit of a resource is a resource element (RE) 2a-112 and may be indicated as an OFDM symbol index and a subcarrier index. A resource block (RB) 2a-108 (or physical resource block (PRB)) may be defined as $N_{symb}$ contiguous OFDM symbols 2a-102 in the time domain and $N_{RB}$ contiguous subcarriers 2a-110 in the frequency domain. Accordingly, in one slot, one RB 2a-108 may include $N_{symb} \times N_{RB}$ REs 2a-112. In general, a frequency domain minimum allocation unit of data is an RB. In the LTE system, in general, the $N_{symb}=7$, $N_{RB}=12$, and $N_{BW}$ and $N_{RB}$ may be proportional to the bandwidth of a system transmission band. A data rate increases in proportion to the number of RBs scheduled in a UE. An LTE system may define and operate 6 transmission bandwidths. In the case of an FDD system in which downlink and uplink are divided and operated by frequency, a downlink transmission bandwidth and an uplink transmission bandwidth may be different. A channel bandwidth indicates an RF bandwidth corresponding to a system transmission bandwidth. Table 2a shows a correspondence relation between system transmission bandwidths and channel bandwidths defied in an LTE system. For example, in an LTE system having a 10 MHz channel bandwidth, a transmission bandwidth may be configured with 50 RBs.

TABLE 2a

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within the first N OFDM symbols within a subframe. In one embodiment, in general, N={1, 2, 3}. Accordingly, an N value may be variably applied to each subframe depending on the amount of control information to be transmitted in a current subframe. The transmitted control information may include a control channel transmission interval indicator indicating that the control information is transmitted over how many OFDM symbols, scheduling information on downlink data or uplink data, information on HARQ ACK/NACK.

In an LTE system, scheduling information on downlink data or uplink data is delivered from a BS to a UE through downlink control information (DCI). The DCI is defined according to various formats, and may indicate whether the information is scheduling information (UL grant) on uplink data or scheduling information (DL grant) on downlink data depending on each format, whether the information is compact DCI whose size of control information is small, whether spatial multiplexing using multiple antennas is applied, whether the information is DCI for power control, etc. For example, the DCI format 1, that is, scheduling control information (DL grant) on downlink data may include at least one of the following pieces of control information.

Resource allocation type 0/1 flag: indicates whether a resource assignment method is type 0 or type 1. In type 0, a resource is assigned in a resource block group (RBG) unit by applying a bitmap method. In an LTE system, a basic unit of scheduling is an RB represented as time and frequency domain resources. An RBG is configured with a plurality of RBs, and becomes a basic unit of scheduling in a type 0 method. In type 1, a given RB is assigned within an RBG.

Resource block assignment: indicates an RB assigned to data transmission. A represented resource is determined based on a system bandwidth and resource assignment method.

Modulation and coding scheme (MCS): indicates a modulation scheme used for data transmission and the size of a transport block (TB), that is, data to be transmitted.

HARQ process number: indicates the process number of an HARQ.

New data indicator: indicates whether transmission is HARQ initial transmission or retransmission.

Redundancy version: indicates a redundancy version of an HARQ.

Transmit power control (TPC) command for physical uplink control channel (PUCCH): indicates a transmit power control command for a PUCCH, that is, an uplink control channel.

The DCI may be transmitted on a physical downlink control channel (PDCCH) (or control information, and they are hereinafter interchangeably used) or an enhanced PDCCH (EPDCCH) (or enhanced control information, and they are hereinafter interchangeably used), that is, a downlink physical control channel, through a channel coding and modulation process.

In general, the DCI is independently scrambled with a given radio network temporary identifier (RNTI) (or UE ID) with respect to each UE. After cyclic redundancy check (CRC) is added to the DCI and subject to channel coding, the DCI may be configured with each independent PDCCH and transmitted. In the time domain, a PDCCH is mapped and transmitted during a control channel transmission interval. The frequency domain mapping location of the PDCCH may be determined by the ID of each UE and may be spread and transmitted in the entire system transmission bandwidth.

Downlink data may be transmitted on a physical downlink shared channel (PDSCH), that is, a physical channel for downlink data transmission. The PDSCH may be transmitted after a control channel transmission interval. A detailed mapping location of the PDSCH in the frequency domain and scheduling information, such as a modulation scheme, are determined based on DCI transmitted through a PDCCH.

A BS notifies a UE of a modulation scheme applied to a PDSCH to be transmitted and the size of data to be transmitted (transport block size (TBS)) through an MCS among control information that configures the DCI. In one embodiment, the MCS may be configured with 5 bits or bits greater or smaller than 5 bits. The TBS corresponds to a size before channel coding for error correction is applied to a data transport block (TB) to be transmitted by the BS.

A modulation scheme supported in an LTE system includes quadrature phase shift keying (QPSK), quadrature amplitude modulation (16QAM), and 64QAM. Modulation orders (Qm) correspond to 2, 4 and 6, respectively. That is, in the case of QPSK modulation, 2 bits may be transmitted per symbol. In the case of 16QAM modulation, 4 bits may be transmitted per symbol. In the case of 64QAM modulation, 6 bits may be transmitted per symbol. Furthermore, a modulation method of 256QAM or more may be used depending on system modification.

Figure 2B:
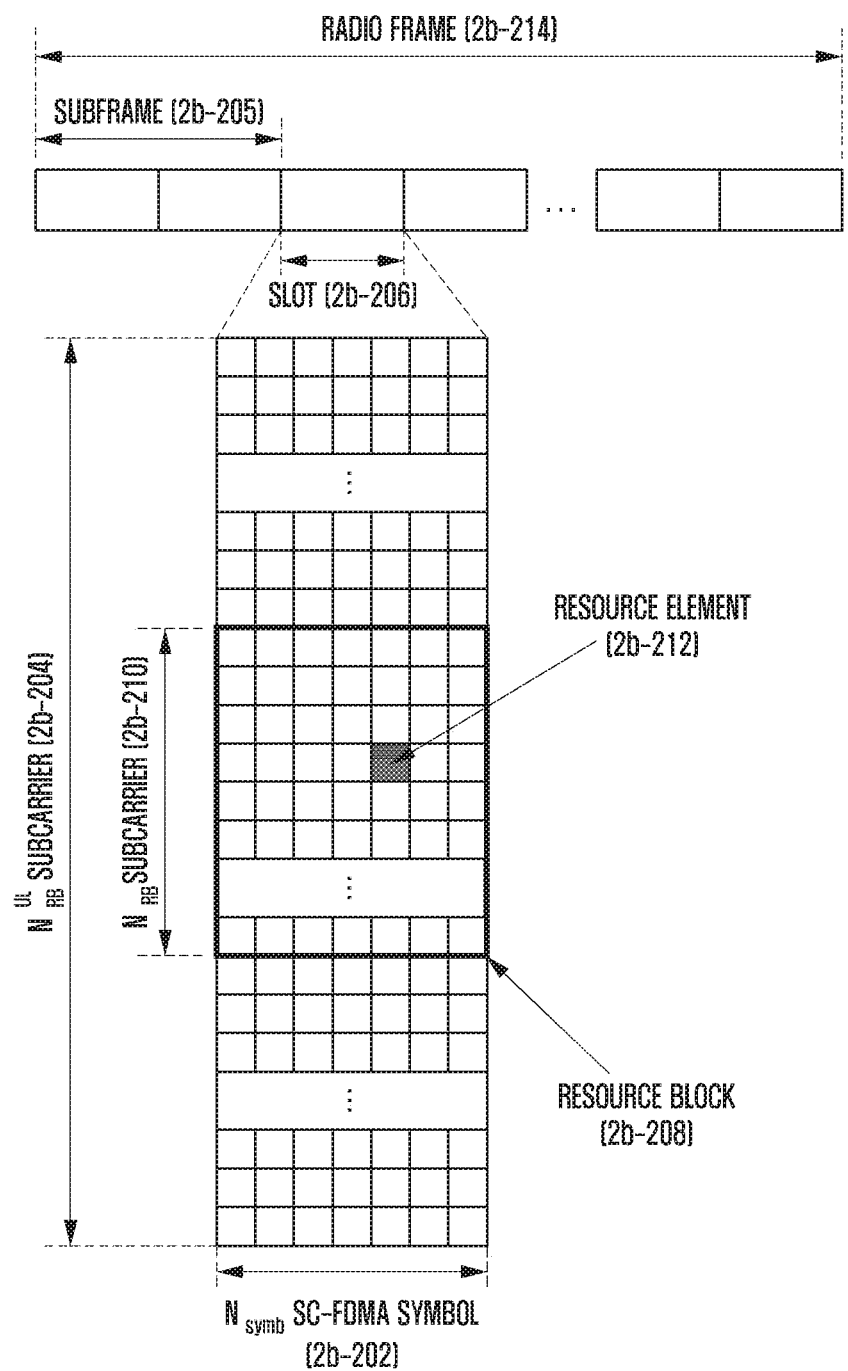
FIG. 2B is a diagram showing a basic structure of a time-frequency domain, that is, a radio resource region in which a data or a control channel is transmitted in uplink, in an LTE-A system.

FIG. 2B is a diagram showing a basic structure of a time-frequency domain, that is, a radio resource region in which a data or control channel is transmitted in uplink, in an LTE-A system.

Referring to FIG. 2B, a transverse axis indicates a time domain, and a longitudinal axis indicates a frequency domain. A minimum transmission unit in the time domain is an SC-FDMA symbol 2b-202, and $N_{symb}^{UL}$ SC-FDMA symbols may gather to configure one slot 2b-206. Furthermore, two slots gather to configure one subframe 2b-205. A minimum transmission unit in the frequency domain is a subcarrier. The entire system transmission bandwidth 2b-204 is configured with a total of $N_{BW}$ subcarriers. $N_{BW}$ may have a value proportional to a system transmission bandwidth.

In the time-frequency domain, a basic unit of a resource is a resource element (RE) 2b-212 and may be defined as an SC-FDMA symbol index and a subcarrier index. A resource block pair (RB pair) 2b-208 may be defined as $N_{symb}^{UL}$ contiguous SC-FDMA symbol in the time domain and $N_{SC}^{RB}$ contiguous subcarriers in the frequency domain. Accordingly, one RB is configured with $N_{symb}^{UL} \times N_{SC}^{RB}$ REs. In general, a minimum transmission unit of data or control information is an RB unit. A PUCCH is mapped to a frequency domain corresponding to 1 RB and transmitted during 1 subframe.

In an LTE system, the timing relation of a PDSCH, that is, a physical channel for downlink data transmission or a PUCCH or PUSCH, that is, an uplink physical channel in which HARQ ACK/NACK corresponding to a PDCCH/EPDDCH including semi-persistent scheduling release (SPS release) is transmitted, may be defined. For example, in an LTE system operating according to frequency division duplex (FDD), HARQ ACK/NACK corresponding to a PDSCH transmitted in an (n−4)-th subframe or a PDCCH/EPDCCH including SPS release may be transmitted as a PUCCH or PUSCH in an n-th subframe.

In an LTE system, a downlink HARQ adopts an asynchronous HARQ method having data retransmission timing not fixed. That is, when feedback for HARQ NACK is received from a UE with respect to initial transmission data transmitted by a BS, the BS freely determines the transmission timing of retransmission data according to a scheduling operation. The UE may buffer data determined to be an error as a result of the decoding of data received for an HARQ operation, and may perform combining with next retransmission data.

When a UE receives a PDSCH, including downlink data transmitted by a BE, in a subframe n, the UE transmits uplink control information, including the HARQ ACK or NACK of the downlink data, to the BS through a PUCCH or PUSCH in a subframe n+k. In this case, the k may be differently defined depending on the FDD or time division duplex (TDD) of an LTE system and a subframe configuration thereof. For example, in the case of an FDD LTE system, the k is fixed to 4. In the case of a TDD LTE system, the k may be changed depending on a subframe configuration and subframe number. Furthermore, when data transmission is performed through a plurality of carriers, the value of k may be differently applied based on a TDD configuration of each carrier.

In an LTE system, unlike a downlink HARQ, an uplink HARQ adopts a synchronous HARQ method having data transmission timing fixed. That is, an uplink/downlink timing relation between a physical uplink shared channel (PUSCH), that is, a physical channel for uplink data transmission, a PDCCH, that is, a downlink control channel preceding the PUSCH, and a physical hybrid indicator channel (PHICH), that is, a physical channel in which downlink HARQ ACK/NACK corresponding to the PUSCH is transmitted, may be transmitted and received by the following rule.

When a UE receives a PDCCH, including uplink scheduling control information transmitted by a BS or a PHICH in which downlink HARQ ACK/NACK is transmitted in a subframe n from a BS, the UE transmits uplink data, corresponding to the control information, through a PUSCH in a subframe n+k. In this case, the k may be differently defined depending on the FDD or time division duplex (TDD) of an LTE system and a configuration thereof. For example, in the case of an FDD LTE system, the k may be fixed to 4. In the case of a TDD LTE system, the k may be changed depending on a subframe configuration and a subframe number. Furthermore, when data transmission is performed through a plurality of carriers, the value of k may be differently applied depending on a TDD configuration of each carrier.

Furthermore, when the UE receives a PHICH, including information related to downlink HARQ ACK/NACK, from a BS in a subframe i, the PHICH corresponds to a PUSCH transmitted by the UE in a subframe i–k. In this case, the k may be differently defined depending on the FDD or TDD of an LTE system and a configuration thereof. For example, in the case of an FDD LTE system, the k is fixed to 4. In the case of a TDD LTE system, the k may be changed depending on a subframe configuration and a subframe number. Furthermore, when data transmission is performed through a plurality of carriers, the value of k may be differently applied depending on a TDD configuration of each carrier.

The wireless communication system has been described on the basis of an LTE system, and the contents of the disclosure are not limited to the LTE system and may be applied to various wireless communication systems, such as NR and 5G. Furthermore, in one embodiment, if the contents are applied to other wireless communication systems, the k value may be changed and applied in systems using FDD and a corresponding modulation scheme.

Figure 2C:
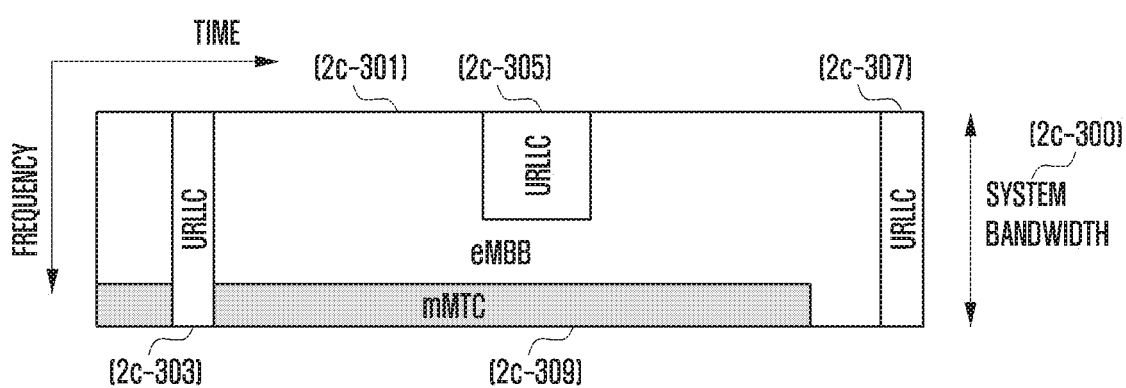
FIG. 2C is a diagram showing the state in which data for an eMBB, URLLC and mMTC, that is, services taken into consideration in a 5G or NR system, is allocated in frequency-time resources.
Figure 2D:
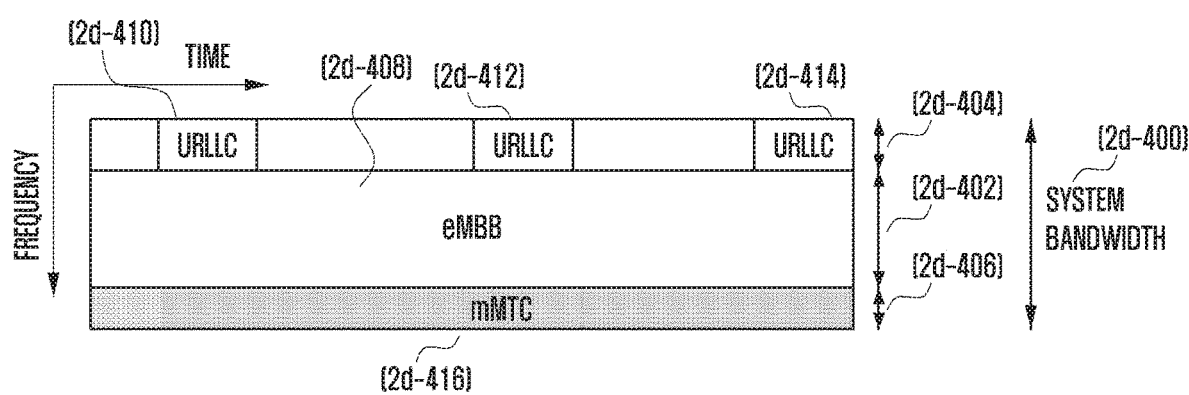
FIG. 2D is a diagram showing the state in which data for an eMBB, URLLC and mMTC, that is, services taken into consideration in a 5G or NR system, is orthogonally allocated in frequency-time resources.

FIGS. 2C and 2D show the state in which data for an eMBB, URLLC and mMTC, that is, services taken into consideration in a 5G or NR system, are assigned in frequency-time resources.

From FIGS. 2C and 2D, a method of assigning frequency and time resources for information transmission in each system may be seen.

First, FIG. 2C shows the state of data for an eMBB, URLLC, and mMTC in the entire system frequency band 2c-300. If URLLC data 2c-303, 2c-305, and 2c-307 are generated and need to be transmitted while an eMBB 2c-301 and mMTC 2c-309 are assigned and transmitted in a given frequency band, the portions to which the eMBB 2c-301 and the mMTC 2c-309 have already been assigned may be empty or may not be transmitted and the URLLC data 2c-303, 2c-305 and 2c-307 may be transmitted. The URLLC data may be assigned (2c-303, 2c-305 and 2c-307) to part of the resource 2c-301 to which the eMBB has been assigned and transmitted because it is necessary to reduce a delay time taken for the URLLC during the service. If the URLLC is additionally assigned and transmitted in the URLLS in the resource to which the eMBB has been assigned, eMBB data may not be transmitted in a redundant frequency-time resource. Accordingly, the transmission performance of the eMBB data may be reduced. That is, in this case, an eMBB data transmission failure may occur due to the URLLC assignment.

In FIG. 2D, the entire system frequency band 2d-400 may be divided and used to transmit services and data in subbands 2d-402, 2d-404 and 2d-406. Information related to the subband configuration may be pre-determined and may be transmitted from a BS to a UE through higher signaling. Alternatively, the information related to the subbands may be randomly divided by a BS or a network node, and services may be divided to a UE without transmitting separate subband configuration information. FIG. 2D shows the state in which the subband 2d-402 is used for eMBB data transmission, the subband 2d-404 is used for URLLC data transmission, and the subband 2d-406 is used for mMTC data transmission.

In overall embodiments, the length of a transmission time interval (TTI) used for URLLC transmission may be assumed to be shorter than the length of a TTI used for eMBB or mMTC transmission, but the TTI length for URLLC transmission may be the same as a TTI length used for eMBB or mMTC transmission. Furthermore, a response of information related to URLLC may be transmitted faster than that of eMBB or mMTC. Accordingly, information can be transmitted and received with low delay.

An eMBB service described hereinafter is called a first type service, and data for an eMBB is called first type data. The first type service or the first type data is not limited to eMBB and may correspond to a case where high-speed data transmission is necessary or broadband transmission is necessary. Furthermore, an URLLC service is called a second type service, and data for URLLC is called second type data. The second type service or the second type data is not limited to URLLC and may correspond to other systems that require a low latency time or high reliability transmission or that require a low latency time and high reliability at the same time. Furthermore, an mMTC service is called a third type service, and data for mMTC is called third type data. The third type service or the third type data is not limited to mMTC, and may correspond to a case where low speed or wide coverage or low power is required. Furthermore, when embodiments are described, the first type service may be understood as including or not including the third type service.

The structure of a physical layer channel used for each type in order to transmit at least one of the three types of services, control information or data may be different. For example, at least one of the length of a transmission time interval (TTI), a assignment unit of a frequency resource, the structure of a control channel, and a mapping method of data may be different. In this case, the three types of different services, control information and data have been illustrated, but more types of services, control information and data may be present. In this case, the contents of the disclosure may be applied. Furthermore, in an embodiment of the disclosure, control information and data for the service may not be divided and described within a range that does not greatly deviate from the scope of the disclosure based on a determination of a person having skilled in the art, and may be applied to the disclosure by considering that the control information is included in data for service.

In order to describe a method and apparatus proposed in one embodiment, terms "physical channel" and "signal" in a conventional LTE or LTE-A system may be used. However, the contents of the disclosure may be applied to wireless communication systems other than LTE and LTE-A systems.

An embodiment, as described above, proposes a detailed method for defining transmission and reception operations of a UE and BS for first type, second type, third type service or data transmission and operating UEs in which different types of services, control information or data are scheduled within the same system. In the disclosure, the first type, second type and third type UE refer to UEs in which the first type, second type and third type service or data have been scheduled. In one embodiment, a first type UE, second type UE and third type UE may be the same UE or different UEs. Furthermore, in the embodiment, in a UE supporting the transmission and reception of one or more service types, the contents of the disclosure may be applied to a case where at least one of the first type, second type, third type services operate in the same cell or carrier or each service type operates in a different cell or carrier.

In the following embodiments, at least one of an uplink scheduling grant signal and a downlink data signal is called a first signal. Furthermore, in the disclosure, at least one of an uplink data signal for an uplink scheduling configuration and a response signal (or HARQ ACK/NACK signal) for a downlink data signal is called a second signal. In one embodiment, from among signals from a BS to a UE, a signal that waits for a response from the UE may be a first signal, and a response signal from the UE corresponding to the first signal may be a second signal. Furthermore, in one embodiment, the service type of a first signal may be at least one of an eMBB, URLLC and mMTC, and the service type of a second signal may also correspond to the at least one.

In the following embodiments, the TTI length of a first signal is a time value related to the transmission of the first signal, and may indicate the length of the time when the first signal is transmitted. Furthermore, in the disclosure, the TTI length of a second signal is a time value related to the transmission of the second signal, and may indicate the length of time when the second signal is transmitted. The TTI length of a third signal is a time value related to the transmission of the third signal, and may indicate the length of time when the third signal is transmitted. Furthermore, in the disclosure, the transmission and reception timing of the first signal, second signal or third signal is information on when a UE transmits the first signal, second signal or third signal and when a BS receives the first signal, second signal or third signal or when the BS transmits a response or feedback (e.g., ACK/NACK information) for the received signal. This information may be called the transmission and reception timing of the first signal, second signal or third signal. In this case, the first signal, second signal or third signal may be considered to be a signal for a first type service, second type service or third type service. In this case, at least one of the TTI length of the first signal, second signal or third signal and the transmission and reception timing of the first signal, second signal or third signal may be differently configured. For example, the TTI length of the first signal is the same as the TTI length of the second signal, but may be configured to be longer than the TTI length of the third signal. For another example, the transmission and reception timing of the first signal or second signal is configured as n+4, but the transmission and reception timing of the third signal may be configured to be shorter than the transmission and reception timing, for example, n+2.

Furthermore, in the following embodiment, assuming that when a BS transmits a first signal in an n-th TTI, a UE transmits a second signal in an (n+k)-th TTI, what the BS notifies the UE of timing when the second signal is transmitted is the same as that the BS notifies the UE of a k value. Alternatively, assuming that when a BS transmits a first signal in an n-th TTI, a UE transmits a second signal in an (n+t+a)-th TTI, what the BS notifies the UE of timing when the second signal is transmitted is previously defined or is the same as that the BS notifies the UE of an offset value a based on a value t derived according to a previously defined method. In this case, the t value may be previously defined as various values in addition to t=4 described in the disclosure or may be derived using a previously defined method.

Furthermore, a technology proposed in the disclosure may also be applied to a new type of a duplex mode (e.g., LTE frame structure type 3) in addition to FDD and TDD systems.

Hereinafter, in the disclosure, higher signaling is a method for a BS to transmit a signal to a UE using a downlink data channel of a physical layer or a method for a UE to transmit a signal to a BS using an uplink data channel of a physical layer. Higher signaling may also be called RRC signaling, PDCP signaling or a MAC control element (MAC CE).

Hereinafter, in one embodiment of the disclosure, in providing a UE with one or more services including eMBB, mMTC and URLLC, an uplink transmission resource assignment method for reducing delay between uplink transmission configuration information transmission and configured uplink transmission is described. Furthermore, in one embodiment of the disclosure, a BS and UE performing uplink transmission through a licensed band or unlicensed band are assumed and described, but the embodiments of the disclosure may be applied regardless of the licensed band or unlicensed band.

In general, a BS configures (schedules) a given transmission time interval (hereinafter TTI) and frequency resource region so that a UE may transmit uplink data or control information corresponding to eMBB, mMTC, URLLC, etc. For example, the BS may configure a given TTI and frequency resource region in a subframe n through a downlink control channel with respect to a given UE so that the UE performs uplink transmission in a subframe n+k (k≥0). In other words, the BS may transmit uplink transmission configuration information to the UE that requires uplink transmission through a downlink control channel in the subframe n. The UE that has received the uplink transmission configuration information may transmit uplink data or control information to the BS (or another UE) using a time and frequency resource region configured in the uplink transmission configuration information. In this case, the UE having data or control information to be transmitted through uplink may transmit scheduling request information to the BS or may request the BS to transmit the uplink transmission configuration information to the UE through a random access process.

In other words, the uplink transmission of a common UE may include the following three steps. In this case, the uplink transmission through the three steps is only one example, and uplink transmission having steps lesser or greater than the steps described in this example is also possible.

Step 1: a UE having data or control information to be transmitted through uplink requests an uplink transmission configuration from a BS through a valid uplink resource in which an uplink transmission configuration request may be transmitted. In this case, at least one of a time resource or frequency resource in which the uplink transmission configuration may be requested may be previously defined or may be configured through a higher signal.

Step 2: the BS that has received the uplink transmission configuration request from the UE configures uplink transmission by transmitting uplink transmission configuration information to the UE through a downlink control channel.

Step 3: the UE that has the uplink transmission configured by the BS performs the uplink transmission using the uplink transmission configuration information configured by the BS.

That is, transmission delay of a given time or more occurs when the UE having data or control information to be transmitted through uplink performs the uplink information. For example, in a UE having uplink transmission data at timing n, if an uplink transmission configuration request resource is configured as a 5 ms cycle, delay of a maximum of 5 ms may occur in transmitting uplink transmission configuration request information. Furthermore, if transmission delay (e.g., 1 ms) is necessary between uplink configuration control information reception timing and configured uplink transmission start time, transmission delay of a minimum 6 ms or more is inevitable when a UE starts uplink transmission. In the case of a known LTE system, transmission delay between uplink configuration control information reception timing and configured uplink transmission start time is a minimum 4 ms. Accordingly, the disclosure proposes a method of reducing uplink transmission delay by enabling a UE attempting to perform an uplink signal transmission operation to perform uplink transmission without receiving separate uplink transmission configuration information from a BS.

Accordingly, the disclosure describes a method for a UE to perform uplink transmission without a separate uplink transmission configuration from a BS using a radio resource that is previously defined by a BS or that is configured through a broadcasting channel transmitted along with a higher signal or system information (e.g. system information block (SIB)) when the UE attempts to perform uplink transmission, and describes a method of changing a pre-configured radio resource so that the BS can perform transmission without the uplink transmission.

In general, in uplink signal transmission in a UE, after configuration information or scheduling information on uplink transmission is received from a BS, the configured uplink transmission may be performed using a time and frequency resource configured by the BS through the uplink transmission configuration information of the UE.

In a BS and UE that perform wireless communication in an unlicensed band, in other words, in a BS and UE that occupy an unlicensed band after performing a channel access procedure (or listen-before-talk (LBT) or channel sensing) and can transmit a signal to be transmitted, as described above, the UE in which uplink transmission has been configured by the BS may perform a channel access procedure on the configured unlicensed band, and may perform the configured uplink transmission only when the unlicensed band is determined to be an idle state. A wireless communication operation in an unlicensed band is described more specifically below.

A BS and UE that perform wireless communication in an unlicensed band may transmit or may not transmit a signal based on a result of the execution of a channel access procedure after they perform the channel access procedure that is previously defined depending on a frequency band, country, etc. or that is defined in a wireless communication standard used by the corresponding BS and UE for coexistence with other wireless devices. For example, the BS or the UE need to sense a channel in which wireless communication is performed (e.g., measures the intensity of a received signal and compares it with a threshold) during a fixed interval (or time) or a period (or time) that varies according to a predefined rule. If the channel is determined to be an idle state during the set time (e.g., when the intensity of a signal received by the BS or UE (or transmission device) is smaller than a threshold that is previously defined or set according to rules during the time), the BS or UE may perform communication using the channel. If the channel is determined to be not an idle state during the set time (e.g., when the intensity of the received signal is greater than the threshold that is previously defined or set according to rules during the time), the BS or UE does not perform communication using the channel. Accordingly, the BS and the UE performing uplink transmission through the three steps as described above perform a channel access procedure for uplink control information and data transmission at steps 1 and 3. The BS performs a channel access procedure for downlink transmission at step 2. Accordingly, if a UE performing wireless communication through an unlicensed band using the method of the disclosure capable of performing uplink transmission without receiving separate uplink transmission configuration information from a BS, the UE can perform uplink transmission more efficiently because it requires only the channel access procedure in step 3. Hereinafter, in the disclosure, what a UE performs uplink transmission without receiving separate uplink transmission configuration information from a BS as described above is called grant-free transmission. In this case, the grant-free transmission includes previously defining at least one of pieces of configuration information on uplink transmission (e.g., some or all of pieces of information on a time or frequency resource capable of grant-free transmission (e.g., start frequency information capable of grant-free transmission)) between a BS and a UE, receiving, by a UE, a configuration for the information or receiving the information from a BS through a higher signal, receiving, by a UE, a configuration for system information transmitted through a broadcasting channel transmitted by a BS or receiving the system information from the BS or receiving, by a UE, a configuration for the information or receiving the information from the BS through a downlink control channel, in addition to performing uplink transmission without a configuration for the entire uplink transmission configuration information from a BS.

A BS operating in an unlicensed band or a UE in a cell may perform a different channel access procedure according to an uplink transmission method configured by the BS. A BS and UE (or transmission device operating in an unlicensed band) need to perform a channel sensing operation or channel access procedure on the unlicensed band before they transmit a downlink signal or uplink signal in the unlicensed band. In this case, requirements for the channel access procedure may be previously defined depending on a frequency band, a country, etc. or may have been defined in a corresponding wireless communication standard.

In general, a channel access procedure in a transmission device that attempts to transmit a signal through an unlicensed band includes a procedure of measuring the intensity of a received signal in an unlicensed band during a configured time according to rules predefined with respect to the unlicensed band in which the signal will be transmitted, and checking whether the unlicensed band is available by comparing the measured intensity of the signal with a threshold configured according to the previously defined rules. When the intensity of the received signal is smaller than the configured threshold during the set time, a transmission device may determine the unlicensed band to be an idle state and transmit the signal through the corresponding unlicensed band. When the intensity of the received signal is greater than the configured threshold during the set time, the transmission device may determine that the unlicensed band has been occupied by other devices, and does not transmit the signal through the corresponding unlicensed band and may repeatedly perform the channel access procedure until the unlicensed band is determined to be an idle state.

A UE may perform a channel sensing operation which may be performed when the UE attempts to transmit an uplink signal through an unlicensed band using at least one of the following methods.

Method 1 (or type 1: uplink signal transmission after sensing an unlicensed band channel during a variable time Method 2 (or type 2): uplink signal transmission after sensing an unlicensed band channel during a fixed time Method 3: uplink signal transmission without channel sensing A UE in which uplink signal transmission has been configured in an unlicensed band as in Method 1 may perform a channel sensing operation on an unlicensed band in which uplink signal transmission has been configured during a channel sensing period configured prior to the configured uplink signal transmission. In this case, the channel sensing period may be randomly selected within the contention period of the UE or may be configured by a BS. Furthermore, the channel sensing period may include one fixing interval and one or more variable intervals. In this case, the channel sensing period may include variable intervals without a fixing interval or may include only a single variable interval. Furthermore, in general, Method 1 is a method of continuously performing a channel sensing operation on an unlicensed band in which uplink signal transmission has been configured at given timing. In Method 1, for example, the channel sensing operation may be performed at the location where the channel sensing operation may be terminated right before the start of the first symbol transmitted as a channel sensing period in an uplink subframe in which uplink signal transmission has been configured or the channel sensing operation may be performed at the starting timing of the last OFDM symbol in a subframe right before the uplink subframe in which uplink signal transmission has been configured. In this case, a channel occupancy signal may be transmitted until the time right before the start of the first symbol transmitted in the uplink subframe in which uplink signal transmission has been configured. Furthermore, the channel sensing operation may be performed the first OFDM/or SC-FDMA symbol in the uplink subframe in which uplink signal transmission has been configured. In this case, the channel sensing operation may be performed in the first OFDM/or SC-FDMA symbol in the configured uplink subframe. In the above case, the channel sensing operation may be performed at the location where the channel sensing operation may be terminated right before the start of the second OFDM or SC-FDMA symbol in the uplink subframe or the channel sensing operation may be performed at the starting timing of the first OFDM or SC-FDMA symbol in a subframe of the uplink subframe in which uplink signal transmission has been configured. In this case, the channel occupancy signal may be performed right before the start of the second symbol transmitted in the uplink subframe in which uplink signal transmission has been configured.

A UE in which uplink signal transmission has been configured in an unlicensed band as in Method 2 may perform a channel sensing operation on an unlicensed band in which uplink signal transmission has been configured during a fixed channel sensing period prior to the configured uplink signal transmission. At this time, when the end timing of the channel sensing operation is earlier than the transmission timing of the configured uplink signal, the UE may transmit an occupancy signal for occupying the channel from the end timing of the channel sensing operation to the transmission timing of the uplink signal. At this time, when the channel sensing operation is terminated right before the transmission timing of the uplink signal, the occupancy signal may not be transmitted. In this case, the occupancy signal may be any one of an implementation signal or a signal (e.g., PRACH) or SRS signal of a preamble form which may be differently transmitted depending on a UE implementation. Method 2 is a method of performing a channel sensing operation on an unlicensed band in which uplink signal transmission has been configured during a fixed channel sensing period at fixed timing, in general. In Method 2, for example, the channel sensing operation may be performed at the location where it may be terminated right before the start of the first symbol transmitted in an uplink subframe in which uplink signal transmission has been configured or the channel sensing operation may be performed at the starting timing of the last OFDM symbol in a subframe right before an uplink subframe in which uplink signal transmission has been configured. In this case, a channel occupancy signal may be transmitted up to the time right before the start of the first symbol transmitted in the uplink subframe in which uplink signal transmission has been configured. Furthermore, the channel sensing operation may be performed in the first OFDM/or SC-FDMA symbol in the uplink subframe in which uplink signal transmission has been configured. In the above case, the channel sensing operation may be performed at the location where it may be terminated right before a second OFDM or SC-FDMA symbol start in the uplink subframe or the channel sensing operation may be performed at the starting timing of the first OFDM or SC-FDMA symbol in a subframe of the uplink subframe in which uplink signal transmission has been configured. In this case, the channel occupancy signal may be transmitted up to the time right before the start of the second symbol transmitted in the uplink subframe in which uplink signal transmission has been configured.

In Method 3, a UE transmits an uplink signal in an uplink subframe in which uplink signal transmission has been configured without a separate channel sensing operation.

A BS may configure an uplink transmission method of a UE in the UE through system information transmission through a higher signal or broadcasting channel, through a downlink control channel, etc. In this case, the uplink transmission method of the UE may be divided into a grant-based transmission method for the UE to receive uplink transmission configuration information from the BS and to perform uplink transmission based on the received uplink transmission configuration and a grant-free transmission method for the UE to performs uplink transmission even without receiving separate uplink transmission configuration information from the BS. In this case, the UE does not separately operate according to the grant-based transmission method or the grant-free transmission method, but the UE may support both the grant-based transmission method and the grant-free transmission method. For example, when a UE configured with a grant-free transmission method receives uplink transmission configuration information through a downlink control channel from a BS, the UE may perform uplink transmission according to a grant-based transmission method using uplink transmission configuration information most recently received from the BS. In this case, the UE may perform the uplink transmission using only some of the uplink transmission configuration information most recently received from the BS.

A BS may configure an uplink transmission method in the BS or cell with respect to a UE through a higher signal. A method for the BS to configure the uplink transmission method of the UE through a higher signal with respect to the UE is as follows. The BS may configure the uplink transmission method for a cell as a grant-free transmission method with respect to the UE by adding a field regarding the uplink transmission method of the UE to RRC configuration information on a given BS or cell (or SCell or transmission and reception point (TRP)), for example, a grant-free UL transmission field and setting the field value as true. In this case, the UE that has received the RRC field value as false may determine that the uplink transmission method for the cell is configured as a grant-based transmission method of receiving uplink control information from the BS and transmitting the uplink control information. The classification of the RRC field and the uplink transmission method is only one example, but the disclosure is not limited thereto.

A BS may transmit an uplink transmission method in a BS or cell to one or more UEs through system information transmission through a broadcasting channel of the BS or cell. In this case, a method for the BS to transmit or configure the uplink transmission method of the UE with respect to the UE through system information transmission using the broadcasting channel is as follows. The BS or cell (or SCell or transmission and reception point (TRP)) may transmit (or broadcast) system information (e.g., master information block (MIB) or system information block (SIB)) information on a corresponding cell to one or more UEs periodically or aperiodically. In this case, the broadcasting channel means a channel which may be received by a plurality of UEs through a previously defined single identifier (e.g., system information RNTI). In this case, the system information may additionally include configuration information on a grant-free transmission method, for example, at least one of time and frequency resource information capable of grant-free transmission in addition to a configuration regarding the uplink transmission method of the cell. If the uplink transmission method of the cell is configured as a grant-based transmission method, time, frequency resource information capable of grant-free transmission may not be included or the UE may neglect time, frequency resource information capable of grant-free transmission although the time, frequency resource information is included.

A BS may configure an uplink transmission method of a UE through a downlink control channel of the BS. A method for the BS to configure the uplink transmission method of the UE through a downlink control channel of the BS is as follows. The BS may transmit a common control channel (or cell-specific search space) or group common control channel (or group-specific search space), among the downlink link control channels of the BS configuring the uplink transmission method of the UE, by adding an uplink transmission method field to the control channel. In this case, the common control channel or group common control channel means that the UEs of all groups or a given group receive the same control information, hereinafter, common control information from the BS through an identifier (e.g., group RNTI or CC-RNTI) previously defined in given UEs and configured by the BS. For example, the BS may configure an uplink transmission method of a UE, included in a group, by adding a field regarding an uplink transmission method of the group, among information on uplink transmission transmitted in a group common control channel. For example, when the field is set to 1 by adding an uplink transmission method or a type field or a field that transmits information on whether an uplink transmission configuration is present or not, for example, a 1-bit field, UEs that have received the control channel may perform uplink transmission to a BS or cell as a grant-free transmission method. In this case, when the field is set to 0, the UEs that have received the control channel may perform uplink transmission to the BS or cell as a grant-based transmission method. In this case, the added field and a method of configuring the field are only one example, and may be configured as a field of 1 bit or more. For example, an uplink transmission method of UEs may be configured by dividing the transmission method into a grant-free transmission method, a grant-based transmission method, and a mixture of the grant-free transmission and the grant-based transmission method through the addition of a 2-bit field.

A UE configured with an uplink transmission method as a grant-free transmission method as described above may select at least one of variables (e.g., a time resource region, a frequency resource region, an MCS, a PMI and an RI) related to at least uplink transmission, and may transmit the variables. For example, as in FIG. 3E, a BS that has configured a grant-free transmission method in a UE may configure, in the UE, periodical time resource region information capable of grant-free uplink transmission using one of the various configuration method described in the embodiments. The UE may select variables that need to be additionally configured when it performs uplink transmission, for example, a frequency resource region in which uplink transmission is actually performed, in addition to the configured time domain information capable of grant-free transmission, and may transmit the variables. In this case, the BS may previously configure a candidate or set value that may be selected from uplink transmission-related variables capable of being selected by the UE, for example, an MCS set (QPSK, 16QAM), frequency start region information capable of grant-free transmission, in the UE, and may select a configuration value that belongs to the configured candidate groups and that may be used by the UE for uplink transmission. In this case, an example in which the time resource region is previously configured and the frequency resource is randomly selected is only one example, and a UE may select some or all of the variables necessary for the uplink transmission, including variables other than the variables necessary for the uplink transmission.

If, as described above, at least one of pieces of transmission configuration information on grant-free transmission (e.g., a time, frequency resource region, an MCS, a DMRS sequence, DMRS cyclic shift information, a subframe structure capable of grant-free transmission or the number of symbols or a minimum symbol number used for grant-free transmission) is previously defined between a BS and a UE, a UE may be configured with or may receive the information through a higher signal transmitted by the BS or a UE is configured with the information by receiving system information (e.g., MIB) transmitted through a broadcasting channel transmitted by a BS or system information (e.g., SIB) transmitted through a downlink data channel, the BS cannot change configuration information related to the grant-free transmission dynamically (e.g., a 1 ms unit or a minimum unit by which data or a control signal may be transmitted). For example, in a system operating based on TDD, if a UE configured with grant-free transmission is present, a BS cannot change uplink and downlink subframes dynamically based on a grant-free transmission configuration value of the UE. More specifically, assuming that a BS has configured, in a UE, a time resource region capable of grant-free transmission in a 10 ms cycle through a higher signal or SIB, the BS cannot use a subframe, configured as the resource region capable of uplink grant-free transmission in the UE, as downlink transmission. For another example, in a system operating in an unlicensed band, assuming that a BS has configured, in a UE, a time resource region capable of uplink grant-free transmission through a higher signal or SIB according to the channel access procedure of the BS or the UE, the BS cannot efficiently use the grant-free transmission resource because it cannot predict the results of the channel access procedure of the BS and the UE. Accordingly, the disclosure proposes various methods capable of efficiently changing at least one of pieces of uplink grant-free transmission information configured by a BS. If at least one of the various methods proposed in the disclosure are used, a BS can use a grant-free transmission resource configured in a UE more efficiently, and can control grant-free transmission in a pre-configured grant-free transmission resource.

In the disclosure, for convenience of description, a minimum unit of downlink and uplink transmission between a BS and a UE is represented as a slot. In other words, a BS may transmit a downlink control channel to a BE every slot. Furthermore, in the disclosure, for convenience of description, a configuration and change that belong to grant-free transmission configuration information and that are related to a time resource are described below, but the method proposed in the disclosure may also be applied to information configuration and change regarding grant-free transmission, including a frequency resource, in addition to a time resource. Furthermore, inventions proposed in Embodiments 2-1 and 2-2 are not limited to the respective embodiments and may be applied to inventions proposed in the entire disclosure. In other words, a problem to be solved in the disclosure may be solved using some of or the entire embodiment 2-1 and some of or the entire embodiment 2-2.

Embodiment 2-1

The present embodiment relates to a method for a BS to notify a UE of whether grant-free transmission in a slot is possible or grant-free transmission-capable slot information through a downlink control channel.

A given UE configured to be capable of grant-free transmission by the BS, a given group of UEs configured to be capable of grant-free transmission by the BS or all UEs configured to be capable of grant-free transmission may be notified of information on a grant-free transmission-capable slot in a slot n through a downlink control channel. More specifically, the BS may notify a given UE configured to be capable of grant-free transmission by the BS, a given group of UEs configured to be capable of grant-free transmission by the BS or all UEs configured to be capable of grant-free transmission of information on a grant-free transmission-capable resource using the following four types of methods in a slot n or a given slot right before the slot n (e.g., slot capable of the most recent downlink control channel transmission right before the slot n) or a slot n and a slot capable of the most recent downlink control channel transmission right before the slot n. In this case, the UE may be notified of information on a grant-free transmission-capable resource using at least one of the four types of methods in addition to a selected method of the four types of methods.

Method 1) slot (slot n) in which a downlink control channel delivering a common control signal including whether grant-free transmission is possible is transmitted, or Method 2) subsequent k1 slots (e.g., from the slot n to a slot n+k1), including a slot in which a downlink control channel delivering a common control signal including whether grant-free transmission is possible is transmitted, or Method 3) a slot (e.g., slot n+k2) subsequent to k2 in a slot in which a downlink control channel delivering a common control signal including whether grant-free transmission is possible is transmitted, or Method 4) subsequent k1 slots (from the slot n+k2 to a slot n+k2+k1), including the slot after k2 in the slot in which a downlink control channel delivering a common control signal including whether grant-free transmission is possible is transmitted. UEs that have received the control information may be notified of a grant-free transmission-capable slot with respect to at least one of the four types of methods. In this case, the k1 may be applied to k1 contiguous slots or k1 non-contiguous slots. In other words, in the case of a contiguous slot, the k1 slots mean contiguous k1 slots regardless of a configuration for the transmission direction of the slot, in other words, regardless of whether the k1 slots are downlink transmission slots or uplink transmission slots. In this case, a UE does not perform grant-free transmission on a slot that belongs to slots configured as grant-free transmission-capable slots and that is determined to be a downlink transmission slot through a downlink control channel received from a BS or through blind detection for a reference signal. In the case of a non-contiguous slot, a UE may use only k1 slots that belong to the slots and that are determined to be uplink transmission slots or may use only k1 slots that belong to slots pre-configured by the UE as grant-free transmission-capable slot among the slots and that are determined to be uplink transmission slots.

If a UE has been configured with a grant-free transmission-capable resource (or slot) previously defined or through a higher signal or SIB from a BS, when the UE receives information on the grant-free transmission-capable slot (or resource) as described above from the BS through a downlink control channel, the UE may compare the grant-free transmission-capable slot previously defined or received through a higher signal or SIB with a grant-free transmission-capable slot received from the BS through a downlink control channel, and may perform grant-free transmission on only a slot applied to the two configurations in common.

The k1 slots for grant-free transmission operating in an unlicensed band may mean slots on which the BS has actually performed downlink transmission or only slots on which the UE has actually performed uplink transmission. That is, a slot used for a channel access procedure may not be included in the k1 slots.

A UE may be configured with or may receive the grant-free transmission-capable slot information through a common control signal that may be transmitted through a downlink control channel transmitted by a BS. In this case, the grant-free transmission-capable slot information may be transmitted from the BS to the UE through at least one method of a 1-bit field within the common control signal or a bitmap. The 4) is described using a bitmap. A BS may notify a UE of whether grant-free transmission for the k1 slots is possible using k1 bits in a common control signal or a bitmap of a k1 length. As another method, a BS may transmit start slot information on the grant-free transmission-capable slot and grant-free transmission-capable last slot information to a UE. In this case, at least one of the four types of methods of notifying the UE of a grant-free transmission-capable slot through the common control signal may be previously defined between the BS and the UE or the BS may select one of the four types of methods and configure, the selected method in the UE through a higher signal.

Embodiment 2-2

The present embodiment relates to a method for a UE to determine whether grant-free transmission is possible or a grant-free transmission-capable slot with respect to a case where a BS does not notify the UE of whether grant-free transmission in a slot is possible or grant-free transmission-capable slot information through a downlink control channel.

A BS may configure a given UE, a UE group or all UEs so that a grant-free transmission method of uplink transmission methods is possible through system information transmission, such as a higher signal or SIB. In this case, UEs configured to be capable of grant-free transmission may be configured with or may receive configuration information related to grant-free transmission (e.g., at least one of grant-free transmission-capable time or slot information or cycle or frequency assignment information (RB or subband information or interlace index information or the number of symbols used for the grant-free transmission) or a minimum symbol number of grant-free transmission for determining a slot valid for the grant-free transmission, a channel access procedure type, priority class used for a channel access procedure or a DMRS sequence, a cyclic shift and MCS information used for the grant-free transmission) from a BS along with system information, such as a higher signal or SIB that performs a configuration to enable the grant-free transmission method or through system information, such as a higher signal or SIB different from the configuration information. In this case, at least one of the pieces of configuration information related to the grant-free uplink transmission may be configured as one or more values or a set or a candidate group. For example, in the case of the MCS, a BS may configure modulation candidate groups that may be used by a UE for grant-free transmission. The UE may select one of the candidate groups and perform grant-free transmission. In the case of the MCS, there is only one piece of configuration information related to grant-free transmission which may be configured as a candidate group. The disclosure may also be applied to a case where a configuration value necessary to perform grant-free uplink transmission, including the MCS, is configured as a candidate group.

Figure 2E:
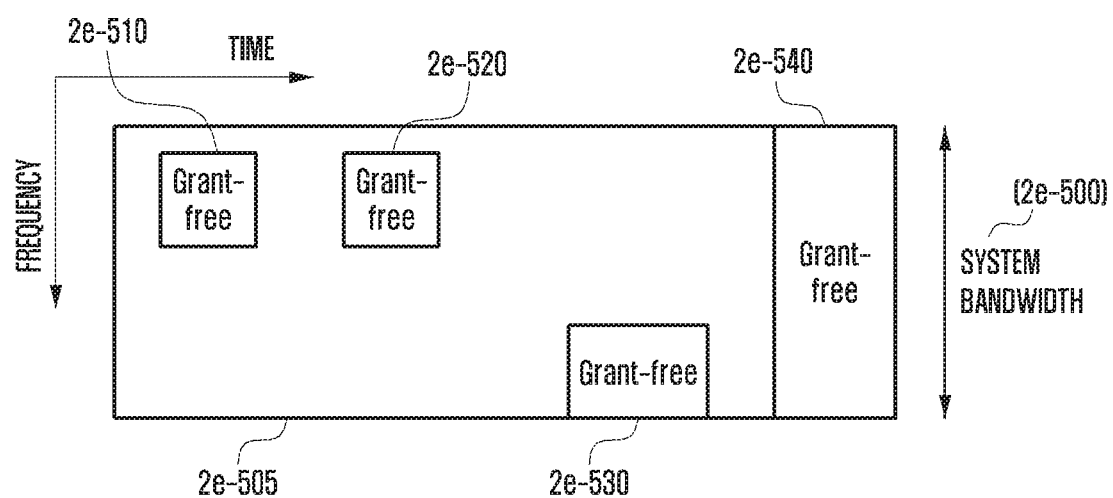
FIG. 2E is a diagram showing a time and frequency resource region in which a UE may perform grant-free uplink transmission.

For example, a BS that has configured a grant-free transmission method in a UE as in FIG. 2E configures grant-free uplink transmission-capable periodic time resource region information or slot information in the UE. If the UE requires uplink transmission in the configured grant-free transmission-capable time domain, the UE may select variables that need to be configured in performing grant-free uplink transmission in addition to the configured time information, for example, a frequency resource region and an MCS in which actual uplink transmission is performed, and may perform grant-free transmission. In this case, the UE is not configured with a grant-free uplink transmission-capable periodical time resource region, but may be configured with an aperiodic time resource region. Furthermore, grant-free transmission-capable frequency domain information may be fixed or identical in the configured grant-free uplink transmission-capable time resource region or may be changed depending on a grant-free uplink transmission-capable time resource region. In this case, the start point of the grant-free transmission-capable frequency domain may be fixed or identical in the configured grant-free uplink transmission-capable time resource region. In other words, the grant-free transmission frequency domain may vary depending on a grant-free transmission time domain, but the start point of the grant-free transmission frequency domain may be identically configured.

In a system in which downlink and uplink transmission may dynamically change in a slot or a plurality of slots or a subframe unit (hereinafter a dynamic TDD system) or a system operating in an unlicensed band, however, as described above, a BS may use a pre-configured grant-free transmission region for downlink information transmission. Specifically, the BS may use at least some of a time and frequency resource region, pre-configured as a grant-free transmission region, for downlink control information transmission or downlink data information transmission in order to transmit downlink control information, such as a synchronization signal, system information or a reference signal. Accordingly, if a BS performs downlink signal transmission in a region or slot pre-configured as a grant-free transmission region and a UE configured with grant-free transmission performs grant-free uplink transmission, both downlink and uplink signal transmission and reception cannot be correctly performed.

In general, the downlink control information transmission of a BS is more important than the grant-free uplink transmission of a UE. A UE configured to be capable of a dynamic TDD operation form a BS as described above or a UE configured to be capable of downlink and uplink transmission in an unlicensed band from a BS needs to determine whether grant-free transmission for a corresponding slot is possible prior to grant-free transmission.

A method for a UE to determine whether grant-free transmission in a slot n is possible is as follows.

Method 1: determine whether grant-free transmission is possible based on received slot structure information when the UE receives slot structure information on one or more slots is received from a BS Method 2: determine whether grant-free transmission is possible based on configured downlink control signal transmission time information when there is information configured by a BS with respect to a downlink control signal transmission time or slot Method 3: determine whether grant-free transmission is possible after performing a channel access procedure in all slots regardless of a slot configured as an uplink transmission slot or a downlink and uplink transmission slot Method 1 is described more specifically below. A BS may transmit common control information to one or more UEs or a UE group or all UEs through a common control channel in a slot n through a downlink control channel. When slot structure information on one or more slots, for example, transmission architecture for the slot n or a slot n+1 or slots n and n+1 (e.g., at least one symbol number or length of the number of downlink transmission symbols or the number of uplink transmission symbols or the number of symbols for a guard period or the number of symbols in which an uplink control signal is transmitted or configuration information of a corresponding slot configuration) or information on a transmission direction (downlink or uplink or empty subframe or unknown slot or subframe) is received in the common control information, the UE may determine whether to perform grant-free transmission in the slot n based on the received information.

A detailed example is described below. In a UE that has received configuration information on the slot n transmitted through the common control information, If the slot n has been configured as an uplink transmission slot or the number of symbols whose uplink data transmission in the slot n configured through common control information is valid is equal to or greater than the number of grant-free transmission symbols pre-configured through grant-free transmission configuration information or the number of symbols whose uplink data transmission in the slot n is valid is greater than a given threshold pre-configured through grant-free transmission configuration information, the UE may perform grant-free transmission. If the slot n has been configured as a downlink transmission slot or the number of symbols whose uplink data transmission in the slot n is valid, configured through common control information, is smaller than the number of grant-free transmission symbols pre-configured through grant-free transmission configuration information or the number of symbols whose uplink data transmission in the slot n is valid is smaller than a given threshold pre-configured through grant-free transmission configuration information, the UE may not perform grant-free transmission.

Another example is described below. A BS may transmit, to one or more UEs, slot structure information on one or more slots, including a slot n (e.g., at least one symbol number or length of the number of downlink transmission symbols or the number of uplink transmission symbols or the number of symbols for a guard period or the number of symbols in which an uplink control signal is transmitted or configuration information of a corresponding slot configuration) or information on a transmission direction (downlink or uplink or empty subframe or unknown slot or subframe) through a common control channel in the slot n. For example, a BS may notify a UE that a slot n and a slot n+1 are downlink transmission slots and a slot n+k to a slot n+k+m are uplink transmission slot in the slot n through common control information. In this case, the uplink transmission slot means a grant-based uplink transmission slot (hereinafter an uplink transmission slot) in which a UE that has received uplink control information (UL grant) from a BS performs uplink transmission based on the received UL grant information. In this case, the UE configured with the grant-free transmission may determine a slot other than the downlink or uplink transmission slot or a slot between the downlink transmission slot and the uplink transmission slot notified through the common control information or a slot prior to an uplink transmission start slot from the last downlink transmission slot among downlink transmission slots notified through the common control information to be a grant-free transmission-capable slot based on the common control information. In this case, if the slot determined to be the grant-free transmission-capable slot is determined to be a slot configured with downlink transmission through at least one piece of information of system information, such as a higher signal, an MIB and an SIB, common control information or a downlink transmission-capable candidate slot, the UE may not perform grant-free transmission in the slot. An LTE system is described more specifically as an example. A BS may transmit, to a UE, at least one of downlink transmission subframe information, start subframe information on the start of an uplink subframe, and uplink subframe period information through a common control channel (DCI scrambled with a Group-RNTI or a CC-RNTI) in a subframe n. In this case, the common control information transmitted in the subframe n indicates that downlink transmission subframe information indicates the number of symbols used for downlink signal transmission in one or more downlink subframes including the subframe n, for example, a subframe n+1 in addition to information related to a signal transmission direction (downlink or uplink). Furthermore, the common control information may include initial uplink transmission subframe (uplink subframe offset) and uplink transmission subframe period information on the basis of the subframe n in which the common control information is transmitted. In this case, a UE may determine a subframe after the last downlink transmission subframe in downlink transmission subframe information transmitted from the common control information to a subframe prior to the first uplink transmission subframe transmitted from the common control information to be grant-free transmission-capable subframes.

If a grant-free transmission slot is determined based on downlink transmission slot information and uplink transmission slot information without indicator information on a grant-free transmission slot as described above, the common control information includes information on one uplink transmission slot. Accordingly, in the above case, although a BS does not attempt to perform grant-based transmission, the BS inevitably provides notification that at least one slot is a grant-based uplink transmission slot. In other words, at least one slot cannot be used for at least one slot grant-free uplink transmission. In order to solve this problem, a BS may notify a UE configured with grant-free transmission that some or all of uplink transmission slots transmitted through the common control information are grant-free transmission-capable slots or grant-free transmission-valid slots by adding a new field (e.g., grant-free indication of 1 bits or autonomous UL indication) to the common control information. For example, if a new bit string of 1 bit has been added to the common control information, if bit information is set to 0, a UE does not perform grant-free transmission in all uplink transmission slots indicated in the common control information. If the bit information is set to 1, the UE may determine that it may perform grant-free transmission in all uplink transmission slots indicated in the common control information. If a new bit string of 2 bits has been added to the common control information, if the bit information is set to 00, the UE may determine that it does not perform grant-free transmission in all uplink transmission slots indicated in the common control information. If the bit information is set to 11, the UE may determine that it may perform grant-free transmission in all uplink transmission slots indicated in the common control information. If the bit information is set to 01 or 10, the UE may determine that it may perform grant-free transmission in some of uplink transmission slots indicated in the common control information. In this case, information on a slot in which grant-free transmission may be performed in the bit information 01 or 10 may be previously defined or slot information corresponding to each piece of bit information may be configured through a higher signal or the information may be differently configured based on an uplink transmission slot period (or length). For example, a UE that has received the bit information 01 may determine that it may perform grant-free transmission in the first K slots or last K slots in the indicated uplink transmission slot period. A UE that has received the bit information 10 may determine that it may perform grant-free transmission in the first M slots or last K slots in the indicated uplink transmission slot period.

In this case, with respect to the above case, a slot may be determined to be a grant-free transmission-capable slot or a grant-free transmission-valid slot according to a method previously defined between a BS and a UE or a method configured by a BS through a higher signal even without adding a new field (e.g., grant-free indication of 1 bits or autonomous UL indication) to the common control information. For example, if a BS transmits information on an uplink transmission-capable subframe or slot to a UE through an UL duration and offset field in the common control information, the UE that has received the information may perform grant-free transmission in an uplink transmission subframe or slot period transmitted through the common control information when the UL duration indicates X (e.g., X=1). When the UL duration is greater than X, the UE does not perform grant-free transmission in an uplink transmission subframe or slot period transmitted through the common control information. In this case, the UE may be configured to or to not perform grant-free transmission at the X value and in an uplink transmission subframe or slot period transmitted through the common control information based on the X value through a higher signal from a BS.

In this case, if the BS transmits information on an uplink transmission-capable subframe or slot to the UE through an UL duration and offset field in the common control information, the UE that has received the information may determine that it may perform grant-free transmission in the entire uplink transmission subframe or slot period transmitted through the common control information. In this case, the UE may be configured to or to not perform grant-free transmission in the entire uplink transmission subframe or slot period, transmitted through the common control information, through a higher signal from a BS.

Method 2 is described more specifically below. A BS may configure, in a UE, information on a slot in which a downlink control signal (e.g., at least one of a synchronization signal, system information (MIB and/or SIB), a reference signal, a discovery signal) is transmitted through a higher signal or other system information (MIB and/or SIB) or a slot or time in which the control signal is transmitted may be previously defined between the BS and the UE. In this case, a discovery signal includes at least one synchronization signal. In this case, a frequency location in addition to the time when the downlink control signal is transmitted may be previously defined or may be configured in the UE through a higher signal. For example, a synchronization signal in a current LTE FDD system has been previously defined to be transmitted in 6 RBs at the center of a system bandwidth in the sixth and seventh symbols of subframes 0 and 5. Furthermore, a discovery signal in a current LTE FDD system may transmit one synchronization signal (PSS/SSS) and five reference signals (CRS port 0) in a maximum of 5 contiguous subframes, for example, in a 40 ms cycle. In this case, a UE is configured with configurations related to a discovery signal, such as the discovery signal transmission cycle and the discovery signal transmission interval, through a higher signal from a BS.

Accordingly, a UE may determine whether grant-free transmission is possible in a slot n by comparing a time and frequency domain in which a downlink control signal previously defined or configured by a BS as described above is transmitted with a pre-configured grant-free transmission-capable time and frequency domain. For example, if a time, frequency domain in which a downlink control signal previously defined between a UE and a BS or configured in the UE through a higher signal or system information from the BS as described above overlaps some of or the entire grant-free transmission-capable region, the UE does not perform grant-free transmission in the entire time, frequency domain in which grant-free transmission has been configured or may perform grant-free transmission using the remaining regions other than an overlap region. For example, if a slot n is a slot previously defined to transmit a periodically transmitted downlink control signal, such as a synchronization signal or discovery signal, if a UE is pre-configured to be capable of grant-free transmission in a slot n−1, the slot n, a slot n+1, and a slot n+2, the UE does not perform grant-free transmission in all of the slot n−1, the slot n, the slot n+1, and the slot n+2 or may perform grant-free transmission in the slot n−1, the slot n+1, and the slot n+2 other than the slot n in which the downlink control signal is transmitted. As another example of Method 2, uplink grant-free transmission may be performed in a slot after a slot in which the downlink control signal of a BS has been actually transmitted among a slot n−1, a slot n, a slot n+1, and a slot n+2 pre-configured to be capable of grant-free transmission. The method may be valid for a system operating in an unlicensed band. That is, in the case of the unlicensed band, actual transmission timing of a downlink control channel of a BS may vary depending on the results of a channel access procedure. In other words, the BS may transmit a control signal (e.g., discovery signal) in a slot n−1 or slot n+1 not a slot n. In the above case, the control information transmission of a BS is relatively more important than the grant-free transmission of a UE. Accordingly, if the downlink control signal transmission region of the BS and the grant-free transmission region of the BS overlap as described above, the UE may perform grant-free transmission after a slot in which the downlink control signal of the BS is transmitted. In this case, in other words, the UE may determine a time or slot after the downlink control signal transmitted by the BS is received to be a grant-free transmission-capable interval, and may perform grant-free transmission. The above example is described more specifically. The UE may be configured with information (e.g., at least one of cycle information, offset information, period information) on a time or slot or subframe in which a downlink control signal, such as a synchronization signal or discovery signal, may be transmitted from the BS through a higher signal or the information may have been previously defined between the BS and the UE. A discovery signal is described as an example. A BS may configure discovery signal configuration (discovery signal measurement timing configuration (DMTC)) information, including time information (at least one information of a discovery signal transmission cycle and period, a discovery signal start timing (offset)) in which a discovery signal may be transmitted through a higher signal, in a UE. In this case, the BS may transmit the discovery signal in a time (slot or subframe) configured through the discovery signal configuration of the discovery signal transmission-capable interval (e.g., 6 ms). In this case, if the discovery signal is transmitted through an unlicensed band, the BS may transmit the discovery signal in one subframe of the configured discovery signal transmission-capable interval. In other words, if the discovery signal is transmitted through an unlicensed band, the time when the discovery signal is transmitted may vary based on a result of a channel access procedure within the configured discovery signal transmission interval. In this case, the downlink control signal transmission of the BS is relatively more important than the grant-free transmission of the UE as in the discovery signal. Accordingly, the UE may determine that the entire discovery signal transmission interval configured by the BS to be not valid for grant-free transmission or may receive the discovery signal transmitted by the BS in the discovery signal transmission interval configured by the BS, may determine that grant-free transmission is valid in a subsequent time (slot or subframe), and may perform grant-free transmission.

In other words, the UE may determine a downlink control signal (e.g., a periodically transmitted downlink control signal, such as a synchronization signal or a discovery signal) transmission interval, previously defined along with a BS or configured through a higher signal, to be an interval in which grant-free transmission is not valid and may not perform pre-configured grant-free transmission or may determine grant-free transmission to be valid in the remaining time intervals other than the time interval in which a downlink control signal is actually transmitted in the downlink control signal transmission interval, and may perform grant-free transmission. In this case, the UE may determine grant-free transmission to be valid in the remaining time interval after the time interval in which a downlink control signal is actually transmitted in the downlink control signal transmission interval, and may perform grant-free transmission. In this case, the downlink control signal may include a downlink control signal, such as a CSI-RS and a phase tracking RS (PT-RS). In this case, the grant-free transmission may be rate-matched with a portion where the downlink control signal is transmitted and transmitted or a portion in which the downlink control signal is transmitted during the grant-free transmission may be punctured and transmitted.

Method 3 is described more specifically below. In this case, Method 3 may be applied to all systems operating in a licensed band and an unlicensed band. A channel access procedure in a system operating in a licensed band may have one or more different configurations compared to a channel access procedure performed for channel access in an unlicensed band. For example, in the channel access procedure in the licensed band, a reception signal threshold to determine whether channel access is possible may be set differently from a value of an unlicensed band. Furthermore, the channel access procedure may include performing the reference signal detection of a BS or UE. In this case, the UE may receive a configuration regarding the channel access operation from the BS through grant-free transmission configuration information.

In Method 3, a UE needs to perform a channel access operation before it performs grant-free transmission in a slot n. In order to determine whether grant-free transmission is possible through a channel access procedure as in Method 3, the locations of a downlink signal transmission starting timing or symbol in the slot n, a grant-based uplink signal transmission starting timing or symbol, and a grant-free uplink signal transmission starting timing or symbol may be differently configured. For example, downlink signal and grant-based uplink signal transmission in a slot n may be configured to start at a symbol index 0, and grant-free uplink signal transmission may be previously defined or configured through a downlink control signal so that it starts at a symbol index 1. In this case, a UE attempting to perform grant-free uplink signal transmission performs a channel access operation prior to the grant-free transmission start, and may perform or not perform grant-free transmission based on a result of the channel sensing operation. For example, when received signal intensity of a given reference or more is measured in the channel sensing operation, the UE may determine that the slot has been used for the downlink of a BS or for the grant-based uplink transmission of another UE, and may not perform grant-free transmission. In other words, by configuring the starting timing of grant-free uplink signal transmission later than the starting timing of downlink signal transmission and grant-based uplink signal transmission as described above, there is an effect in that grant-free uplink transmission is not performed in the time (slot or subframe) in which a downlink or grant-based uplink signal is transmitted. In this case, downlink signal transmission, grant-based uplink signal transmission, and grant-free uplink signal transmission may be classified as described above by differently configuring (so that downlink and grant-based transmission are performed earlier than grant-free transmission) configuration information (e.g., at least one piece of information of an LBT priority class, a Defer period, a maximum contention window size (CWS), CWS change requirements) on at least one of a channel access procedure for the downlink signal transmission, a channel access procedure for the grant-based uplink signal transmission, and a channel access procedure for the grant-free uplink signal transmission.

In this case, the timing or symbol location where the channel access operation is performed to determine whether grant-free transmission is possible may be previously defined between the BS and the UE or the BS may deliver or configure the timing or symbol location to the UE through downlink control information. In this case, the UE may be configured or indicated with the grant-free uplink transmission starting timing or symbol in a grant-free transmission slot from the BS. For example, the grant-free transmission in the slot n may be configured to start from the k-th symbol (e.g., symbol index #1) of the slot n symbol. In this case, the UE may perform a channel access procedure prior to the k symbol. In this case, the location of the grant-free transmission start symbol may be previously defined or may be included in grant-free transmission configuration information and configured through a higher signal or SIB. In this case, the location of the grant-free transmission start symbol may be included in a common control signal transmitted through a downlink control channel of the BS and may be transmitted. If downlink signal transmission starting timing and grant-based uplink transmission starting timing are previously defined or configured through a higher signal or SIB as k−m1 and k−m2 (m1>0, m2>0, m1, m2 may be the same or different), respectively, a UE configured to be capable of grant-free transmission in the slot n may perform a channel sensing operation on a band prior to the grant-free transmission starting timing (e.g., k−1symbol) in a grant-free transmission-capable region, and may perform or not perform grant-free transmission based on a result of the channel sensing operation.

Another example is described. The grant-free transmission start symbol of a UE may be different depending on a channel access procedure that needs to be performed by the UE for grant-free transmission. For example, the transmitted start timing or symbol of grant-free transmission after an unlicensed band is sensed during a variable time period, after the method 1 (or type 1) channel access procedure of transmitting an uplink signal, may be previously defined or configured through a higher signal as a time or symbol after the transmitted start timing or symbol of grant-free transmission after an unlicensed band is sensed during a fixed time interval, after the method 2 (or type 2) channel access procedure of transmitting an uplink signal or may be indicated based on downlink control information.

In general, a case where a UE transmits an uplink signal by performing the type 1 channel access procedure corresponds to a case where the UE has been configured or scheduled to transmit the uplink signal by a BS by performing the type 1 channel access procedure, but the BS has not occupied the unlicensed band. At this time, the BS may be performing a channel access procedure for downlink signal transmission or may not be performing a channel access procedure because downlink signal transmission is unnecessary. At this time, if a UE in which a slot or subframe n has been configured to be a grant-free transmission-capable time attempts to perform the type 1 channel access procedure and to perform grant-free transmission, when the BS performs a channel access procedure in order to transmit a downlink signal in the slot or subframe n, the channel access procedure of the BS may fail due to the grant-free transmission of the UE. In general, the downlink signal transmission of a BS must be given priority over the grant-free transmission of a UE. Furthermore, in general, the downlink signal transmission of a BS starts from the first symbol of a slot or subframe. Accordingly, in order to prevent the channel access procedure of a BS from failing due to the grant-free transmission of a UE as described above, the grant-free transmission of the UE may start after the first symbol of a slot or subframe. For example, grant-free uplink transmission start time may be configured as the second symbol of an uplink transmission slot or subframe so that the downlink signal transmission of a BS or grant-based uplink signal transmission is given priority. That is, grant-free uplink transmission start time transmitted by a UE by performing the type 1 channel access procedure may be configured to be slower than the downlink signal transmission start time of a BS or grant-based uplink signal transmission start time so that the downlink signal and grant-based uplink signal transmission is given priority.

In general, if a UE transmits an uplink signal by performing the type 2 channel access procedure, if a BS occupies an unlicensed band through the type 1 channel access procedure and transmits or indicates an uplink transmission interval, configured by the BS in the unlicensed band, with respect to the UE through a common control channel in the occupied unlicensed band, if the UE that has received uplink transmission interval information from the BS through the common control channel performs uplink transmission configured within the uplink transmission interval, the UE transmits the uplink signal by performing the type 2 channel access procedure. In this case, the uplink transmission interval information transmitted or indicated from the BS to the UE through the common control channel is grant-based uplink transmission interval information. If the UE can determine a grant-free uplink transmission-capable interval (e.g., determine an interval right before an uplink transmission interval from the last downlink transmission interval to be a grant-free uplink transmission-capable interval according to the method proposed in Method 1) through downlink transmission interval information and grant-based uplink transmission interval information transmitted in the common control channel, the grant-free uplink transmission-capable interval does not have a collision between the downlink signal transmission of the BS and grant-based uplink transmission and grant-free uplink transmission. Accordingly, the UE may perform grant-free uplink signal transmission using the type 2 channel access procedure. In this case, the UE may separately receive grant-free uplink transmission-capable period information from the BS through a common control channel. In this case, the UE may perform grant-free uplink signal transmission using the type 2 channel access procedure. In other words, in the grant-free uplink transmission-capable interval configured or determined as described above, a collision does not occur between the downlink signal transmission of the BS and grant-based uplink transmission and grant-free uplink transmission. Accordingly, the start timing or symbol of grant-free uplink transmission transmitted by the UE may be configured to be equal to or faster than the start timing or symbol of grant-free uplink transmission transmitted by the UE by performing the type 1 channel access procedure. For example, the start timing or symbol of grant-free uplink transmission through the type 2 channel access procedure may be an uplink transmission slot or subframe boundary or the first symbol or may transmit a grant-free signal after timing X (e.g., after a grant-free signal transmission or X+timing adjustment (TA) value from 25 us time after a symbol 0 start time) necessary to perform the type 2 channel access procedure within the first symbol, and grant-free uplink transmission start time transmitted by the UE by performing the method 1 channel access procedure may become the second symbol of an uplink transmission slot or subframe.

In this case, the grant-free uplink transmission start time or symbol transmitted by the UE by performing the type 1 or type 2 channel access procedure is only one example. A grant-free transmission start time or symbol transmitted by a UE by performing the type 1 or type 2 channel access procedure may be previously defined between a BS and the UE or the grant-free transmission start time or symbol may be configured through a higher signal from the BS or may be indicated through downlink control information. In this case, the downlink control information may be downlink control information transmitted to activate at least one of the grant-free transmissions of the UE configured by the BS through the higher signal or may be common control information transmitted through a downlink common control channel.

For example, a grant-free transmission start time or symbol transmitted by a UE by performing the type 1 channel access procedure may be previously defined between a BS and the UE or may be configured through a higher signal from the BS. A grant-free transmission start time or symbol transmitted by a UE by performing the type 2 channel access procedure may be indicated by a BS through downlink control information. In this case, the UE may apply a grant-free transmission start time or symbol, indicated in the most recently received downlink control information, to grant-free transmission transmitted by a UE by performing the type 2 channel access procedure. If a UE has received one or more pieces of downlink control information in the same time or slot or subframe, the UE may apply a grant-free transmission start time or symbol, indicated in common control information, to grant-free transmission transmitted by the UE by performing the type 2 channel access procedure. In this case, the grant-free transmission start time or symbol transmitted by the UE by performing the type 2 channel access procedure may be previously defined between the BS and the UE or may be configured through a higher signal from the BS. If the UE has been indicated with a grant-free transmission start time or symbol through downlink control information, the UE may apply a grant-free transmission start time or symbol, indicated in the most recently received downlink control information, to grant-free transmission transmitted by the UE by performing the type 2 channel access procedure. If a UE has received one or more pieces of downlink control information in the same time or slot or subframe, the UE may apply a grant-free transmission start time or symbol, indicated in common control information, to grant-free transmission transmitted by the UE by performing the type 2 channel access procedure.

In this case, regarding a grant-free transmission end time or end symbol, a time or symbol prior to the last symbol of a slot or subframe in which the grant-free transmission is terminated may be previously defined differently depending on the type of a channel access procedure or may be configured by a BS. For example, grant-free transmission transmitted by a UE by performing the type 1 channel access procedure may be previously defined or configured by a BS so that it is transmitted only up to a symbol before the last symbol of the grant-free transmission slot or subframe. For example, in the case of a subframe including 14 symbols, grant-free transmission may be performed up to a 13-th symbol (or symbol index 12) in the subframe. In this case, the last symbol (or symbol index 13) of the subframe may be used for a BS to perform a downlink channel access procedure or for a UE configured with grant-based uplink signal transmission to perform a channel access procedure. Grant-free transmission transmitted by a UE by performing the type 2 channel access procedure may be configured through a higher signal configuration for the grant-free transmission or may be included in a grant-free transmission activation signal and indicated or may be included in common control information transmitted through a common control channel and indicated. For example, in the case of a subframe including 14 symbols, grant-free transmission may be performed up to a 13-th symbol (or symbol index 12) in the subframe or may be configured or indicated so that it is performed up to a 14-th symbol (or symbol index 13) in the subframe. If a UE is indicated with a grant-free transmission end time or symbol through downlink control information, the UE may apply a grant-free transmission end time or symbol, indicated in the most recently received downlink control information, to grant-free transmission transmitted by the UE by performing the type 2 channel access procedure. If a UE has received one or more pieces of downlink control information in the same time or slot or subframe, the UE may apply a grant-free transmission end time or symbol, indicated in common control information, to grant-free transmission transmitted by the UE by performing the type 2 channel access procedure. In this case, if the grant-free transmission is contiguous transmission in two or more slots or subframes, a grant-free transmission start time or symbol is applied to the first slot or subframe in which the grant-free transmission is performed, and a grant-free transmission end time or symbol is applied to the last slot or subframe in which the grant-free transmission is performed.

Figure 2F:
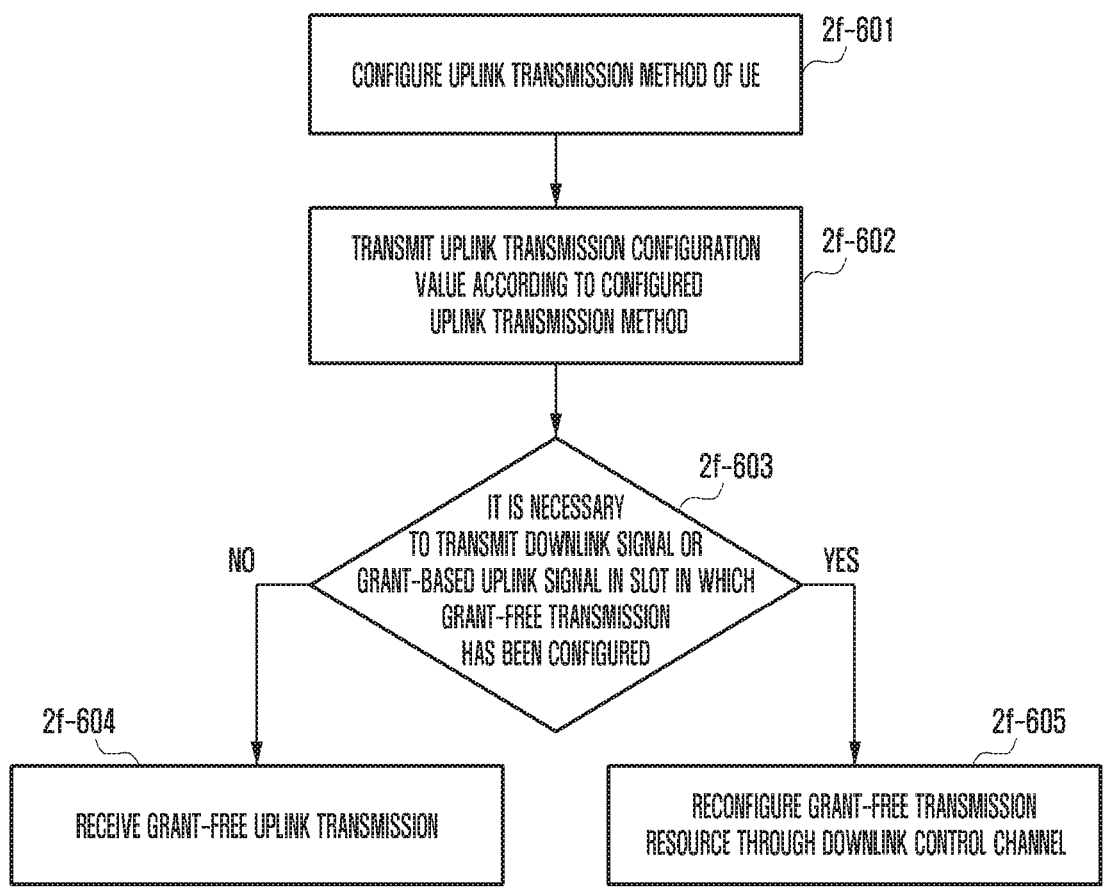
FIG. 2F is a diagram showing a BS operation according to an embodiment of the disclosure.

A grant-free uplink signal transmission resource configuration method of a BS proposed in the disclosure through FIG. 2F is described below. At operation 2f-601, a BS may configure, in a UE, one of uplink transmission methods (e.g., a grant-based uplink transmission or grant-free uplink transmission method or a grant-based and grant-free uplink transmission method) used for the uplink transmission of the BS or cell through at least one of a higher signal, a broadcasting channel or a downlink control channel. At operation 2f-602, the BS may configure variables additionally necessary for the uplink transmission based on the uplink transmission method configured at operation 2f-601. For example, the BS may transmit or configure configuration information on at least one of a time resource region, frequency resource region in which the configured grant-free uplink transmission may be performed to or in a UE configured with a grant-free uplink transmission method using at least one method of a higher signal, a broadcasting channel or a downlink control channel. In this case, operation 2f-602 may be included in operation 2f-601 and may be configured or transmitted to the UE. At operation 2f-602, some or all of variables necessary for an uplink transmission configuration, including an MCS, information (cyclic shift), and a TTI length that may be used by the UE for grant-free uplink transmission, DMRS-related information for grant-free transmission, a grant-free transmission start symbol within a slot, channel access procedure-related configuration information for grant-free transmission or a candidate value that may be selected by the UE with respect to variable values, in addition to a time and frequency resource region may be configured. In this case, if the uplink transmission configuration is an uplink transmission configuration for an unlicensed band, at operation 2f-602, the BS may differently configure variables regarding an uplink channel access procedure depending on the uplink transmission method configured at operation 2f-601. If a downlink control signal or downlink data signal transmission is necessary in a grant-free transmission resource region configured by the BS at operation 2f-603 or grant-based uplink transmission is determined to be necessary, at operation 2f-605, the BS may configure a corresponding slot so that is not used as grant-free through common control information transmitted through a downlink control channel or may configure a grant-free transmission-capable resource again.

Figure 2G:
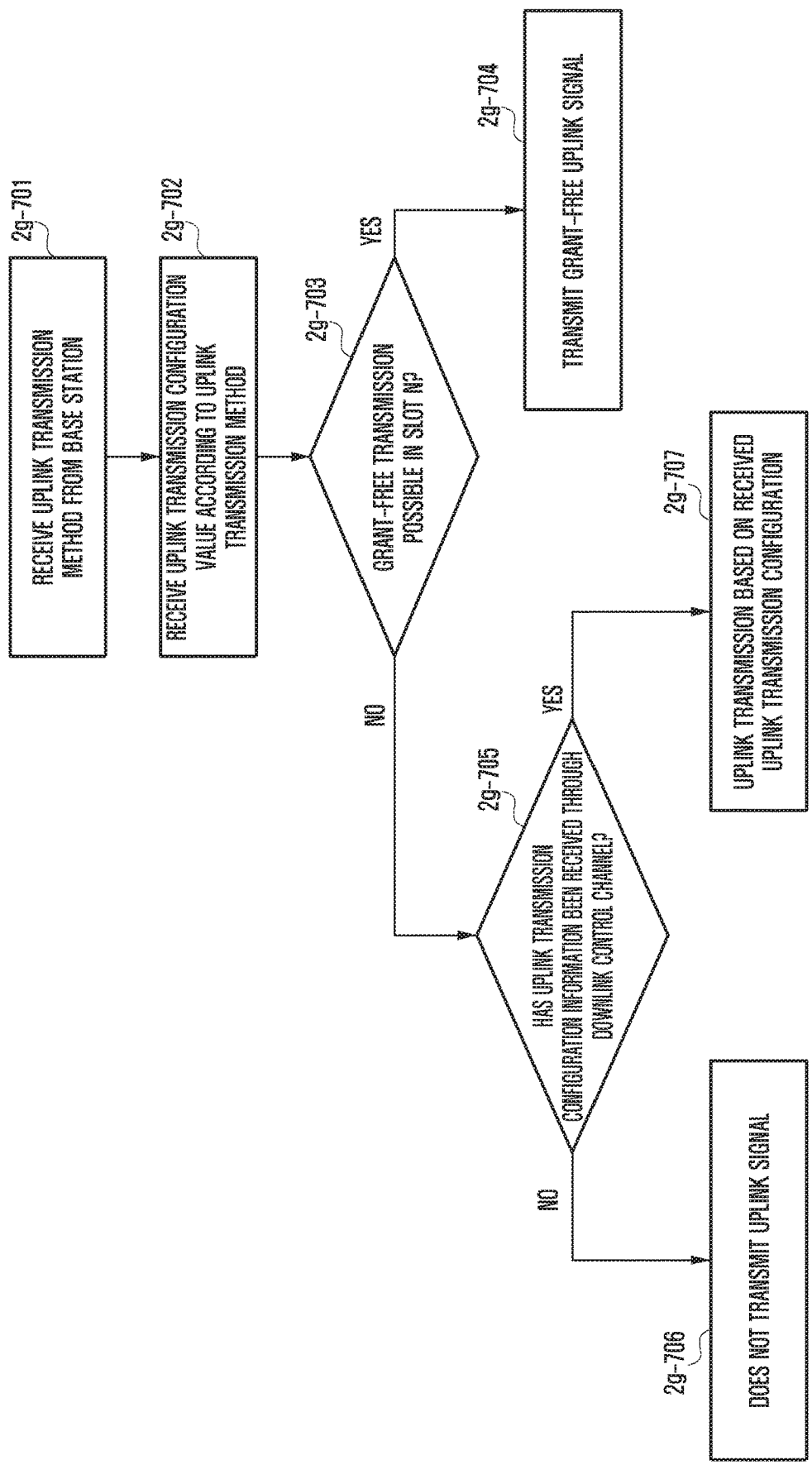
FIG. 2G is a diagram showing a UE operation according to an embodiment of the disclosure.

A channel access procedure configuration method according to an uplink signal transmission method of a UE proposed in the disclosure through FIG. 2G is described below. At operation 2g-701, a UE may configure one of uplink transmission methods (e.g., a grant-based uplink transmission or grant-free uplink transmission method or a grant-based and grant-free uplink transmission method) used for uplink transmission to a BS or cell through at least one method of a higher signal, a broadcasting channel or a downlink control channel from the BS. At operation 2g-702, the UE may additionally configure a variable value necessary for the uplink transmission according to the uplink transmission method configured at operation 2g-701 from the BS. For example, a UE configured with a grant-free uplink transmission method may be configured with or may receive configuration information on at least one of a time resource region, frequency resource region in which grant-free uplink transmission configured by the BS may be performed through at least one method of a higher signal, a broadcasting channel or a downlink control channel. In this case, the operation 2g-702 may be included in operation 2g-701 and configured from the BS. In this case, at operation 2g-702, the UE may be configured with some or all of variables necessary for an uplink transmission configuration, including an MCS, information (cyclic shift), and a TTI length that may be used by the UE for grant-free uplink transmission, DMRS-related information for grant-free transmission, a grant-free transmission start symbol within a slot, channel access procedure-related configuration information for grant-free transmission or a candidate value that may be selected by the UE with respect to variable values, in addition to a time and frequency resource region may be configured. In this case, at least one of variables regarding the uplink channel access procedure configured at operation 2g-702 may be differently configured based on at least one of the uplink transmission method configured at operation 2g-701, an uplink transmission band or the frame structure type of a band in which uplink transmission is performed. If the uplink transmission method configured by the BS at operation 2g-701 and determined at operation 2g-703 is a grant-based method, at operation 2g-704, the UE may receive all configurations necessary for uplink transmission or some or all of the uplink transmission methods, configured at operation 2g-702, other than the uplink transmission method configured at operation 2g-702 or may receive uplink configuration information in which at least one of the variable values received at operation 2g-702 is configured as a new variable value through a downlink control channel of the BS. At operation 2g-703, the UE may determine whether grant-free transmission is possible in a slot n according to the uplink transmission method received from the BS. If the grant-free transmission is determined to be possible in the slot n at operation 2g-703, at operation 2g-704, the UE may perform uplink transmission using a pre-configured grant-free uplink transmission configuration. In this case, some of the variables necessary for the uplink transmission may be selected by the UE. If the grant-free transmission is determined to be impossible in the slot n at operation 2g-703, for example, if the slot n is used for downlink signal transmission or grant-based uplink signal transmission or if a channel access procedure is not terminated, the UE may not perform grant-free uplink signal transmission. If the UE receives an uplink transmission configuration in the slot n through a downlink control channel of the BS in the slot n or prior to the slot n at operation 2g-705, in other words, the UE configured with grant-based uplink transmission in the slot n may perform uplink transmission based on the uplink transmission configuration newly received from the downlink control channel of the BS at operation 2g-707.

Another example of a channel access procedure configuration method according to an uplink signal transmission method of a UE proposed in the disclosure through FIG. 2G is described below. At operation 2g-701, the UE may be configured to use grant-free uplink transmission to a BS or cell through at least one method of a higher signal, a broadcasting channel or a downlink control channel from a BS. In this case, if the grant-free uplink transmission is an activation signal (e.g., after DCI scrambled with a given RNTI is received, when the DCI indicates the activation of grant-free transmission) for grant-free transmission configured through a downlink control channel from the BS, whether a corresponding method is a method capable of performing grant-free transmission or a method capable of performing grant-free uplink transmission without receiving a separate activation signal may be differently configured. At operation 2g-702, the UE may be configured with a variable value necessary for the grant-free uplink transmission configured at operation 2g-701 from the BS. For example, a UE configured with a grant-free uplink transmission method may be configured with time resource region information (at least one of pieces of grant-free resource cycle, offset and period information) in which the configured grant-free uplink transmission may be performed from the BS, information on a frequency resource region through a higher signal from the BS at operation 2g-702. Additionally, at operation 2g-702, the UE may be configured with radio network temporary identifier (RNTI) information (e.g., GF-RNTI) that scrambles downlink control information transmitted for grant-free transmission activation. A UE configured with the grant-free uplink transmission in an unlicensed band may be additionally configured with information on a channel access procedure, for example, at least one of channel access procedure or type information and priority class, grant-free uplink transmission start/end time or symbol information, information related to an MCS, an HARQ process ID, a DMRS (e.g., cyclic shift, OCC), transmit power control (TPC) at operation 2g-702. If the configured grant-free transmission has to receive a grant-free transmission activation indication signal from the BS, at least one of the pieces of configuration information may be included in a grant-free transmission activation indication signal and indicated. In this case, if information (e.g., timing offset) indicative of an uplink transmission time is included in the grant-free transmission activation indication information and the information indicative of the uplink transmission time is not used to identify the validity of the grant-free transmission activation, the UE may determine that a grant-free transmission resource is periodically configured in a time after the indicated uplink transmission time based on the time when the grant-free transmission activation indication information has been received in the grant-free transmission cycle configured through the higher signal. For example, if a UE receives grant-free transmission activation indication information in a time n and the value of a field indicative of an uplink transmission time in the grant-free transmission activation information indicates k, the UE may determine that a grant-free transmission resource has been configured according to a cycle T configured through the higher signal from a time n+k. For example, the UE may determine that the time n+k, n+k+T, n+k+2T will be configured as a grant-free transmission resource. The UE may determine that a grant-free transmission resource has been configured in the cycle before it receives downlink control information in which the resource indicates separate grant-free transmission release (or deactivation). In this case, the k may be applied to an absolute value or a pre-defined or configured value as an additional offset value. The UE that has determined that the time n (slot or subframe n) is the grant-free uplink transmission slot or subframe configured at the above operation from the BS and grant-free transmission is necessary determines whether grant-free uplink transmission may be performed in the time n at operation 2g-703. In this case, if the time n is not a downlink control signal transmission interval configured through a pre-defined downlink control signal or higher signal from the BS or the UE receives a slot or subframe structure on the time n (e.g., the number of downlink transmission symbols or uplink transmission symbols and location information) or transmission direction information (e.g., downlink or uplink) through a downlink control channel from the BS and determines that the time n has been configured as a grant-free uplink transmission interval based on the information, at operation 2g-707, the UE transmits a grant-free uplink signal using a grant-free transmission configuration value configured through a higher signal and a grant-free transmission configuration value indicated through a grant-free transmission activation signal. When the grant-free transmission configuration value configured through the higher signal and the grant-free transmission configuration value indicated through the grant-free transmission activation signal are different, the UE may perform grant-free transmission based on the grant-free transmission configuration value indicated through the grant-free transmission activation signal. If the time n is a downlink control signal transmission interval configured through a previously defined downlink control signal or a higher signal from the BS or the UE receives slot or subframe structure information on the time n (e.g., the number of downlink transmission symbols or uplink transmission symbols and location information) or transmission direction information (e.g., downlink or uplink) through a downlink control channel from the BS and determines that the time n is not configured as a grant-free uplink transmission interval based on the received information, for example, if the time n is a downlink transmission slot or grant-based uplink transmission slot, the UE does not perform the configured grant-free transmission. If the UE has been configured with grant-based uplink transmission in a time n at operation 2g-705, at operation 2g-707, the UE transmits an uplink signal based on the grant-based uplink transmission configuration configured at operation 2g-705. A UE not configured with grant-based uplink transmission in a time n at operation 2g-705 does not perform uplink signal transmission in the time n. In this case, if the UE has determined that the time n has been configured as a grant-free uplink transmission interval at operation 2g-703, but grant-based uplink transmission has been configured in the time n, the UE transmits an uplink signal based on the grant-based uplink transmission configuration in the time n, and may not perform grant-free transmission.

In order to perform the embodiments, each of the UE and the BS may include a transmitter, a receiver, and a processor. The embodiments have illustrated a transmission and reception method of the BS and the UE in order to determine transmission and reception timing of a second signal and to perform a corresponding operation. The transmitter, receiver and processor may perform the operation. In one embodiment, the transmitter and receiver may be referred to as a transceiver capable of performing all the functions, and the processor may be referred to as a controller.

Figure 2H:
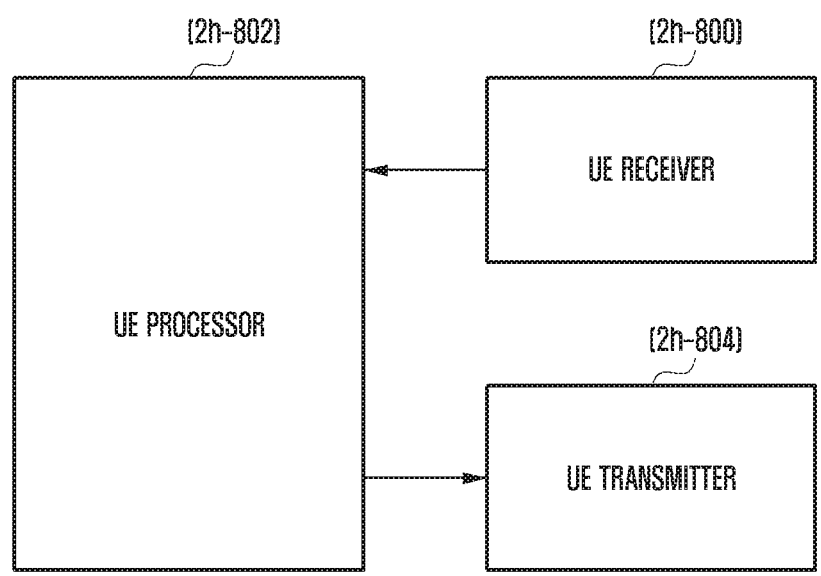
FIG. 2H is a block diagram showing the structure of a UE according to an embodiment.

FIG. 2H is a block diagram showing the structure of a UE according to an embodiment.

Referring to FIG. 2H, the UE of the disclosure may include a UE receiver 2h-800, a UE transmitter 2h-804, a UE processor 2h-802. The UE receiver 2h-800 and the UE transmitter 2h-804 may be commonly called a transceiver in one embodiment. The transceiver may transmit and receive signals to and from a BS. The signal may include control information and data. To this end, the transceiver may be configured with an RF transmitter configured to up-convert and amplify the frequency of a transmitted signal, an RF receiver configured to low-noise amplify a received signal and to down-convert a frequency, etc. Furthermore, the transceiver may measure the intensity of a signal received through a radio channel and output the measured signal to the UE processor 2h-802. The UE processor 2h-802 may perform a channel access operation by comparing the intensity of the received signal with a pre-configured threshold, and may transmit a signal, output by the UE processor 2h-802, through a radio channel based on a result of the channel access operation. Furthermore, the transceiver may receive a signal through a radio channel, may transmit the signal to the UE processor 2h-802, and may transmit a signal, output by the UE processor 2h-802, through a radio channel. The UE processor 2h-802 may control a series of processes so that the UE operates according to the embodiments. For example, the UE processor 2h-802 may control the UE receiver 2h-800 to receive a signal, including second signal transmission timing information, from a BS and to interpret the second signal transmission timing. Thereafter, the UE receiver 2h-804 may transmit a second signal at the timing.

Figure 2I:
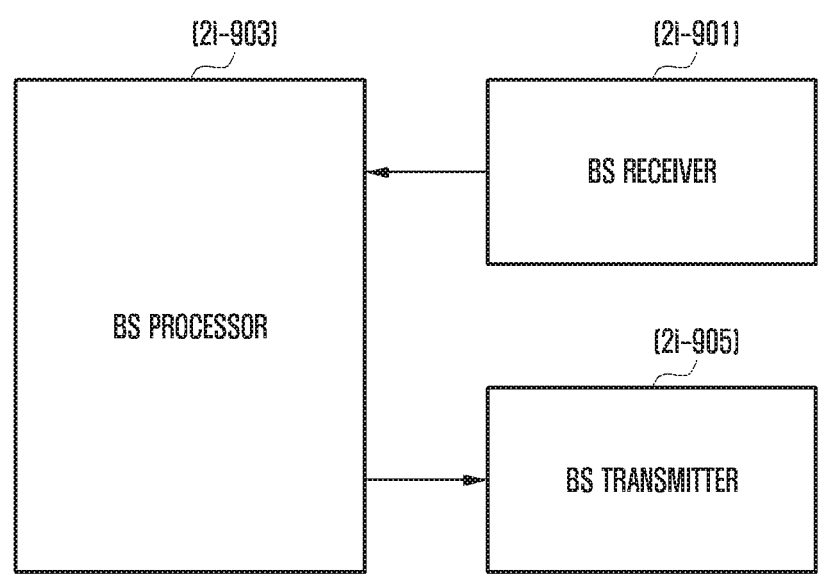
FIG. 2I is a block diagram showing the structure of a UE according to an embodiment.

FIG. 2I is a block diagram showing the structure of a UE according to an embodiment.

Referring to FIG. 2I, in one embodiment, the BS may include at least one of a BS receiver 2i-901, a BS transmitter 2i-905 and a BS processor 2i-903. The BS receiver 2i-901 and the BS transmitter 2i-905 may be commonly called a transceiver in one embodiment of the disclosure. The transceiver may transmit and receive signals to and from a UE. The signal may include control information and data. To this end, the transceiver may be configured with an RF transmitter configured to up-convert and amplify the frequency of a transmitted signal, an RF receiver configured to low-noise amplify a received signal and to down-convert a frequency. Furthermore, the transceiver may receive a signal through a radio channel, may output the signal to the BS processor 2i-903, and may transmit a signal, output by the UE processor 2i-903, through a radio channel. The BS processor 2i-903 may control a series of processes so that the BS operates according to the embodiments of the disclosure. For example, the BS processor 2i-903 may control to determine second signal transmission timing and to generate second signal transmission timing information to be transmitted to a UE. Thereafter, the BS transmitter 2i-905 may transmit the timing information to the UE, and the BS receiver 2i-901 may receive a second signal at the timing. For another example, the BS processor 2i-903 may configure the uplink transmission method of a UE so that it may use at least one of a grant-free method or a grant-based method. The BS transmitter 2i-905 may transmit configuration information on uplink transmission, including an uplink channel access procedure defined based on the configured uplink transmission method, to the UE.

Furthermore, in accordance with one embodiment of the disclosure, the BS processor 2i-903 may control to generate downlink control information (DCI) including the second signal transmission timing information. In this case, the DCI may indicate that it is the second signal transmission timing information.

The embodiments of the disclosure disclosed in the specification and drawings have suggested given examples in order to easily describe the technical contents of the disclosure and to help understanding of the disclosure, and are not intended to limit the scope of the disclosure. That is, it is evident to those skilled in the art to which the disclosure pertains that other modified examples based on technical spirit of the disclosure may be practiced. Furthermore, the embodiments may be combined and operated, if necessary. For example, some of the embodiments of the disclosure may be combined, so a BS and a UE operate based on them. Furthermore, the embodiments have been presented based on an NR system, and other modified examples based on the technical spirit of the embodiments may be applied to other systems, such as FDD or TDD LTE systems.

Furthermore, the preferred embodiments of the disclosure have been disclosed in this specification and drawings. Although specific terms have been used, they are used in common meanings in order to easily describe the technical contents of the disclosure and to help understanding of the disclosure, but are not intended to limit the scope of the disclosure. It is evident to a person having ordinary skill in the art to which the disclosure pertains that other modified examples based on the technical spirit of the disclosure are possible in addition to the disclosed embodiments.

Third Embodiment

Wireless communication systems deviate from the provision of the initial voice-oriented service and evolve into wideband wireless communication systems that provide high-speed and high-quality packet data services, for example, communication standards, such as high speed packet access (HSPA) of 3GPP, long term evolution (LTE) or evolved universal terrestrial radio access (E-UTRA), LTE-Advanced (LTE-A), LTE-Pro, high rate packet data (HRPD) of 3GPP2, a ultra mobile broadband (UMB) and 802.16e of IEEE. Furthermore, the communication standard of 5G or new radio (NR) is being made as a 5G wireless communication system.

An LTE system, that is, a representative example of the broadband wireless communication system, adopts an orthogonal frequency division multiplexing (OFDM) scheme in downlink (DL) and adopts a single carrier frequency division multiple access (SC-FDMA) scheme in uplink (UL). Uplink refers to a radio link through which a terminal (or user equipment (UE)) or mobile station (MS)) transmits data or a control signal to a base station (BS or eNode B). Downlink refers to a radio link through which a BS transmits data or a control signal. Such a multi-access scheme is a method of assigning or managing time-frequency resources on which data or control information will be carried for each user in order to distinguish between the data or control information of users so that the time-frequency resources do not overlap, that is, orthogonality is established.

The LTE system adopts a hybrid automatic repeat request (HARQ) scheme of retransmitting corresponding data in a physical layer when a decoding failure occurs in initial transmission. According to the HARQ scheme, when a receiver does not precisely decode data, the receiver transmits information (negative acknowledgement (NACK)), notifying a transmitter of the decode failure, to the transmitter so that the transmitter can retransmit the corresponding data in the physical layer. The receiver combines the data retransmitted by the transmitter with the data whose decoding has previously failed, thereby increasing data reception performance. Furthermore, when the receiver accurately decodes data, the receiver transmits information (acknowledgement (ACK)), notifying the transmitter of a decoding success, to the transmitter so that the transmitter can transmit new data.

In a wireless communication network including multiple cells, transmission/reception point (TRPs) or beams, coordination between cells, TRPs or beams is a factor that may have a great influence on transmission efficiency of the entire network. For the coordination between cells, TRPs or beams, a UE needs to be capable of channel estimation and interference estimation through multiple cells, TRPs or beams. Major scenarios taken into consideration in a system, such as 5G/NR (new radio, next radio) after LTE such as an indoor hotspot, have a target of high-density and high-integration network in most cases. Accordingly, the number of cells, TRPs or beams that may be coordinated for one UE increases compared to LTE, which results in a complexity increase necessary for channel and interference estimation.

In the disclosure, a CSI framework for network coordination is arranged. First, there are provided DL CSI-RS, UL CSI-RS (SRS), and DMRS configuration and transmission methods for efficient channel estimation. A BS enables a UE to measure various channel situations through multiple TRPs or beams based on the methods. Furthermore, in the disclosure, an interference measurement method and channel state generation method capable of corresponding to various interference situations are discussed. A BS may instruct a UE to generate CSI for network coordination based on channel and interference estimation and to report it to the BS. Finally, there is provided a QCL signaling method for supporting various coordination node geometries and dynamic transmission scheme changes.

More specifically, the disclosure provides a method of configuring, transmitting and receiving RSs, such as a downlink (DL) channel state information reference signal (CRI-RS), an uplink (UL) CSI-RS or a sounding reference signal (SRS), a demodulation reference signal (DMRS) which enable various channel and interference estimation through multiple cells, TRPs or beams. A UE generates channel state information (CSI) for each network coordination scenario based on estimated channel and interference information, and reports it to a BS. In this case, the BS may signal quasi co-location IQCL) information, provided in the disclosure in order to provide a criterion for the time/ frequency offset correction of RSs peripherally transmitted in a time/frequency resource, such as an aperiodic RS or subband RS, to the UE. The UE can properly improve channel estimation performance through each RS.

Figure 3A:
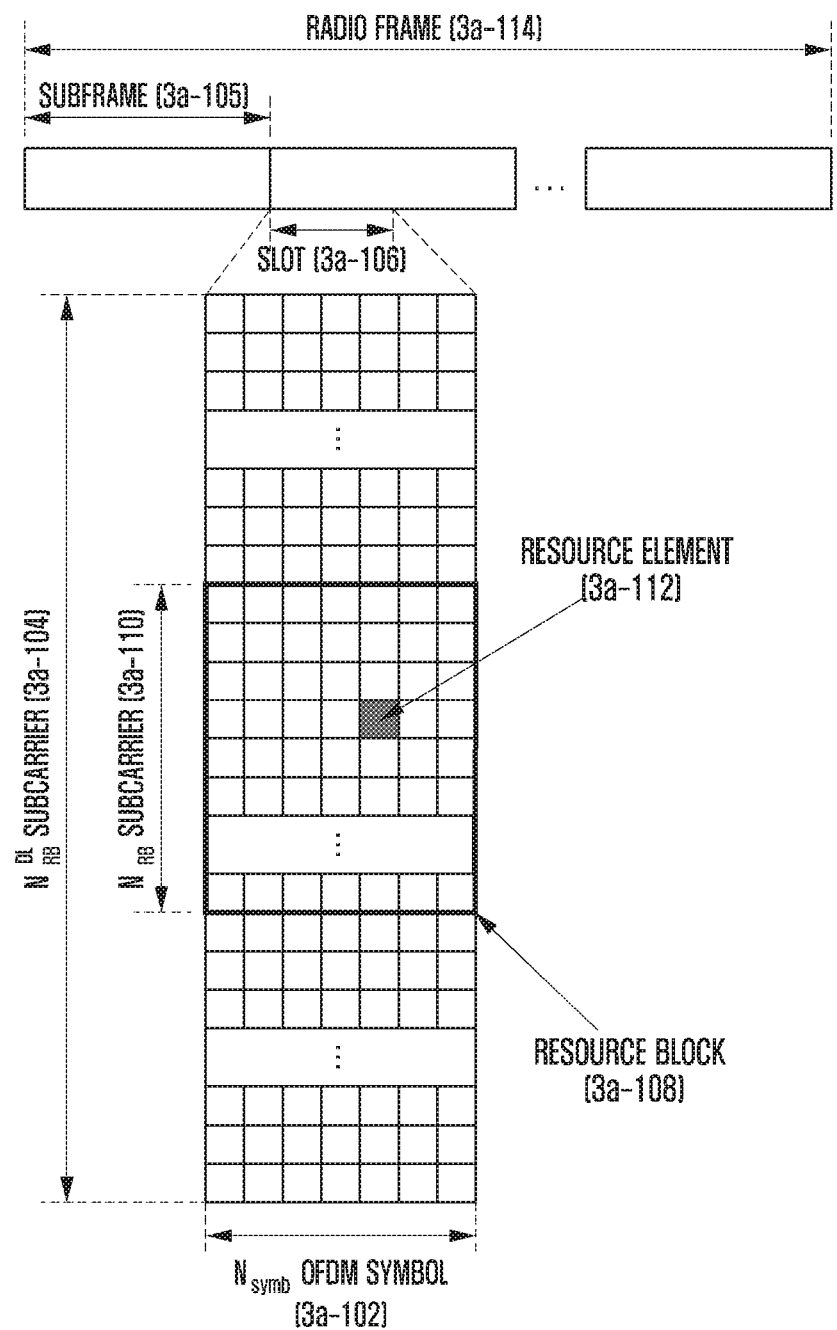
FIG. 3A is a diagram showing a downlink time-frequency domain transmission architecture of an LTE or LTE-A system according to a conventional technology.

FIG. 3A is a diagram showing a downlink time-frequency domain transmission architecture of an LTE or LTE-A system according to a conventional technology.

Referring to FIG. 3A, a transverse axis indicates a time domain and a longitudinal axis indicates a frequency domain. A minimum transmission unit in the time domain is an OFDM symbol, $N_{symb}$ OFDM symbols 3a-102 gather to configure one slot 3a-106, and two slots gather to configure one subframe 3a-105. The length of the slot is 0.5 ms, and the length of the subframe is 1.0 ms. Furthermore, a radio frame 3a-114 is a time domain period configured with 10 subframes. A minimum transmission unit in the frequency domain is a subcarrier, the bandwidth of the entire system transmission bandwidth is configured with a total of $N_{BW}$ subcarriers 3a-104.

In the time-frequency domain, a basic unit of a resource is a resource element (RE) 3a-112 and may be indicated as an OFDM symbol index and a subcarrier index. A resource block (RB) 3a-108 (or physical resource block (PRB)) may be defined as $N_{symb}$ contiguous OFDM symbols 3a-102 in the time domain and $N_{RB}$ contiguous subcarriers $_{3a-11}0$ in the frequency domain. Accordingly, one RB 3a-108 may include $N_{symb} \times N_{RB}$ REs 3a-112. In general, a frequency domain minimum allocation unit of data is an RB. In the LTE system, in general, the $N_{symb}=7$, $N_{RB}=12$, and $N_{BW}$ and $N_{RB}$ is proportional to the bandwidth of a system transmission band. A data rate increases in proportion to the number of RBs scheduled in a UE. An LTE system defines and operates 6 transmission bandwidths. In the case of an FDD system in which downlink and uplink are divided and operated by frequency, a downlink transmission bandwidth and an uplink transmission bandwidth may be different. A channel bandwidth indicates an RF bandwidth corresponding to a system transmission bandwidth. Table 3a shows a correspondence relation between system transmission bandwidths and channel bandwidths defied in an LTE system. For example, in an LTE system having a 10 MHz channel bandwidth, a transmission bandwidth is configured with 50 RBs.

TABLE 3a

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information is transmitted within the first N OFDM symbols within a subframe. In general, N={1, 2, 3}. Accordingly, an N value is varied every subframe depending on the amount of control information to be transmitted in a current subframe. The control information includes a control channel transmission interval indicator indicating that the control information is transmitted over how many OFDM symbols, scheduling information on downlink data or uplink data, information on HARQ ACK/NACK.

In an LTE system, scheduling information on downlink data or uplink data is delivered from a BS to a UE through downlink control information (DCI). The DCI defines various formats, and applies and operates a determined DCI format depending on whether the information is scheduling information (UL grant) on uplink data or scheduling information (DL grant) on downlink data depending on each format, whether the information is compact DCI whose size of control information is small, whether spatial multiplexing using multiple antennas is applied, whether the information is DCI for power control, etc. For example, the DCI format 1, that is, scheduling control information (DL grant) on downlink data is configured to include at least one of the following pieces of control information.

Resource allocation type 0/1 flag: provides notification of whether a resource assignment method is type 0 or type 1. In type 0, a resource is assigned in a resource block group (RBG) unit by applying a bitmap method. In an LTE system, a basic unit of scheduling is an RB represented as time and frequency domain resources. An RBG is configured with a plurality of RBs, and becomes a basic unit of scheduling in a type 0 method. In type 1, a given RB is assigned within an RBG.

Resource block assignment: provides notification of an RB assigned to data transmission. A represented resource is determined based on a system bandwidth and resource assignment method.

Modulation and coding scheme (MCS): provides notification of a modulation scheme used for data transmission and the size of a transport block (TB), that is, data to be transmitted.

HARQ process number: provides notification of the process number of an HARQ.

New data indicator: provides notification of whether transmission is HARQ initial transmission or retransmission.

Redundancy version: provides notification of a redundancy version of an HARQ.

Transmit power control (TPC) command for physical uplink control channel (PUCCH): provides notification of a transmit power control command for a PUCCH, that is, an uplink control channel.

The DCI is transmitted on a physical downlink control channel (PDCCH) (or control information, and they are hereinafter interchangeably used) or an enhanced PDCCH (EPDCCH) (or enhanced control information, and they are hereinafter interchangeably used), that is, a downlink physical control channel, through a channel coding and modulation process.

In general, the DCI is independently scrambled with a given radio network temporary identifier (RNTI) (or UE ID) with respect to each UE. After cyclic redundancy check (CRC) is added to the DCI and subject to channel coding, the DCI may be configured with each independent PDCCH and transmitted. In the time domain, a PDCCH is mapped and transmitted during a control channel transmission interval. The frequency domain mapping location of the PDCCH is determined by the ID of each UE and spread in the entire system transmission bandwidth.

Downlink data is transmitted on a physical downlink shared channel (PDSCH), that is, a physical channel for downlink data transmission. DCI transmitted through a PDCCH provides notification of a detailed mapping location of the PDSCH in the frequency domain and scheduling information, such as a modulation scheme.

A BS notifies a UE of a modulation scheme applied to a PDSCH to be transmitted and the size of data to be transmitted (transport block size (TBS)) through an MCS including 5 bits among control information to configure the DCI. The TBS corresponds to a size before channel coding for error correction is applied to a data transport block (TB) to be transmitted by the BS.

A modulation scheme supported in an LTE system includes quadrature phase shift keying (QPSK), quadrature amplitude modulation (16QAM), and 64QAM. Modulation orders (Qm) correspond to 2, 4 and 6, respectively. That is, in the case of QPSK modulation, 2 bits may be transmitted per symbol. In the case of 16QAM modulation, 4 bits may be transmitted per symbol. In the case of 64QAM modulation, 6 bits may be transmitted per symbol.

Figure 3B:
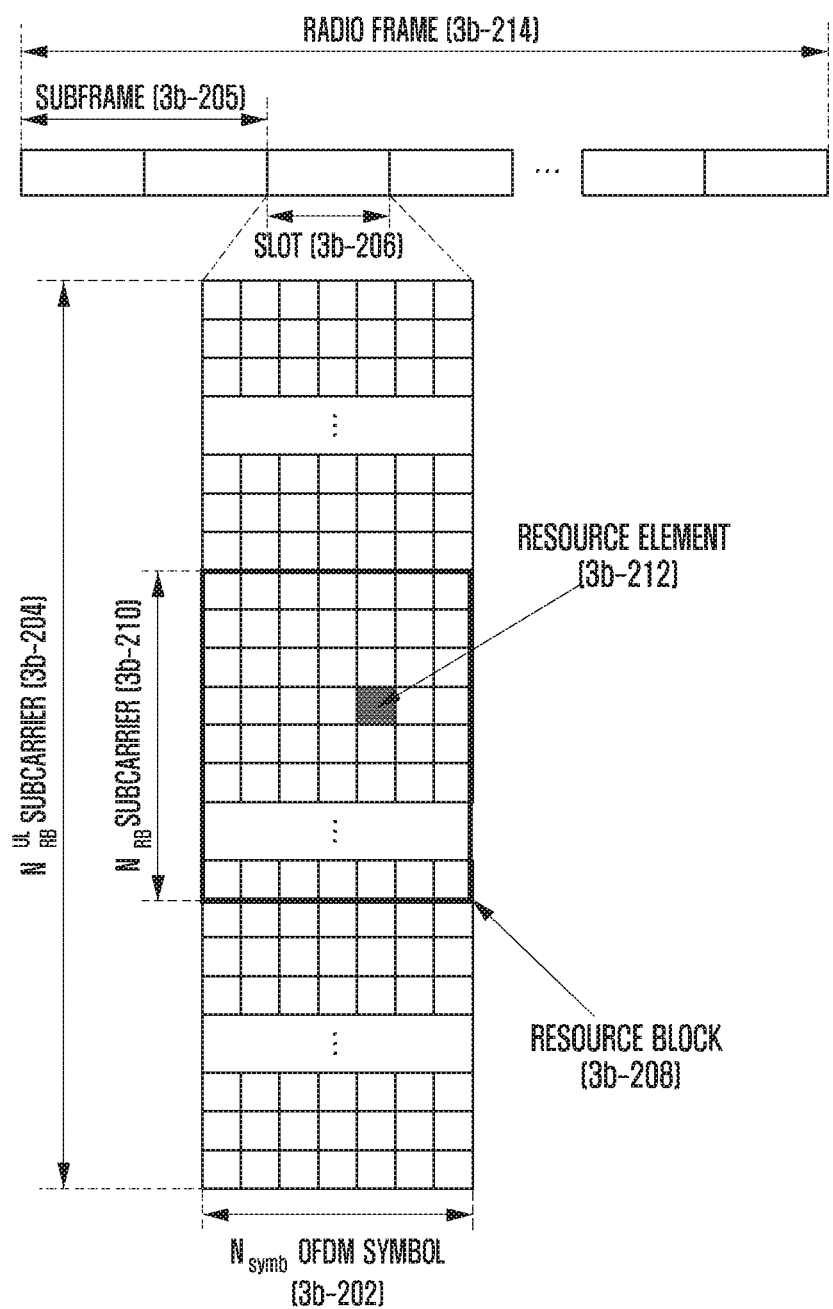
FIG. 3B is a diagram showing an uplink time-frequency domain transmission architecture of an LTE or LTE-A system according to a conventional technology.

FIG. 3B is a diagram showing an uplink time-frequency domain transmission architecture of an LTE or LTE-A system according to a conventional technology.

Referring to FIG. 3B, a transverse axis indicates a time domain, and a longitudinal axis indicates a frequency domain. A minimum transmission unit in the time domain is an SC-FDMA symbol 3b-202, and $N_{symb}^{UL}$ SC-FDMA symbols gather to configure one slot 3b-206. Furthermore, two slots gather to configure one subframe 3b-205. A minimum transmission unit in the frequency domain is a subcarrier. The entire system transmission bandwidth 3b-204 is configured with a total of $N_{BW}$ subcarriers. $N_{BW}$ has a value proportional to a system transmission bandwidth.

In the time-frequency domain, a basic unit of a resource is a resource element (RE) 3b-212 and is defined as an SC-FDMA symbol index and a subcarrier index. A resource block pair (RB pair) 3b-208 may be defined as $N_{symb}^{UL}$ contiguous SC-FDMA symbol in the time domain and $N_{SC}^{RB}$ contiguous subcarriers in the frequency domain. Accordingly, one RB is configured with $N_{symb}^{UL} \times N_{SC}^{RB}$ REs. In general, a minimum transmission unit of data or control information is an RB unit. A PUCCH is mapped to a frequency domain corresponding to 1 RB and transmitted during 1 subframe.

In an LTE system, the timing relation of a PDSCH, that is, a physical channel for downlink data transmission or a PUCCH or PUSCH, that is, an uplink physical channel in which HARQ ACK/NACK corresponding to a PDCCH/EPDDCH including semi-persistent scheduling release (SPS release) is transmitted, has been defined. For example, in an LTE system operating according to frequency division duplex (FDD), HARQ ACK/NACK corresponding to a PDSCH transmitted in an (n−4)-th subframe or a PDCCH/EPDCCH including SPS release is transmitted as a PUCCH or PUSCH in an n-th subframe.

In an LTE system, a downlink HARQ adopts an asynchronous HARQ method having data retransmission timing not fixed. That is, when feedback for HARQ NACK is received from a UE with respect to initial transmission data transmitted by a BS, the BS freely determines the transmission timing of retransmission data according to a scheduling operation. The UE buffers data determined to be an error as a result of the decoding of data received for an HARQ operation, and performs combining with next retransmission data.

When a UE receives a PDSCH, including downlink data transmitted by a BE, in a subframe n, the UE transmits uplink control information, including the HARQ ACK or NACK of the downlink data, to the BS through a PUCCH or PUSCH in a subframe n+k. In this case, the k has been differently defined depending on the FDD or time division duplex (TDD) of an LTE system and a subframe configuration thereof. For example, in the case of an FDD LTE system, the k is fixed to 4. In the case of a TDD LTE system, the k may be changed depending on a subframe configuration and subframe number.

In an LTE system, unlike a downlink HARQ, an uplink HARQ adopts a synchronous HARQ method having data transmission timing fixed. That is, an uplink/downlink timing relation between a physical uplink shared channel (PUSCH), that is, a physical channel for uplink data transmission, a PDCCH, that is, a downlink control channel preceding the PUSCH, and a physical hybrid indicator channel (PHICH), that is, a physical channel in which downlink HARQ ACK/NACK corresponding to the PUSCH is transmitted, has been fixed by the following rule.

When a UE receives a PDCCH, including uplink scheduling control information transmitted by a BS or a PHICH in which downlink HARQ ACK/NACK is transmitted in a subframe n from a BS, the UE transmits uplink data, corresponding to the control information, through a PUSCH in a subframe n+k. In this case, the k has been differently defined depending on the FDD or time division duplex (TDD) of an LTE system and a configuration thereof. For example, in the case of an FDD LTE system, the k is fixed to 4. In the case of a TDD LTE system, the k may be changed depending on a subframe configuration and a subframe number.

Furthermore, when the UE receives a PHICH carrying downlink HARQ ACK/NACK from a BS in a subframe i, the PHICH corresponds to a PUSCH transmitted by the UE in a subframe i−k. In this case, the k may be differently defined depending on the FDD or TDD of an LTE system and a configuration thereof. For example, in the case of an FDD LTE system, the k is fixed to 4. In the case of a TDD LTE system, the k may be changed depending on a subframe configuration and a subframe number.

The wireless communication system has been described on the basis of an LTE system, and the contents of the disclosure are not limited to the LTE system and may be applied to various wireless communication systems, such as NR and 5G. For example, in the NR, the number of subcarriers per PRB may be defined like $N_{RB}=16$ in addition to $N_{RB}=12$. Furthermore, in LTE, an uplink waveform is limited to SC-FDMA as in FIG. 3B, but is not limited thereto in the NR and may apply OFDMA as in FIG. 3A in uplink or may selectively apply OFDMA and SC-FDMA. Accordingly, in the following description of the disclosure, although description is given based on one configuration value, it is evident that this is for convenience of description and not limitedly applied thereto.

In a mobile communication system, time, frequency, and power resources are limited. Accordingly, if more resources are assigned to a reference signal, the absolute amount of transmitted data may be reduced because resources which may be assigned to traffic channel (data traffic channel) transmission are reduced. In such a case, performance of channel measurement and estimation may be improved, but the entire system capacity performance may be degraded because the absolute amount of transmitted data is reduced.

Accordingly, a proper distribution is necessary between a resource for a reference signal and a resource for traffic channel transmission so that optimal performance can be derived in terms of the entire system capacity.

Figure 3C:
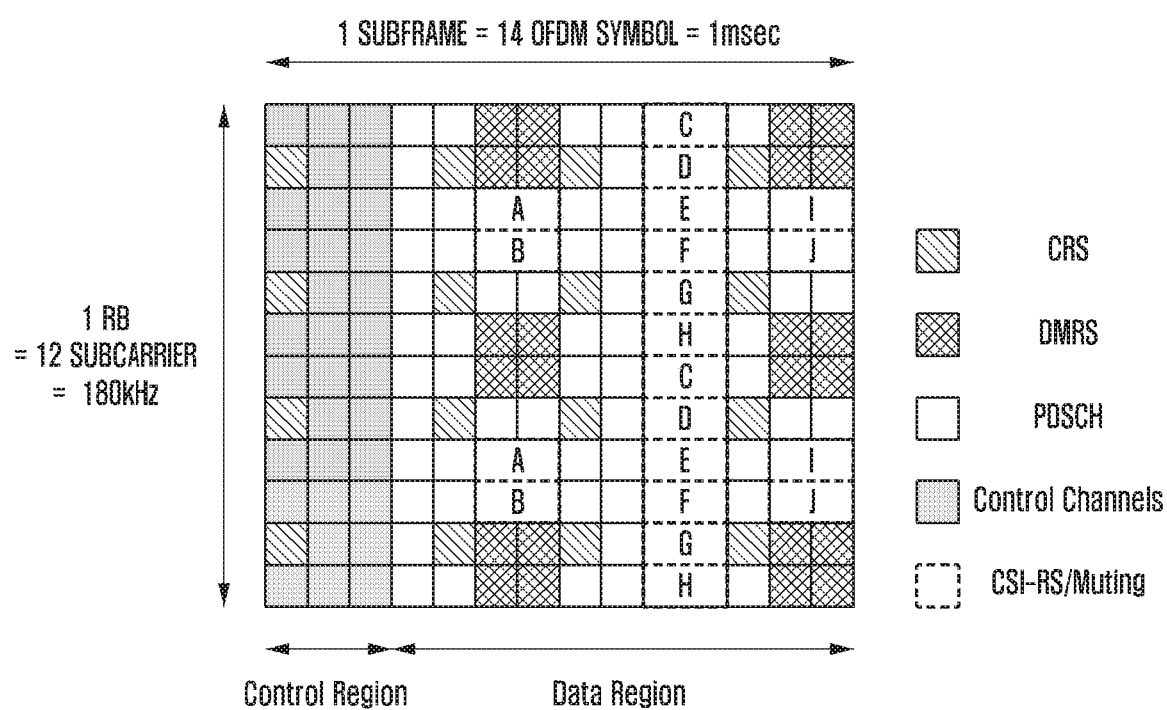
FIG. 3C is a diagram showing the PRB structure of an LTE-A system.

FIG. 3C is a diagram showing a radio resource for 1 subframe and 1 resource block (RB), that is, a minimum unit which may be scheduled in downlink in an LTE/LTE-A system.

The radio resource shown in FIG. 3C includes one subframe on a time axis and includes one resource block (RB) on a frequency axis. Such a radio resource includes 12 subcarriers in a frequency domain and includes 14 OFDM symbols in a time domain to form a total of 168 unique frequency and time locations. In LTE/LTE-A, each unique frequency and time location in FIG. 3C is called a resource element (RE).

In the radio resource shown in FIG. 3C, the following different types of a plurality of signals may be transmitted.

1. Cell-specific RS (CRS): this is a reference signal periodically transmitted for all UEs belonging to one cell and may be used by a plurality of UEs in common.

2. Demodulation reference signal (DMRS): this is a reference signal transmitted for a given UE and is transmitted when data is transmitted to a corresponding UE. A DMRS may include a total of 8 DMRS ports. In LTE/LTE-A, a port 7 to a port 14 correspond to DMRS ports. The ports maintain orthogonality using CDM or FDM in order to prevent interference from occurring.

3. Physical downlink shared channel (PDSCH): this is a data channel transmitted in downlink and is used for a BS to transmit traffic to a UE and is transmitted using an RE in which a reference signal is not transmitted in the data region of FIG. 3C.

4. Channel status information reference signal (CSI-RS): this is a reference signal transmitted for UEs belonging to one cell and is used to measure a channel state. A plurality of CSI-RSs may be transmitted in one cell.

5. Other control channels (PHICH, PCFICH, PDCCH): they provide control information that is necessary for a UE to receive a PDSCH and are used for ACK/NACK transmission for operating an HARQ for the data transmission of the uplink.

In addition to the signals, muting may be configured in an LTE-A system so that the transmitted CSI-RS of another BS is received by the UEs of a corresponding cell without interference. The muting may be applied in the location where a CSI-RS may be transmitted. In general, a UE receives a traffic signal by skipping a corresponding radio resource. In an LTE-A system, muting is also called a zero-power CSI-RS as another term. The reason for this is that in terms of muting, constellation muting is identically applied to the location of a CSI-RS and transmit power is not transmitted.

In FIG. 3C, a CSI-RS may be transmitted using some of locations indicated by A, B, C, D, E, E, F, G, H, I, and J depending on the number of antennas in which the CSI-RS is transmitted. Furthermore, muting may also be applied to some of the locations indicated by A, B, C, D, E, E, F, G, H, I, and J. Specifically, a CSI-RS may be transmitted in 2, 4, 8 REs depending on the number of transmitted antenna ports. In FIG. 4B, when the number of antenna ports is 2, a CSI-RS is transmitted in the half of a given pattern. When the number of antenna ports is 4, a CSI-RS is transmitted in all given patterns. When the number of antenna ports is 8, a CSI-RS is transmitted using two patterns. In contrast, muting is always configured with one pattern unit. That is, muting may be applied to a plurality of patterns, but cannot be applied to only some of one pattern when the location of the muting does not overlap that of a CSI-RS. However, muting may be applied to some of one pattern only when the location of a CSI-RS and the location of the muting overlap.

If a CSI-RS for two antenna ports are transmitted, the signal of each antenna port is transmitted in two REs connected in the time axis and the signals of the respective antenna ports are divided by orthogonal code. Furthermore, if a CSI-RS for four antenna ports is transmitted, a signal for the remaining two antenna ports is transmitted using the same method by further using two Res in addition to a CSI-RS for the two antenna ports. The same is true when a CSI-RS for 8 antenna ports is transmitted.

Figure 3D:
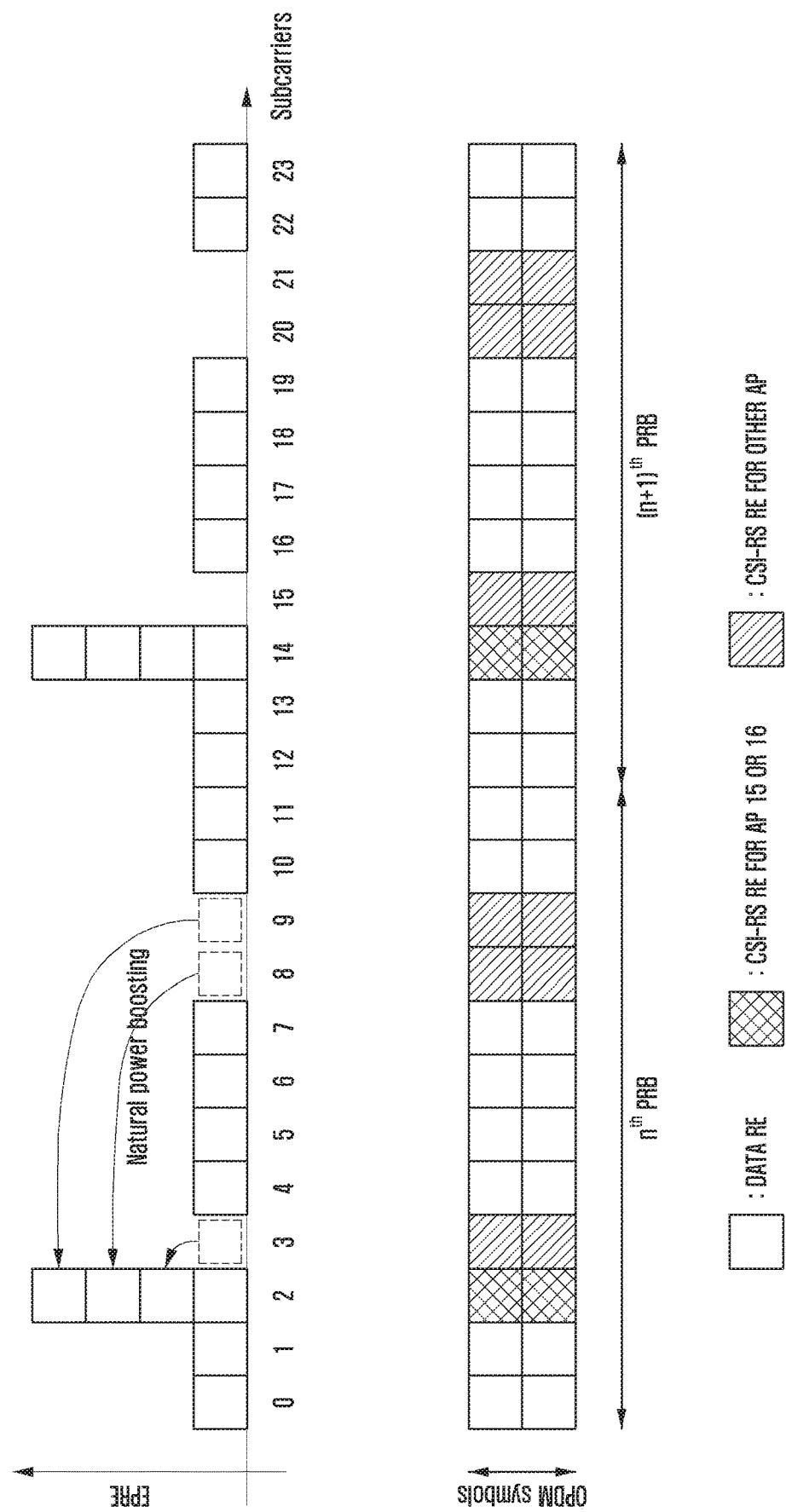
FIG. 3D is a diagram showing the CSI-RS power boosting of an LTE-A system.

A BS may boost transmission power of a CSI-RS in order to improve channel estimation accuracy. If four or eight antenna port (AP) CSI-RSs are transmitted, a given CSI-RS port is transmitted only in a CSI-RS RE at a predetermined location and is not transmitted in other OFDM symbols within the same OFDM symbol. FIG. 3D is a diagram showing an example of CSI-RS RE mapping for n-th and (n+1)-th PRBs when a BS transmits 8 CSI-RSs. As in FIG. 3D, if a CSI-RS RE location for a No. 15 or No. 16 AP is the same as a check pattern of FIG. 3D, transmission power of a No. 15 or 16 AP is not used in a CSI-RS RE for the remaining Nos. 17~22 APs indicated by a slashed pattern. Accordingly, as indicated in FIG. 3D, in the No. 15 or 16 AP, transmission power to be used for Nos. 3, 8, 9 subcarriers may be used in a No. 2 subcarrier. Such natural power boosting enables power of a No. 15 CSI-RS port, transmitted through the No. 2 subcarrier, to be configured high up to a maximum of 6 dBs compared to transmission power of the No. 15 AP used in a data RE. Current 2/4/8 port CSI-RS patterns enable natural power boosting of each 0/2/6 dB, and each AP may transmit a CSI-RS using the entire available power (full power utilization).

Furthermore, a UE may be assigned CSI-IM (or IMR, interference measurement resources) along with a CSI-RS. The resource of the CSI-IM has the same resource structure and location as a CSI-RS supporting 4 ports. The CSI-IM is a resource which enables a UE, receiving data from one or more BSs, to precisely measure interference from an adjacent BS. If an adjacent BS wants to measure the amount of interference when it transmits data and the amount of interference when it does not transmits data, the BS may configure a CSI-RS and two CSI-IM resources so that an adjacent BS always transmits a signal in one CSI-IM and does not always transmit a signal in the other CSI-IM, thereby being capable of effectively measuring the amount of interference of the adjacent BS.

In an LTE-A system, a BS may notify a UE of CSI-RS configuration information through higher layer signaling. The CSI-RS configuration includes the index of CSI-RS configuration information, the number of ports included in a CSI-RS, the transmission cycle of a CSI-RS, a transmission offset, CSI-RS resource configuration information, a CSI-RS scrambling ID, QCL information, etc.

In a cellular system, a BS needs to transmit a reference signal to a UE in order to measure a downlink channel state. In the case of a long term evolution advanced (LTE-A) system of 3GPP, a UE measures the channel state between a BS and the UE using a CRS transmitted by the BS or a channel state information reference signal (CSI-RS). Some factors need to be basically taken into consideration in the channel state. The factors include the amount of interference in downlink. The amount of interference in downlink includes an interference signal and thermal noise occurring due to an antenna belonging to an adjacent BS. The amount of interference is important for a UE to determine a downlink channel situation. As one example, if a BS having one transmission antenna transmits a signal to a UE having one reception antenna, the UE needs to determine energy per symbol which may be received in downlink using a reference signal received from the BS and the amount of interference to be received at the same time in the period in which a corresponding symbol is received, and to determine Es/Io. The determined Es/Io is converted into a data transmission rate or a corresponding value, and the BS is notified of the determined Es/Io in the form of a channel quality indicator (CQI). Accordingly, the BS may determine that it will perform transmission to the UE at which data transmission speed in downlink.

In the case of an LTE-A system, a UE feeds information on a downlink channel state back to a BS so that the BS uses the information for downlink scheduling. That is, the UE measures a reference signal transmitted by the BS in downlink, and feeds information, extracted from the reference signal, back to the BS in a form defined in the LTE/LTE-A standard. In LTE/LTE-A, information fed back by a UE basically include the following three types.

Rank indicator (RI): the number of spatial layers which may be received by a UE in the current channel state Precoder matrix indicator (PMI): the indicator of a precoding matrix preferred by a UE in the current channel state Channel quality indicator (CQI): a maximum data rate at which a UE may receive data in the current channel state. A CQI may be substituted with an SINR which may be used similarly to a maximum data rate, a maximum error correction code rate, a modulation scheme, data efficiency per frequency, and so on.

The RI, PMI, and CQI are associated and have meanings. As one example, a precoding matrix supported in LTE/LTE-A is differently defined for each rank. For this reason, a PMI value when the RI has a value of 1 and a PMI value when the RI has a value of 2 are differently interpreted although they have the same value. Furthermore, it is assumed that when a UE determines a CQI, a rank value and PMI value notified by the UE with respect to a BS have been applied in the BS. That is, this means that if a UE notifies a BS of RI_X, PMI_Y, CQI_Z, when a rank is RI_X and precoding is PMI_Y, a data rate corresponding to CQI_Z may be received by the UE. If a UE assumes that it will perform which transmission method on a BS when it calculates a CSI as described above, it can obtain optimized performance when it perform actual transmission using the corresponding transmission method.

Hereinafter, embodiments of the disclosure are described in detail with reference to the accompanying drawings. Furthermore, in describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification. Hereinafter, a base station is a subject that performs resource assignment to a terminal, and may be at least one of an eNode B, a Node B, a BS, a radio access unit, a BS controller and a node on a network. A terminal may include a user equipment (UE), a mobile station (MS), a cellular phone, a smartphone, a computer and a multimedia system capable of performing a communication function. In the disclosure, downlink (DL) means the radio transmission path of a signal transmitted from a BS to a UE, and uplink (UL) means the radio transmission path of a signal transmitted from a UE to a BS. Furthermore, the embodiments of the disclosure are described below by taking an LTE or LTE-A system as an example, but the embodiments of the disclosure may be applied to other communication systems having a similar technical background or channel form. For example, a 5G mobile communication technology (new radio (NR)) being developed after LTE-A may be included in other communication systems. Furthermore, an embodiment of the disclosure may also be applied to other communication systems through some modification without greatly departing from the range of the disclosure based on a determination of a person who has skilled technical knowledge.

The contents of the disclosure may be applied in the FDD and TDD systems.

Hereinafter, in the disclosure, higher signaling is a signal transfer method from a BS to a UE using a downlink data channel of a physical layer or from a UE to a BS using an uplink data channel of a physical layer, and may be referred to as RRC signaling or PDCP signaling or a MAC control element (MAC CE).

As described above, at least the following three functions need to be satisfied in order to perform network coordination, such as signal transmission or interference management, through multiple cells, TRPs or beams.

The first function is channel estimation for multiple cells, TRPs or beams (or a combination of them). Unlike in an LTE CSI-RS always wideband transmitted based on a given cycle and time offset, in NR, a CSI-RS may be transmitted aperiodically and in a subband by taking into consideration various factors, such as forward compatibility.

Hereinafter, in the disclosure, detailed examples for performing one of the methods or multiple combinations are described.

Hereinafter, in the disclosure, the examples are described through multiple embodiments, but they are not independent and one or more embodiments may be applied at the same time or complexly.

(3-1) Embodiment: RS RE Mapping Method

Figure 3E:
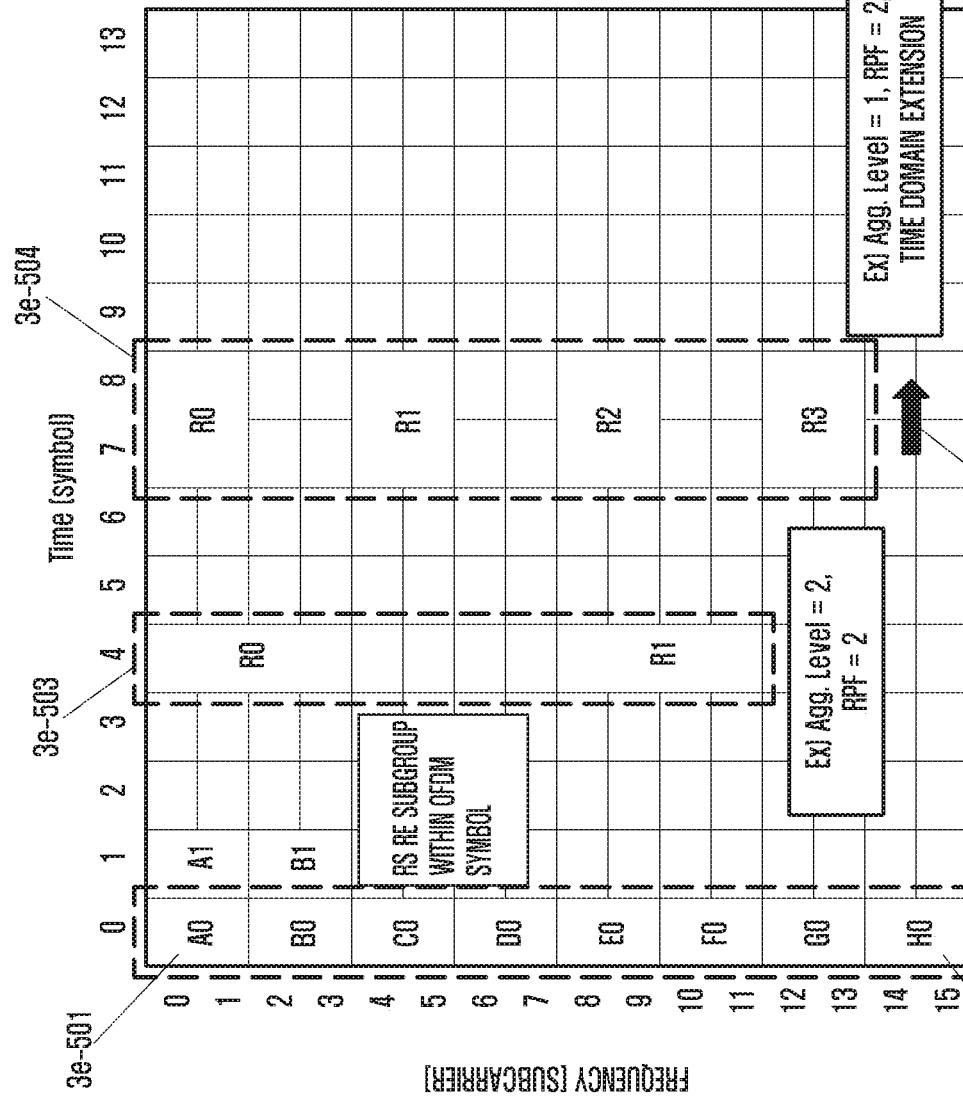
FIG. 3E is a diagram showing the PRB structure of an NR system according to a (4-1) embodiment of the disclosure.

The (3-1) embodiment provides a detailed example of an RS RE mapping method. FIG. 3E is a diagram showing an RE structure within a PRB when one PRB is configured with 16 subcarriers (longitudinal axis) and 14 OFDM (or SC-FDMA) symbols (transverse axis). In this case, one OFDM symbol is configured with 8 RS RE subgroups. In this case, the RS RE subgroup is a minimum unit of an RS configuration configured with neighboring two REs within the same OFDM symbol, and may be defined by various names, such as a component RS RE pattern or a component RS resource. In the disclosure, for convenience of description, 8 RS RE subgroups present in an X-th OFDM symbol are marked by $\{AX, BX, \ldots, HX\}$. For example, 8 RS RE subgroups of A0 3e-501 to H0 3e-502 are present in a No. 0 OFDM symbol. In this case, orthogonal cover code (OCC) of length 2 is applied to each RS RE subgroup. A maximum of two ports, for example, a port a and a port a+1 may be multiplexed (or assigned) with one RS RE subgroup depending on ([1 1] or [1 −1]).

In this case, an RS RE subgroup, that is, a minimum unit of the RS configuration, is configured with two REs neighboring on the frequency axis within an OFDM symbol. What two REs neighboring on the frequency axis becomes one RS configuration unit as described above is further meaningful in the above-described next-generation communication system, NR-based system or 5G system. In the next-generation communication system, to define an RS configuration unit using two REs neighboring on the frequency axis may be advantageous compared to a method of defining an RS configuration unit using two REs neighboring on the time axis because the transmission time interval (TTI) of a different length is taken into consideration depending on a plurality of different numerologies. That is, to define two or more REs neighboring on the frequency axis as an RS configuration unit is not a simple choice, and is an embodiment designed to derive technologically advanced results. Furthermore, the advantage of the proposed method may be identically applied to an LTE/LTE-A system because such an RS configuration method may be identically used in an LTE/LTE-A system in addition to a next-generation communication system.

In this example, a BS may signal pieces of information, such as a symbol index (or may be understood as a resource configuration index) in which an RS is transmitted in relation to RS transmission, a time and frequency domain aggregation level, a comb index or frequency domain measurement restriction information.

First, a BS notifies a UE that an RS will be transmitted at which location in a time axis through a symbol index (or resource configuration index) X in which an RS is transmitted to a UE.

An RS resource, that is, a unit by which an RS is actually transmitted, is configured as a combination of RS RE subgroups. In one RS resource, one RS antenna port is spread by OCC having the same length as the number of REs included in an RS resource and transmitted. This for facilitating interference management between RSs by providing various RS patterns according to a situation. To this end, a BS may notify a UE of an "aggregation level" through higher layer signaling or L1 signaling. The aggregation level may be configured with a time domain aggregation level indicative of an extension in the time axis and a frequency domain aggregation level indicative of an extension in the frequency axis (the aggregation level may be defined as various terms, such as a replication level, the number of (sub)time units within a CSI-RS resource, etc. when it is actually applied)

If 16 subcarriers are included in one PRB as in FIG. 3E, a frequency domain aggregation level is determined as one value of $\{1, 2, 4 \text{ or } 8\}$ (if one PRB includes 12 subcarriers, a value of the aggregation level is smaller than 8). A UE is aware that how many RS RE subgroups are grouped to form one RS resource according to a configured aggregation level. For example, when the aggregation level is 1, each RS RE subgroup is interpreted as each independent RS resource. In contrast, when the aggregation level is 2, two neighboring RS RE subgroups are grouped to form one RS resource. In the case of FIG. 3E, AX and BX are grouped to define the first RS resource. $\{CX, DX\}$, $\{EX, FX\}$, and $\{GX, HX\}$ define the second, the third, and the fourth RS resources, respectively. As another example, when the aggregation level is 8, a total of eight RS RE subgroups from AX to HX are grouped to configure one RS resource. Such a variable RS resource structure facilitates interference environment control attributable to various factors, such as UL-DL interference attributable to dynamic TDD and interference attributable to multiple numerologies (e.g., different subcarrier spacing).

If only a frequency domain aggregation is used, there is a danger that channel estimation performance may be degraded in the case of UEs whose RS power is important due to a coverage problem, such as a noise limited environment. In order to solve such a problem, an RS may be transmitted in one or more OFDM symbols using a time domain aggregation. For example, if a time domain aggregation is capable up to a maximum of two symbols, a time domain aggregation level is determined as one of $\{1 \text{ or } 2\}$ (if the time domain aggregation can be extended more than two symbols, the range of the value is increased). If the time domain aggregation is possible up to a maximum of four symbols, the time domain aggregation level is determined as one of $\{1 \text{ or } 2 \text{ or } 4\}$.

If an aggregation level is a value greater than 1, it is to be noted that OCC may also be extended in performing the aggregation. For example, it is assumed that as in the example 1 (3e-503) of FIG. 3E, A4 and B4 are grouped to form R0. In this case, OCC-2 ([1 1] or [1 −1]) of A4 and OCC-2 ([1 1] or [1 −1]) of B4 are extended to OCC-4 based on an RS port index in which R0 is transmitted. If RS ports a to a+3 are transmitted in the four REs of R0=[A4 B4], the first two ports are combined with OCC of A4 and B4 without OCC sign conversion for a rear portion half (B4). That is, OCC-4s of RS ports a and a+1 becomes [1 1 1 1] and [1 −1 1 −1]. In contrast, in the last two ports, OCCs of A4 and B4 are combined after OCC sign conversion for the rear portion half (B4). That is, OCC-4s of RS ports a+2 and a+3 become [1 1 −1 −1] and [1 −1 −1 1]. Although a time domain aggregation is applied as in the example 2 (3e-504) of FIG. 3E, the above-described OCC extension method may be applied in the same manner. In the case of 3e-504, in the example, the same OCC extension may be performed by substituting A4 and B4 with A7 and A8.

The OCC extension method may be generalized into an aggregation level of a higher level using a recursive function structure. Specifically, OCC of an aggregation level N is extended based on OCC of an aggregation level N/2. RS resources of the aggregation level N include two aggregation level N/2 RS resources, and a maximum of 2N RSs may be multiplexed with the RS resources. That is, assuming that "a" is a minimum RS port index that may be transmitted in RS resources of a corresponding aggregation level N, an RS port a to an RS port a+2N−1 are transmitted in a corresponding RS resource. RS ports that may be transmitted in the RS resources of the aggregation level N may be divided into two groups of {a, a+1, . . . , a+N−1} and {a+N, a+N+1, . . . , a+2N−1)}. In the case of ports belonging to the first group, the OCC-N patterns of two aggregation level N/2 RS resources configuring an aggregation level N RS resource are aggregated without sign conversion and extended to an OCC-2N pattern of an aggregation level N RS resource. In contrast, in the case of ports belonging to the second group, after the sign of the second OCC-N pattern of the OCC-N patterns of the two aggregation level N/2 RS resource configuring an aggregation level N RS resource is changed (or by multiplying the second OCC-N pattern by −1), the second OCC-N pattern is aggregated and extended as an OCC-2N pattern of an aggregation level N RS resource. A basic unit of the recursive function is the above-described RS RE subgroup.

The frequency domain and the time domain aggregation level have been illustrated as independent configuration values, for convenience of description, but may be defined as one value when they are actually applied.

If the time domain aggregation and the frequency domain aggregation are applied at the same time, the frequency domain aggregation is performed earlier than the time domain aggregation. This is for enabling the overlapping of one symbol based RS pattern and an RS pattern extended in the time domain, that is, transmitted in two or more symbols. If the frequency domain aggregation is first performed, the function may be performed because a pattern within one OFDM symbol is maintained regardless of whether the time domain aggregation is applied.

A BS may adjust RS RE density by configuring a comb type transmission or measurement restriction (MR) in the frequency domain. For example, if a BS configures the comb type transmission or measurement restriction based on a repetition factor (RPF) 2, a UE may divide RS resources, that is, the final determined value of an RS RE subgroup or aggregation of FIG. 3E, into two different groups, and may measure an RS only in one of the two groups. If a UE divides the RS resource based on an RS RE subgroup, the UE may configure two groups having a given interval, such as {AX, CX, EX, GX} and {BX, DX, FX, HX}. In this case, there is an advantage in that the two groups have the same RS RE transmission location regardless of an aggregation level. In contrast, if the UE divides RS resources after an aggregation, it may configure two groups, such as {AX, BX, EX, FX} and {CX, DX, GX, HX} as in 3e-503. In this case, there is an advantage in that RS interference management can be facilitated because even OCC patterns are precisely matched based on the aggregation level and RPF configuration.

In FIG. 3E, 3e-503 and 3e-504 show examples of RS resource configuration results according to an RS transmission OFDM symbol, an aggregation level and a comb type or frequency domain MR configuration. Specifically, 3e-503 is an example when a No. 4 OFDM symbol, a frequency domain aggregation level 2, a time domain aggregation level 1, and RPF=2 are configured. 3e-504 is an example when a No. 7 OFDM symbol, a frequency domain aggregation level 1, a time domain aggregation level 2, and RPF=2 are configured. In the present embodiment, a procedure for configuring RS resources, such as 3e-503 or 3e-504, has been described, but the results of the method, such as 3e-503 or 3e-504, may be stored in a storage medium when they are actually applied and may be implemented in a form in which reference is made to the results.

It is to be noted that the aggregation level and the comb type or frequency domain MR configuration may be agreed to be changed over time (or RS transmission location). For example, if multiple RS resources are configured in two or more OFDM symbols of one PRB, a different aggregation level and comb type or frequency domain MR configuration value may be applied based on an OFDM symbol. For example, if an RS is transmitted in a No. 1 OFDM symbol and a No. 8 OFDM symbol, it may be agreed that the No. 1 OFDM symbol may have high RS RE density by applying the RPF of a low value and the No. 8 OFDM symbol may have low RS RE density by applying the RPF of a high value. This is for securing channel estimation performance excellent at the initial stage of transmission not having already-obtained channel estimation information and for reducing an RS transmission burden in the middle or latter part of transmission using already obtained channel estimation information. In the example, it has been described that RS RE density within a PRB may be different, but needs not to be limited thereto. It is evident that the RS RE density may be extended to an RS RE density configuration between different subframes or TTIs. A change in the aggregation level and comb type or frequency domain MR configuration may be explicitly performed through higher signaling or L1 signaling or may be defined in the standard and implicitly performed. If the aggregation level and comb type or frequency domain MR configuration is changed explicitly through signaling, a BS may notify a UE of whether the aggregation level and comb type or frequency domain MR configuration will be changed over time. That is, the BS may selectively apply an RS RE density change over time (apply the RS RE density change when it is necessary and use the same RS RE density in other cases).

A BS may configure, in a UE, which RS is transmitted in an RS resource configured as in the example. For example, a BS may notify a UE that an RS resource configured by the example is one of a CSI-RS, SRS or DMRS through higher layer signaling.

The example has been described based on a non-zero-power (NZP) CSI-RS, NZP SRS, NZP DMRS, that is, an RS resource. However, the resource configuration method does not need to be necessarily limited to an NZP RS configuration. The method may be identically applied to a resource configuration for a zero-power (ZP) CSI-RS, ZP SRS, ZP DMRS for PDSCH rate matching.

As described above, a maximum of 2N RS ports may be multiplexed through OCC and transmitted in an RS resource of one aggregation level N. Assuming that 2N RS ports {a, a+1, . . . , a+2N−1} are transmitted in the RS resource, a value of a port index a does need to be the same in all PRBs of a full band. This is for supporting a case where a TRP in which an RS port is transmitted is different or a beam is different for each subband.

According to this example, a UE may recognize an RS resource and receive an RS based on at least one configuration of an RS transmission OFDM symbol, an aggregation level and a comb type or frequency domain MR. If a UE is notified of some of the configuration values through higher layer signaling or L1 signaling, there may be a problem in that a UE that has not received related signaling cannot find an accurate RS resource location. In order to minimize such a problem, initial values of the configuration values may be agreed. If related signaling is not present, a UE may assume the initial values and estimate an RS resource location. For example, if a UE has not received signaling information related to a frequency domain aggregation level, it may be agreed that the UE assumes the highest aggregation level (8 in the case of FIG. 3E). In this case, an average effect can be obtained although aggregation levels are not precisely matched because signaling is not received.

In this example, a method of configuring RS resources using an RS RE subgroup, configured with two REs (two neighbor subcarriers) neighboring in the frequency axis, as a basic unit has been described. However, it is evident that the extension method may be applied based on a basic pattern of a different form. For example, a minimum RS pattern of a fixed form is present, and some of the above-described methods may be applied upon additional extension based on the minimum RS pattern.

For example, the examples may be performed based on an RS RE subgroup configured with two REs neighboring in the time axis (two neighbor OFDM symbols), an RS RE subgroup configured with four REs present in two neighbor subcarriers and two neighbor OFDM symbols, or an RS RE subgroup configured with eight REs present in two neighbor subcarriers and four neighbor OFDM symbols. In this case, the RS RE subgroup may be identical with a CDM group. For example, if an RS RE subgroup configured with two REs is used, CDM-2 may be applied to each RS RE subgroup. If an RS RE subgroup configured with four REs is used, CDM-4 may be applied to each RS RE subgroup. If an RS RE subgroup configured with eight REs is used, CDM-8 may be applied to each RS RE subgroup.

(3-2) Embodiment: Interference Measurement Configuration

In the present embodiment, an interference measurement method for network coordination is described.

In an NR (5G) CSI framework, a flexible interference measurement method needs to be introduced in order to handle various wireless transmission environment, such as a variable TTI and multiple numerologies. If the TTI is long or subcarrier spacing (SCS) is small, a resource allocation (RA) unit of a system or a time unit of a precoding change becomes long because a change unit in the time axis becomes long. In contrast, if the TTI is short or subcarrier spacing is large, an RA unit of a system or a time unit of a precoding change becomes short because a change unit in the time axis becomes short. The TTI or subcarrier spacing may be configured based on the channel situation of each UE, and thus it may be analogized that several types of interference may change in various time units within one cell. This means that unlike in LTE operating in a single TTI and single subcarrier spacing (in most cases), in NR, a change in interference may be very large. DL-UL interference or UL-DL interference attributable to dynamic TDD is another factor that may amplify such an interference change.

It is important for an interference measurement (IM) method in NR to have the following two functions by taking such a characteristic into consideration:

In NR, resolution for IM needs to be designed by taking into consideration the smallest time or frequency granularity among pieces of interference that may occur. That is, although a time unit for the data/control transmission of a given UE is long (when the TTI is long or SCS is small), if a time unit for a change in interference is short, there is a need for IM having a short time unit for estimating the time unit.

In order to perform accurate interference measurement in various interference situations, both 1) a signal-based interference extraction scheme and a 2) a puncturing-based interference (power) measurement scheme need to be supported.

Figure 3F:
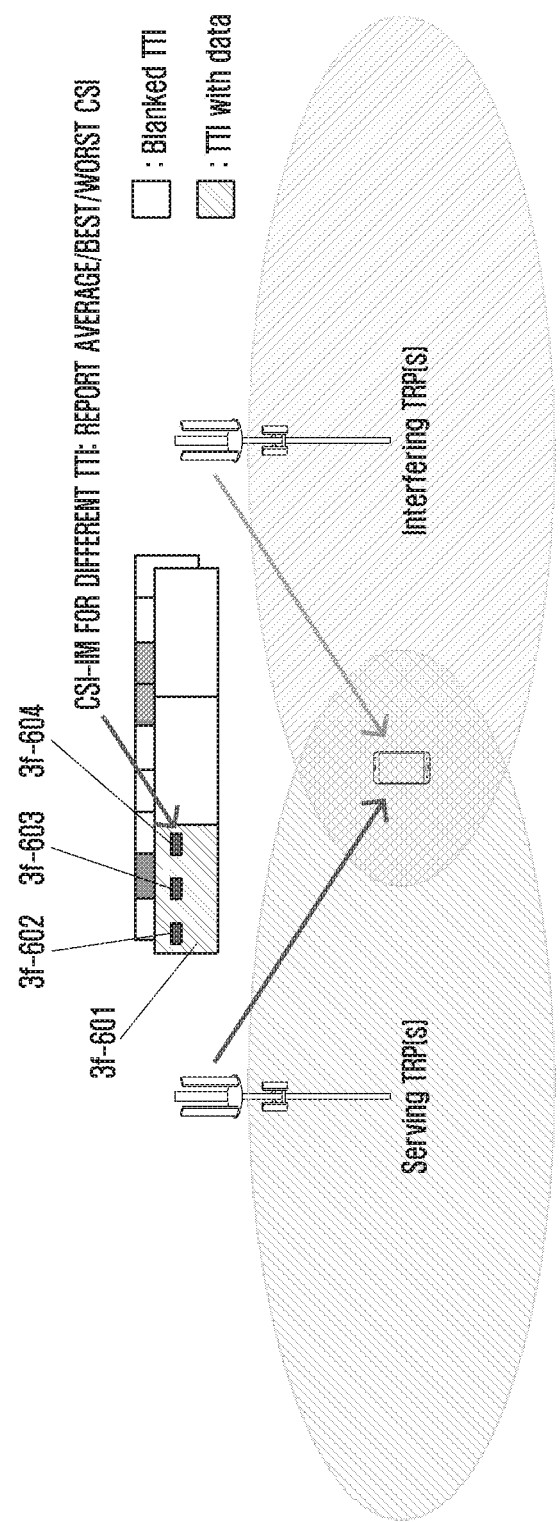
FIG. 3F is a diagram showing an example of an IM resource configuration according to a (4-2) embodiment of the disclosure.

FIG. 3F is a diagram showing an example in which interference occurs when the TTI of a serving TRP and the TTI of an interference TRP are different. FIG. 3F implies that a change in the SNIR may be several within one TTI if the TTI of interference is short although the TTI of a desired channel is long. Assuming that only one of three IM resources 3*f*-602, 3*f*-603, 3*f*-604 is used within one TTI 3*f*-601 in which data is transmitted, 3*f*-602 and 3*f*-604 measure only interference when the interfering TRP of FIG. 3F does not perform transmission and 3*f*-603 measures only interference when the interfering TRP of FIG. 3F performs transmission. Accordingly, there may be a difficulty in measuring an interference influence on 3*f*-601. In order to solve such a problem the following two schemes may be taken into consideration.

The first method is to enable a UE to use a sufficient number of IM resources for the statistical value measurement of interference. As an example of this method, a BS may configure a measurement restriction of a different value for channel estimation and interference estimation. For example, a short measurement window may be used by taking a CSI-RS beam change into consideration when channel estimation is performed, but a measurement window of a long length may be used to obtain statistical values when interference estimation is performed. Another example of this method, an IM resource may be configured in a smaller unit interval than that of an RS resource (e.g., the RS resource is configured per subframe, whereas the IM resource is configured in a slot or mini-slot (e.g., 2 or 4 OFDM symbols) unit). Referring to FIG. 3F, one S resource is configured in 3*f*-601, whereas an IM resource is configured in each of 3*f*-602, 3*f*-603, and 3*f*-604 based on a time unit of interference.

The second method is to provide an IM resource having high resolution for accurate and immediate interference measurement. This may be understood similar to the second example of the first method. That is, an IM resource is configured in a smaller unit interval than an RS resource (e.g., the RS resource is configured per subframe, whereas the IM resource is configured in a slot or mini-slot (e.g., 2 or 4 OFDM symbols) unit). Referring to FIG. 3F, one RS resource is configured in 3f-601, whereas an IM resource is configured in each of 3f-602, 3f-603, 3f-604 based on a time unit of interference.

For interference measurement, 1) the signal-based interference extraction scheme and 2) the puncturing-based interference (power) measurement scheme may be taken into consideration as described above. The signal-based interference extraction scheme is to measure one of predetermined signals, such as a CSI-RS or a DMRS, and to consider the measured signal to be interference. In this case, a BS transmits a signal for actual interference measurement. The corresponding signal may be used for various usages, such as that a UE generates a new interference hypothesis by combining measured interference signals in addition to interference signal measurement loaded onto the corresponding signal after estimation (CSI-RS-based IM, DMRS-based IM, a DMRS-based CQI, etc.). Meanwhile, in the case of puncturing-based interference measurement, a serving TRP may not transmit an actual signal in a corresponding resource after an IM resource configuration. In this case, a UE may measure power of actual interference in the punctured corresponding resource and incorporate the measured power into the generation of a CSI. According to the embodiment 3-1, a DL CSI-RS/UL CSI-RS/DMRS configuration may be supported by a single framework, and a feedback configuration or feedback contents may be changed depending on the above-described IM usage.

(3-3) Embodiment: QCL Signaling

Figure 3G:
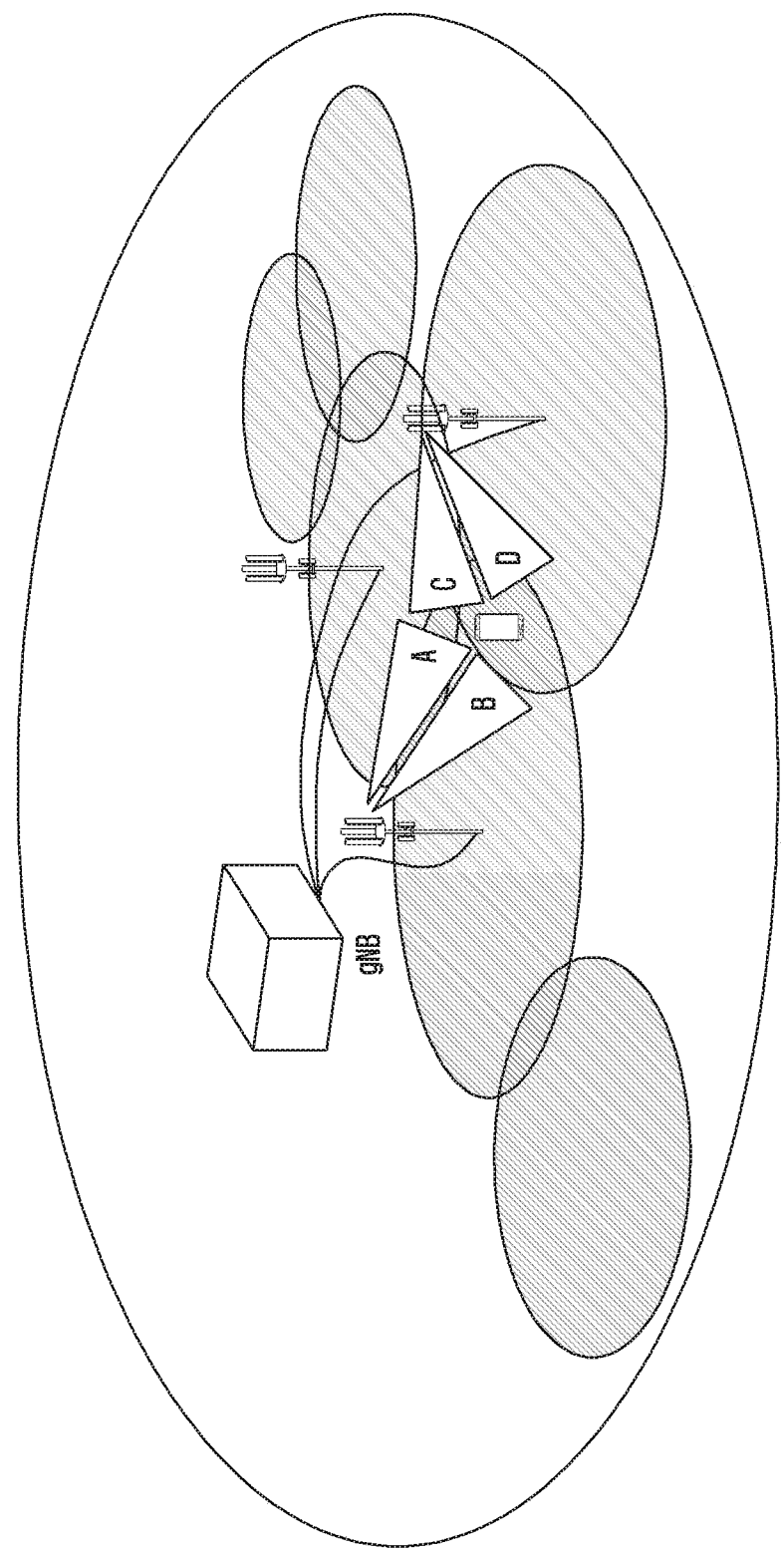
FIG. 3G is a diagram showing an example of network coordination.

The present embodiment provides a quasi co-location (QCL) configuration method according to various network coordination environments. FIG. 3G shows an example of a network coordination scenario. Referring to FIG. 3G, one cell (gNB) may have multiple TRPs. In this case, the TRPs may be distinguished by CSI-RS resources (or CSI-RS ports). For example, a UE may be configured with four CSI-RS resources A, B, C, and D as in FIG. 3G. In this case, it is assumed that the RS resources A and B are transmitted at a TRP 1 and the RS resources C and D are transmitted at a TRP 2. In this case, the UE may report its preferred subset of all RS resource sets to a BS through a CSI-RS resource indicator (CRI), and may transmit and receive data based on a beam direction applied to corresponding resources. In this case, if the UE has selected the resources A and C transmitted at different TRPs, CSI-RSs transmitted in the corresponding resources may have the same QCL properties, such as a delay shift, delay spread, a Doppler shift, Doppler spread, and AoD spread. Furthermore, unlike in LTE-A, in NR, a CSI-RS may be transmitted in a subband. In this case, the QCL support with another RS may be necessary for a time or frequency offset compensation. That is, in NR, QCL support for various RSs, such as a subband CSI-RS, in addition to a DMRS may need to be taken into consideration, and a flexible QCL configuration is necessary by taking various transmission scenarios into consideration.

FIG. 3H shows an example of QCL signaling which may be taken into consideration upon single point transmission. Referring to FIG. 3H, if a CSI-RS is transmitted using one beam because the angular spread of a channel is small, a CSI-RS and a DMRS for data transmission may share all QCL properties. In contrast, if the angular spread of a channel is large and one or more dominant paths are present, channel estimation may be performed using two or more CSI-RS beams and to share QCL properties between all CSI-RS port groups and DMRS port groups may be impossible (e.g., angle of departure (AoD)). In this case, a not-shared given QCL property needs to be configured to be shared between some CSI-RS port groups and DMRS port groups (e.g., AoD information is shared only between a CSI-RS and DMRS corresponding to an upper path and a CSI-RS and DMRS corresponding to a lower path in the multi-beam drawing of FIG. 3H).

FIG. 3I shows an example of QCL signaling which may be taken into consideration upon multi-point transmission. In FIG. 3I, for convenience of description, only single beam (when angular spread is small) has been illustrated, and a multi-beam case may be expressed with reference to the description of FIG. 3H. Referring to FIG. 3I, for a transmission scheme, such as coherent joint transmission (JT), one DMRS and one CSI-RS port may be transmitted at multiple TRPs in the same frequency/time resource. This may be understood that RS ports are shared between TRPs. In this case, the DMRS may share CSI-RSs and QCL properties. As another example, for a transmission scheme, such as non-coherent JT, multiple CSI-RSs and DMRS ports may be transmitted through at different TRPs in an independent frequency/time resource. In this case, unlike the above example, RSs transmitted through the same TRP or same beam may share QCL properties, but should not share a QCL property if they are transmitted through different TRPs or different beams.

Accordingly, when a time/frequency offset compensation is performed on an RS peripherally transmitted in the time/frequency axis, all the environments, such as FIGS. 3G, 3H and 3I, need to be taken into consideration. To this end, a BS may configure a QCL master set and a QCL slave set through higher layer signaling. The QCL master set is transmitted in a sufficiently wide band from which a QCL property can be extracted. Time duration between RS REs is configured with the IDs of sufficiently short RSs. For example, if such an RS is four, the BS may define the QCL master set as follows.

$QCL_{MASTER\_SET}$={RS ID #1, RS ID #2, RS ID #3, RS ID #4}

The QCL slave set is transmitted in a narrow band on which a time/frequency offset compensation will be performed based on QCL properties extracted from the master set or is configured with the IDs of RSs having long time duration between RS REs. If such RSs are three, the BS may define a QCL slave set as follows.

$QCL_{SLAVE\_SET}$={RS ID #5, RS ID #6, RS ID #7}

In the example, RS ID #N is an ID indicative of signaling, such as at least one DL CSI-RS, an UL CSI-RS (SRS) or a DMRS.

A BS may configure at least one QCL subgroup based on the QCL master set and slave set, and may notify a UE of the QCL subgroup through higher layer signaling. In this case, each QCL subgroup is configured with master and slave configuration components. The mater component and slave component within the QCL subgroup is an indicator to designate a QCL property master-servant relation between the QCL master set and the QCL slave set. It is assumed that an N-th QCL subgroup has been configured as follows.

$QCL_{SUBGROUP\ \#N}$={
$SUBGROUP_{MASTER}$={A, A, A, B}
$SUBGROUP_{SLAVE}$={A, B, NAN}

A UE is aware that RSs indicated by RS IDs #1, #2, #3 and an RS indicated by an RS ID #5 are included in the same QCL subgroup A by receiving the $QCL_{SUBGROUP\ \#N}$. Accordingly, the UE may correct the time/frequency offset of the RS, indicated by the RS ID #5, through QCL properties estimated in the RSs indicated by the RS IDs #1, #2, #3. Likewise, the UE is aware that an RS indicated by an RS ID #4 and an RS indicated by an RS ID #6 are included in the same QCL subgroup B by receiving the $QCL_{SUBGROUP}$ #N. Accordingly, the UE may correct the time/frequency offset of the RS, indicated by the RS ID #6, through QCL properties estimated in the RS indicated by the RS ID #4. The UE may be aware that an RS ID #7 is not included in any QCL subgroup because an $SUB\text{-}GROUP_{SLAVE}$ value is NAN. Accordingly, an RS indicated by the RS ID #7 becomes an independent RS in the QCL viewpoint.

A BS may notify a UE that a configuration at which place among the $QCL_{SUBGROUP}$ configurations will be used through L1 signaling. For example, if a network coordination scenario that requires four different QCL configurations is present, a BS configures four QCL subgroups ($QCL_{SUBGROUP\ \#1}$, $QCL_{SUBGROUP\ \#2}$, $QCL_{SUBGROUP\ \#3}$, $QCL_{SUBGROUP\ \#4}$). Thereafter, a UE may receive 2-bit L1 signaling and determine whether to correct a time/frequency offset based on which one of the configurations ($QCL_{SUBGROUP\ \#1}$, $QCL_{SUBGROUP\ \#2}$, $QCL_{SUBGROUP\ \#3}$, $QCL_{SUBGROUP\ \#4}$).

Figure 3J:
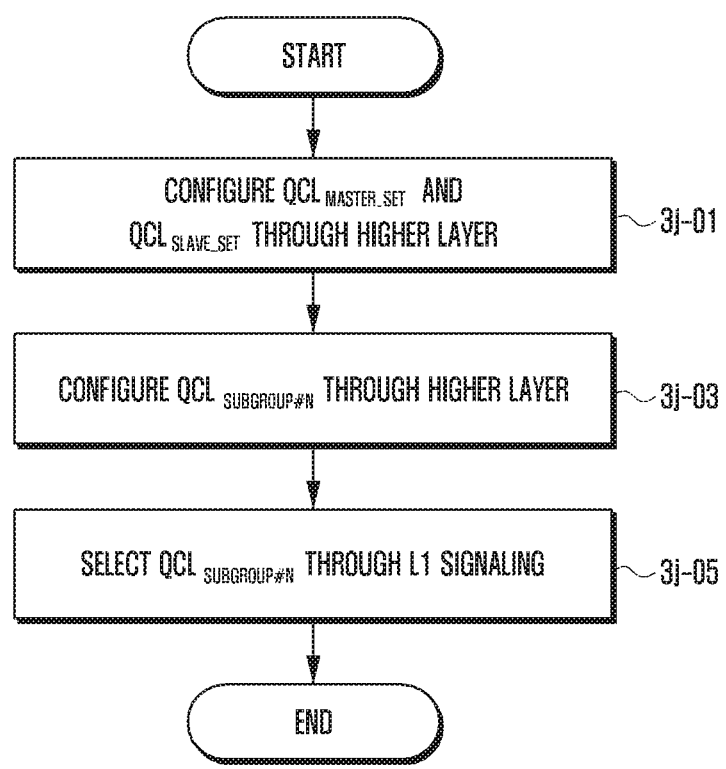
FIG. 3J is a diagram showing a flowchart of a (4-3) embodiment of the disclosure.

The execution sequence of the embodiment 3-3 is arranged as in FIG. 3J (3*j*-01, 3*j*-03, 3*j*-05).

(3-4) Embodiment: OFDM Symbol Location for CSI-RS Transmission

The embodiment 3-1, 3-2 or 3-3 may be applied based on a CSI-RS transmitted by OFDM symbols at various locations within a slot including the CSI-RS. The slot including the CSI-RS may be determined by CSI-RS timing information (e.g., CSI-RS subframe/slot configuration including periodicity and offset information) configured by a higher layer in the case of a periodical CSI-RS or a semi-persistent CSI-RS. In the case of the aperiodic CSI-RS, the slot including the CSI-RS may be a slot spaced apart from DCI that triggers aperiodic CSI-RS transmission at an interval of a given time. The present embodiment provides various examples of an OFDM symbol location for CSI-RS transmission within the slot including the CSI-RS.

Figure 3K:
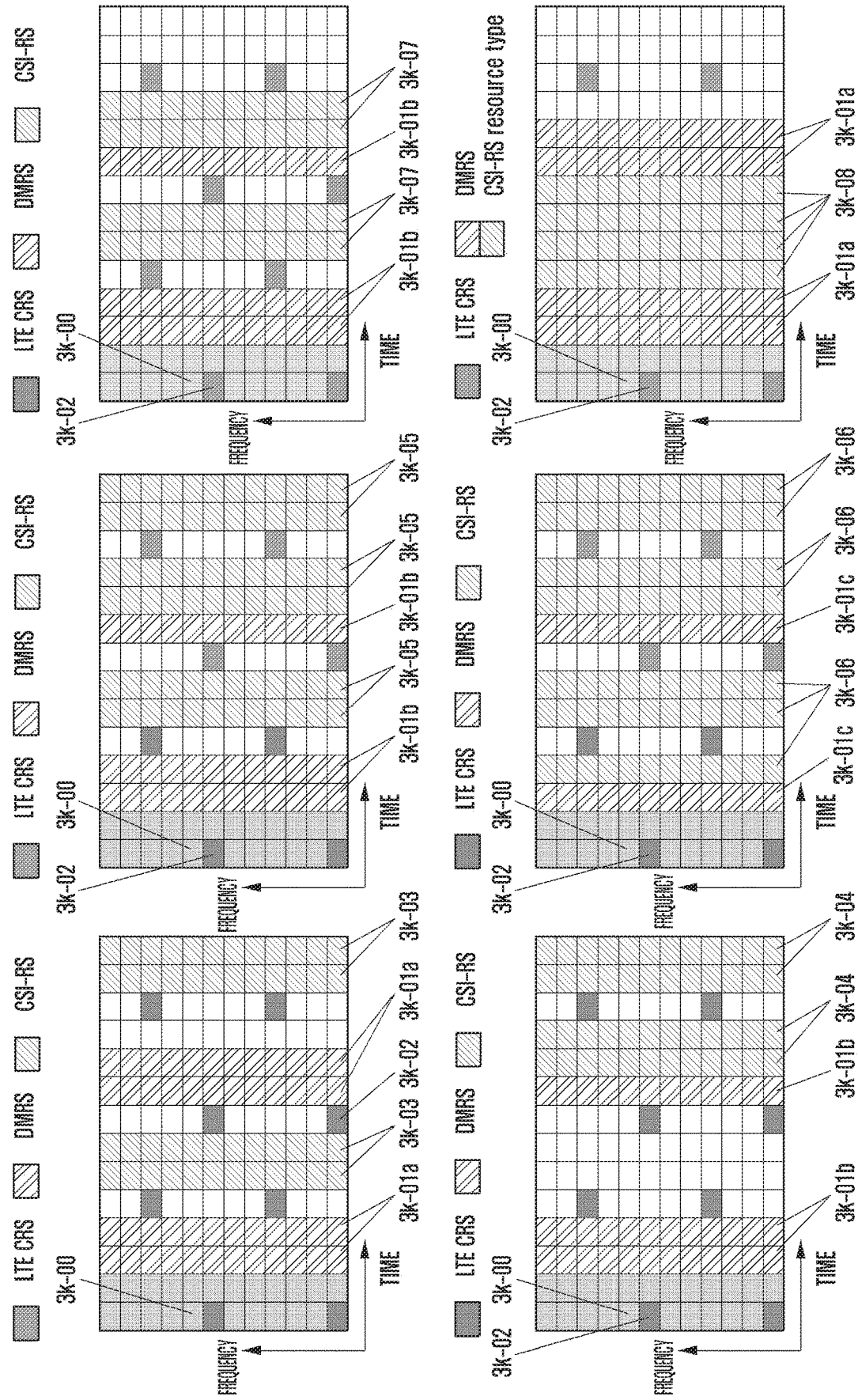
FIG. 3K is a diagram showing examples in which OFDM symbols for NR CSI-RS transmission of the disclosure avoid OFDM symbols for NR DMRS and NR PDCCH transmission and OFDM symbols for LTE CRS transmission.

FIG. 3K is a diagram showing examples in which OFDM symbols for NR CSI-RS transmission avoid OFDM symbols for NR DMRS and NR PDCCH transmission and OFDM symbols for LTE CRS transmission.

In the first example of FIG. 3K, in order to avoid a resource 3*k*-00 for PDCCH transmission, a resource 3*k*-01*a* for DMRS transmission, and a resource 3*k*-02 for transmitting an LTE CRS, a non-zero power (NZP) or zero-power (ZP) CSI-RS may be transmitted/configured in Nos. 6, 7, 13, 14 OFDM symbols 3*k*-03 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*k*-03 may be configured according to the embodiment 3-1 and embodiment 3-2. In this example, the resource 3*k*-01*a* for DMRS transmission has been assumed to be transmitted in Nos. 3, 4, 9, 10 OFDM symbols. This is for providing high layer MIMO transmission or accurate DMRS channel estimation for a high-speed UE. If a CSI-RS is transmitted in 3*k*-03, there are advantages in that the CSI-RS reception structure of a UE becomes simple and rate matching becomes easy because CSI-RS patterns are identical between the slot including 14 symbols and a mini-slot including seven symbols. If three OFDM symbols or more are used for the transmission of a lot of 24 CSI-RS ports or more, however, there is a disadvantage in that channel estimation accuracy may be degraded due to a phase drift because one CSI-RS is transmitted in six OFDM symbol TTIs or more.

In the second example of FIG. 3K, in order to avoid a resource 3*k*-00 for PDCCH transmission, a resource 3*k*-01*b* for DMRS transmission, and a resource 3*k*-02 for transmitting an LTE CRS, an NZP or ZP CSI-RS may be transmitted/configured in Nos. 10, 11, 13, 14 OFDM symbols 3*k*-04 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*k*-04 may be configured according to the embodiment 3-1 and the embodiment 3-2. In this example, the resource 3*k*-01*b* for DMRS transmission has been assumed to be transmitted in No. 3, 4, 9 OFDM symbols. This is for providing high layer MIMO transmission or accurate DMRS channel estimation for a high-speed UE and also adjusting RS overhead. If a CSI-RS is transmitted in 3*k*-04, there are advantages in that many CSI-RS ports can be transmitted within a short time although the CSI-RS ports are transmitted within one CSI-RS resource, transmission is robust against a channel change over time, and LTE UEs can perform rate matching on most of NR CSI-RS resources. However, there is a disadvantage in that this is disadvantageous to faster CSI feedback because CSI-RS resources are disposed at the latter part of a slot.

In the third example of FIG. 3K, in order to avoid a resource 3*k*-00 for PDCCH transmission, a resource 3*k*-01*b* for DMRS transmission, and a resource 3*k*-02 for transmitting an LTE CRS, an NZP or ZP CSI-RS may be transmitted/configured in Nos. 6, 7, 10, 11, 13, 14 OFDM symbols 3*k*-05 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*k*-05 may be configured according to the embodiment 3-1 and the embodiment 3-2. In this example, the resource 3*k*-01*b* for DMRS transmission has been assumed to be transmitted in Nos. 3, 4, 9 OFDM symbols. This is for providing high layer MIMO transmission or accurate DMRS channel estimation for a high-speed UE and also adjusting RS overhead. 3*k*-05 can support 3*k*-03 or 3*k*-04 versus CSI-RS resources in various cases, and an advantage of 3*k*-03 or 3*k*-04 may be properly taken according to the situation. However, the number of cases increased as described above increases UE and BS implementation complexity.

In the fourth example of FIG. 3K, in order to avoid a resource 3*k*-00 for PDCCH transmission, a resource 3*k*-01*c* for DMRS transmission, and a resource 3*k*-02 for transmitting an LTE CRS, an NZP or ZP CSI-RS may be transmitted/configured in Nos. 4, 6, 7, 10, 11, 13, 14 OFDM symbols 3*k*-06 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*k*-06 may be configured according to the embodiment 3-1 and the embodiment 3-2. In this example, the resource 3*k*-01*c* for DMRS transmission has been assumed to be transmitted in Nos. 3, 9 OFDM symbols. This is for minimizing RS overhead. Advantages and disadvantages of 3*k*-06 are similar to those of the third example (3*k*-05), and a detailed description thereof is omitted. The selection of 3*k*-05 or 3*k*-06 may be explicitly indicated through higher signaling or L1 signaling or may be implicitly determined from a DMRS pattern configuration of a BS. To implicitly indicate the selection means that available CSI-RS resources may vary when a BS indicates a different DMRS pattern, such as 3*k*-01*b* or 3*k*-01*c*, so that a UE uses the different DMRS pattern.

In the fifth example of FIG. 3K, in order to avoid a resource 3*k*-00 for PDCCH transmission, a resource 3*k*-01*b* for DMRS transmission, and a resource 3*k*-02 for transmitting an LTE CRS, an NZP or ZP CSI-RS may be transmitted/configured in Nos. 6, 7, 10, 11 OFDM symbols 3*k*-07 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*k*-07 may be configured according to the embodiment 3-1 and the embodiment 3-2. In this example, the resource 3*k*-01*b* for DMRS transmission has been assumed to be transmitted in Nos. 3, 4, 9 OFDM symbols. This is for providing high layer MIMO transmission or accurate DMRS channel estimation for a high-speed UE and also adjusting RS overhead. If a CSI-RS is transmitted in 3*k*-07, the number of OFDM symbols necessary for CSI-RS resource transmission including 24 CSI-RS ports or more is less than 6, which is between 3*k*-03 and 3*k*-04. There is an advantage in that LTE UEs can perform rate matching on most of NR CSI-RS resources. However, it may be difficult to avoid an LTE PSS/SSS/PBCH because an NZP or ZP CSI-RS may not be configured in Nos. 13, 14 OFDM symbols. There may be a disadvantage, such as that faster PDSCH decoding of a UE is influenced.

In the sixth example of FIG. 3K, in order to avoid a resource 3*k*-00 for PDCCH transmission and a resource 3*k*-01*a* for DMRS transmission, an NZP or ZP CSI-RS may be transmitted/configured in Nos. 5, 6, 7, 8 OFDM symbols 3*k*-08 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*k*-08 may be configured according to the embodiment 3-1 and the embodiment 3-2. In this example, the resource 3*k*-01*a* for DMRS transmission has been assumed to be transmitted in Nos. 3, 4, 9, 10 OFDM symbols. This is for providing high layer MIMO transmission or accurate DMRS channel estimation for a high-speed UE. The influence of a channel change over time can be minimized because one CSI-RS resource may be transmitted in contiguous OFDM symbols regardless of the number of CSI-RS ports transmitted when a CSI-RS is transmitted in 3*k*-08. In this case, however, there is a disadvantage in that it is difficult to avoid a collision against an OFDM symbol in which an LTE CRS 3*k*-02 is transmitted.

Figure 3L:
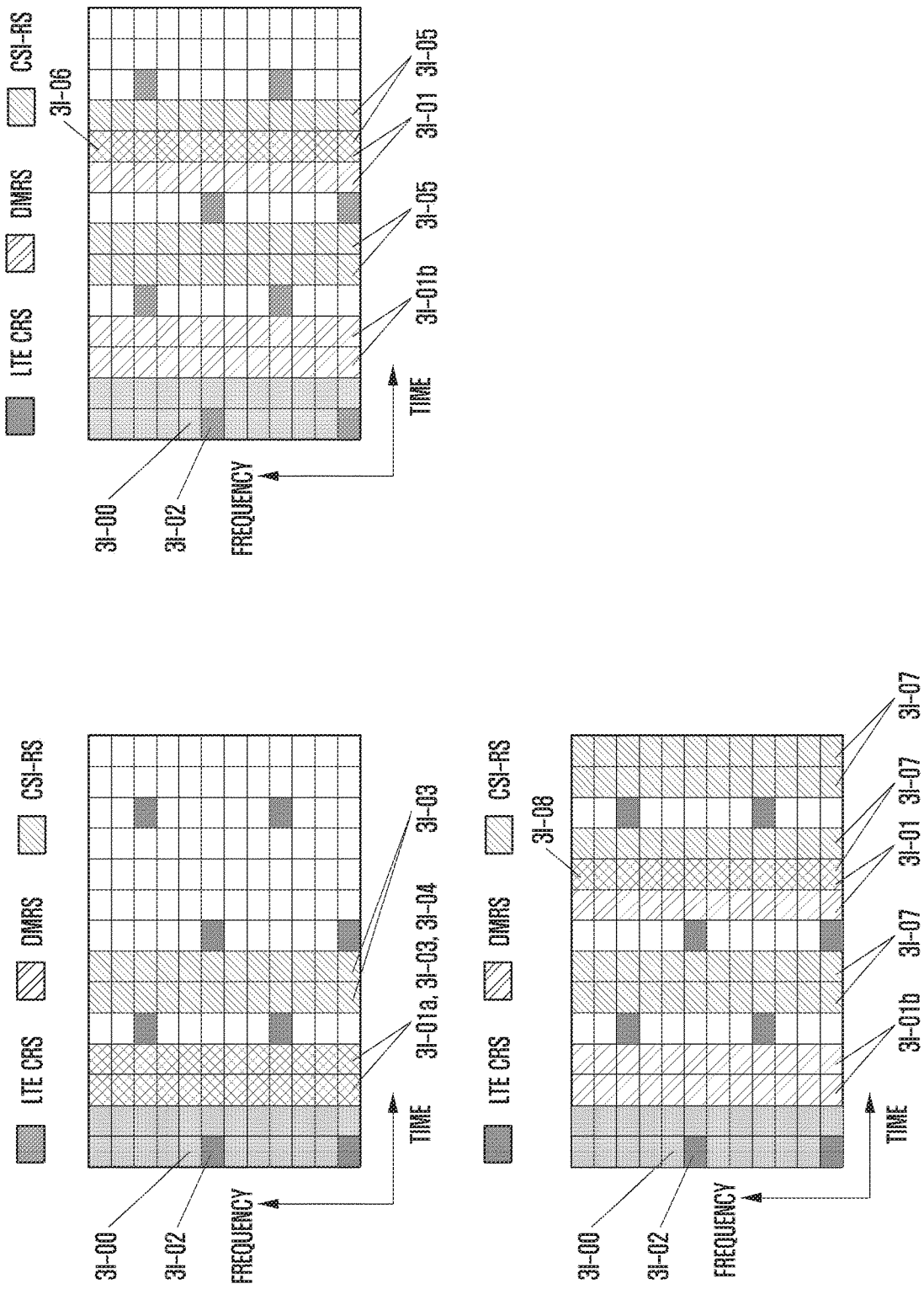
FIG. 3L is a diagram showing other examples in which OFDM symbols for NR CSI-RS transmission of the disclosure avoid OFDM symbols for NR DMRS and NR PDCCH transmission and OFDM symbols for LTE CRS transmission.

FIG. 3L is a diagram showing other examples in which OFDM symbols for NR CSI-RS transmission avoid OFDM symbols for NR DMRS and NR PDCCH transmission and OFDM symbols for LTE CRS transmission. However, in the examples of FIG. 3L, some OFDM symbols for DMRS transmission may be shared for CSI-RS transmission.

In the first example of FIG. 3L, in order to avoid a resource 3*l*-00 for PDCCH transmission and a resources 3*l*-02 for transmitting an LTE CRS, an NZP or ZP CSI-RS may be transmitted/configured in Nos. 3, 4, 6, 7 OFDM symbols 3*l*-03 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*l*-03 may be configured according to the embodiment 3-1 and the embodiment 3-2. In this example, the resource 3*l*-01*a* for DMRS transmission has been assumed to be transmitted in Nos. 3, 4 OFDM symbols. This is for supporting the faster PDSCH decoding of a UE or supporting simultaneous transmission of DL/UL within one slot. A DMRS and CSI-RS may be TDM/FDM/CDMed in the first two OFDM symbols 3*l*-04 of the four OFDM symbols of 3*l*-03.

In the second example of FIG. 3L, in order to avoid a resource 3*l*-00 for PDCCH transmission and a resources 3*l*-02 for transmitting an LTE CRS, an NZP or ZP CSI-RS may be transmitted/configured in Nos. 6, 7, 10, 11 OFDM symbols 3*l*-05 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*l*-05 may be configured according to the embodiment 3-1 and the embodiment 3-2. In this example, the resource 3*l*-01*b* for DMRS transmission has been assumed to be transmitted in Nos. 3, 4, 9, 10 OFDM symbols. This is for providing high layer MIMO transmission or accurate DMRS channel estimation for a high-speed UE. A DMRS and CSI-RS may be TDM/FDM/CDMed in the third OFDM symbol 3*l*-06 of the four OFDM symbols of 3*l*-05. If a CSI-RS is transmitted in 3*l*-05, there are advantages in that many CSI-RS ports can be transmitted within a short time although the CSI-RS ports are transmitted within one CSI-RS resource and thus transmission is robust against a channel change over time. There is an advantage in that both a DMRS and a CSI-RS can be transmitted within a short time when the number of DMRS REs used is small.

In the third example of FIG. 3L, in order to avoid a resource 3*l*-00 for PDCCH transmission and a resources 3*l*-02 for transmitting an LTE CRS, an NZP or ZP CSI-RS may be transmitted/configured in Nos. 6, 7, 10, 11, 13, 14 OFDM symbols 3*l*-07 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*l*-07 may be configured according to the embodiment 3-1 and the embodiment 3-2. In this example, the resource 3*l*-01*b* for DMRS transmission has been assumed to be transmitted in Nos. 3, 4, 9, 10 OFDM symbols. This is for providing high layer MIMO transmission or accurate DMRS channel estimation for a high-speed UE. A DMRS and CSI-RS may be TDM/FDM/CDMed in the third OFDM symbol 3*l*-08 of the six OFDM symbols of 3*l*-07. If a CSI-RS is transmitted in 3*l*-07, there are advantages in that many CSI-RS ports can be transmitted within a short time although the CSI-RS ports are transmitted within one CSI-RS resource and thus transmission is robust against a channel change over time. If the number of DMRS REs used is small, there is an advantage in that both a DMRS and a CSI-RS can be transmitted within a short time.

Figure 3M:
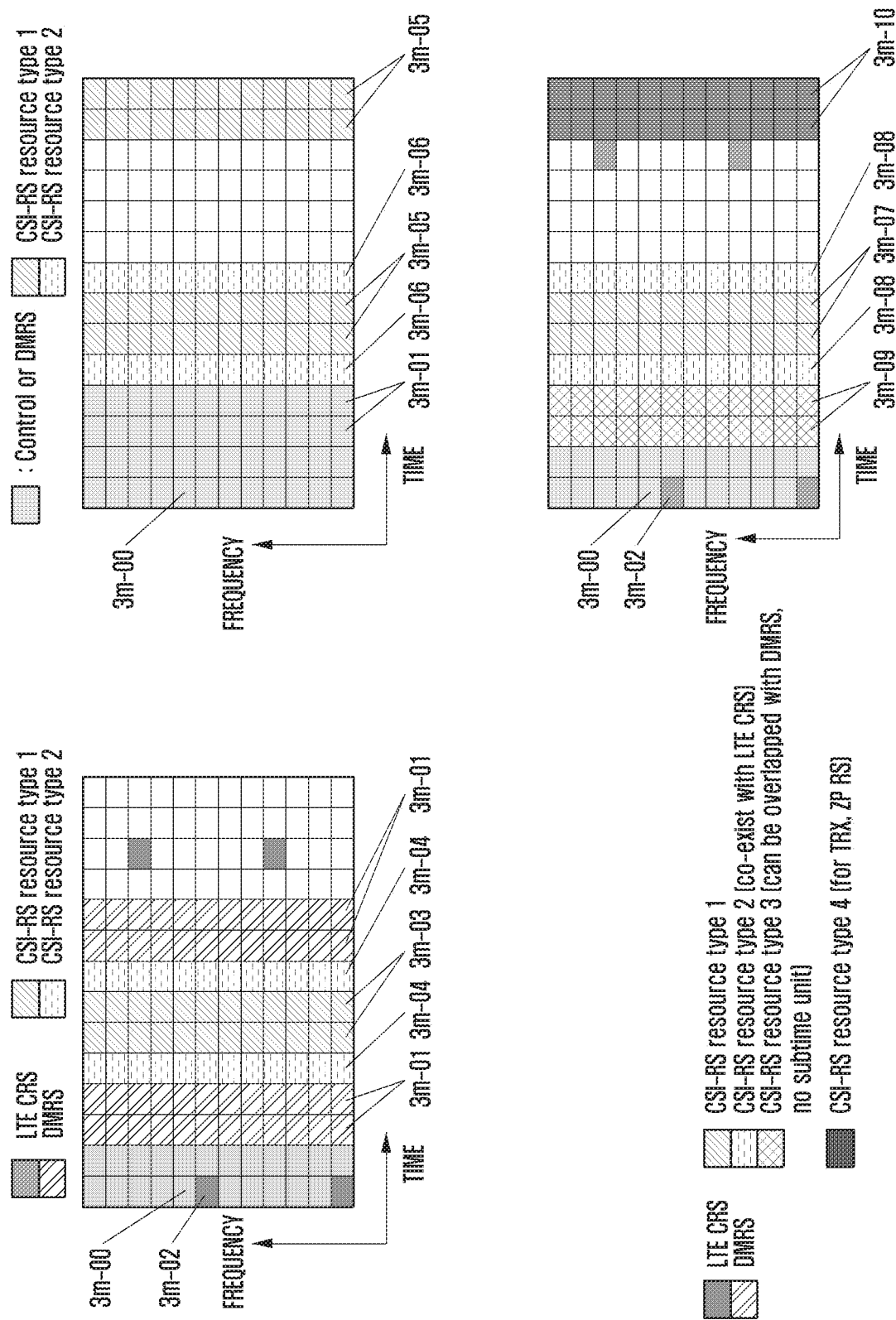
FIG. 3M is a diagram showing examples for coexistence between various signals, such as an NR CSI-RS/NR DMRS/LTE CRS, through the subgrouping of NR CSI-RS resources of the disclosure.

FIG. 3M is a diagram showing examples for coexistence between various signals, such as an NR CSI-RS/NR DMRS/LTE CRS, through the subgrouping of NR CSI-RS resources.

In the first example of FIG. 3M, in order to avoid a resource 3*m*-00 for PDCCH transmission and resources 3*m*-01 for DMRS transmission, an NZP or ZP CSI-RS may be transmitted/configured in Nos. 5, 6, 7, 8 OFDM symbols 3*m*-03, 3*m*-04 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*m*-03 and 3*m*-04 may be configured according to the embodiment 3-1 and the embodiment 3-2. In this example, the resource 3*m*-01 for DMRS transmission has been assumed to be transmitted in Nos. 3, 4, 9, 10 OFDM symbols. This is for providing high layer MIMO transmission or accurate DMRS channel estimation for a high-speed UE. In this example, 3*m*-04 having the possibility of a collision against an LTE CRS has lower priority than 3*m*-03 not having the possibility of a collision against other signals. For example, when a CSI-RS resource having a small number of eight CSI-RS ports or less are configured, 3*m*-03 may be first used. If a large number of eight CSI-RS ports or more are configured, 3*m*-04 may be additionally used in addition to 3*m*-03. In this case, if an LTE CRS and an NR CSI-RS are transmitted together in 3*m*-04, a BS may apply separate CSI-RS power boosting on 3*m*-04 and 3*m*-03 and may transmit information on the separate CSI-RS power boosting to a UE through two power boosting information parameters Pc.

In the second example of FIG. 3M, in order to avoid a resource for PDCCH transmission and resources 3*m*-00 for DMRS transmission, an NZP or ZP CSI-RS may be transmitted/configured in Nos. 5, 6, 7, 8, 13, 14 OFDM symbols 3*m*-05 and 3*m*-06 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*m*-05 and 3*m*-06 may be configured according to the embodiment 3-1 and the embodiment 3-2. In this example, 3*m*-06 having the possibility of a collision against an LTE CRS has lower priority than 3*m*-05 not having the possibility of a collision against other signals. For example, when a CSI-RS resource having a small number of eight CSI-RS ports or less is configured, 3*m*-05 may be first used. When a CSI-RS resource having a large number of eight CSI-RS ports or more is configured, 3*m*-06 may be additionally used in addition to 3*m*-05. In this case, if an LTE CRS and an NR CSI-RS are transmitted together in 3*m*-06, a BS may apply separate CSI-RS power boosting on 3*m*-06 and 3*m*-05, and may transmit information on the separate CSI-RS power boosting to a UE through two power boosting information parameters Pc.

In the third example of FIG. 3M, in order to avoid a resource 3*m*-00 for PDCCH transmission and resources 3*m*-01 for DMRS transmission, an NZP or ZP CSI-RS may be transmitted/configured in Nos. 3, 4, 5, 6, 7, 8, 13, 14 OFDM symbols 3*m*-07, 3*m*-08, 3*m*-09, and 3*m*-10 in one slot configured with 14 OFDM symbols. If one slot includes seven OFDM symbols or less, corresponding OFDM symbol numbers may be changed accordingly. In this case, a detailed RE pattern configuration for the NZP CSI-RS or ZP CSI-RS, ZP SRS within 3*m*-07, 3*m*-08, 3*m*-09 and 3*m*-10 may be configured according to the embodiment 3-1 and the embodiment 3-2. In this example, 3*m*-08 having the possibility of a collision against an LTE CRS or 3*m*-09 that needs to be multiplexed with a DMRS has lower priority than 3*m*-07 or 3*m*-10 not having the possibility of a collision against other signals. For example, when a CSI-RS resource having a small number of eight CSI-RS ports or less is configured, 3*m*-07 or 3*m*-10 may be first used. When a large number of eight CSI-RS ports or more is configured, 3*m*-08 and 3*m*-09 may be additionally used in addition to 3*m*-07 and 3*m*-10. In this case, a BS may apply separate CSI-RS power boosting to CSI-RS transmission locations 3*m*-07, 3*m*-08, 3*m*-09 and 3*m*-10 depending on several reasons, such as coexistence with an LTE CRS or a DMRS, and may transmit information on the separate CSI-RS power boosting to a UE through multiple power boosting information parameters Pc. Specifically, 3*m*-10 is not used by an NZP UE-specific CSI-RS configuration for CSI acquisition, but may be used for a ZP CSI-RS or a cell-specific NZP CSI-RS for time/frequency tracking.

(3-5) Embodiment: CSI-RS Port & Resource Mapping

Figure 3N:
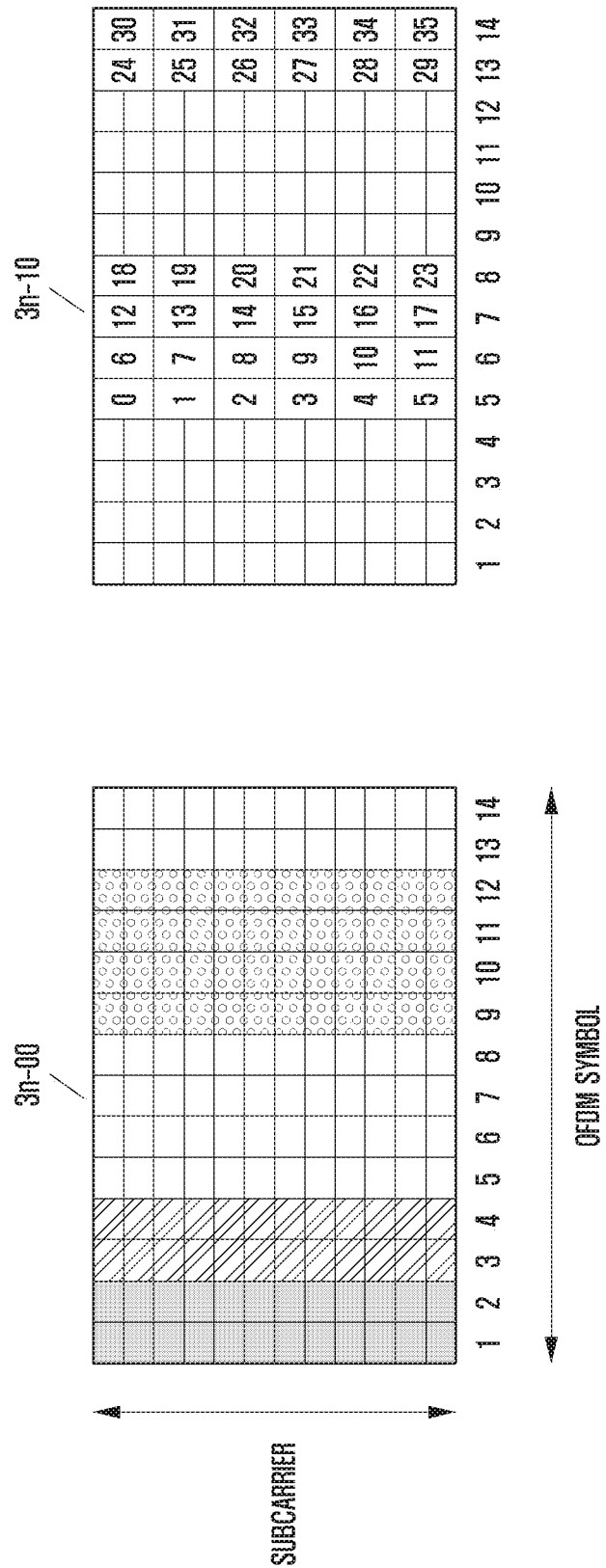
FIGS. 3NA, 3NB, 3NC and 3ND are diagrams showing CSI-RS port mapping examples of CSI-RS resources according to an embodiment of the disclosure.
Figure 3N:
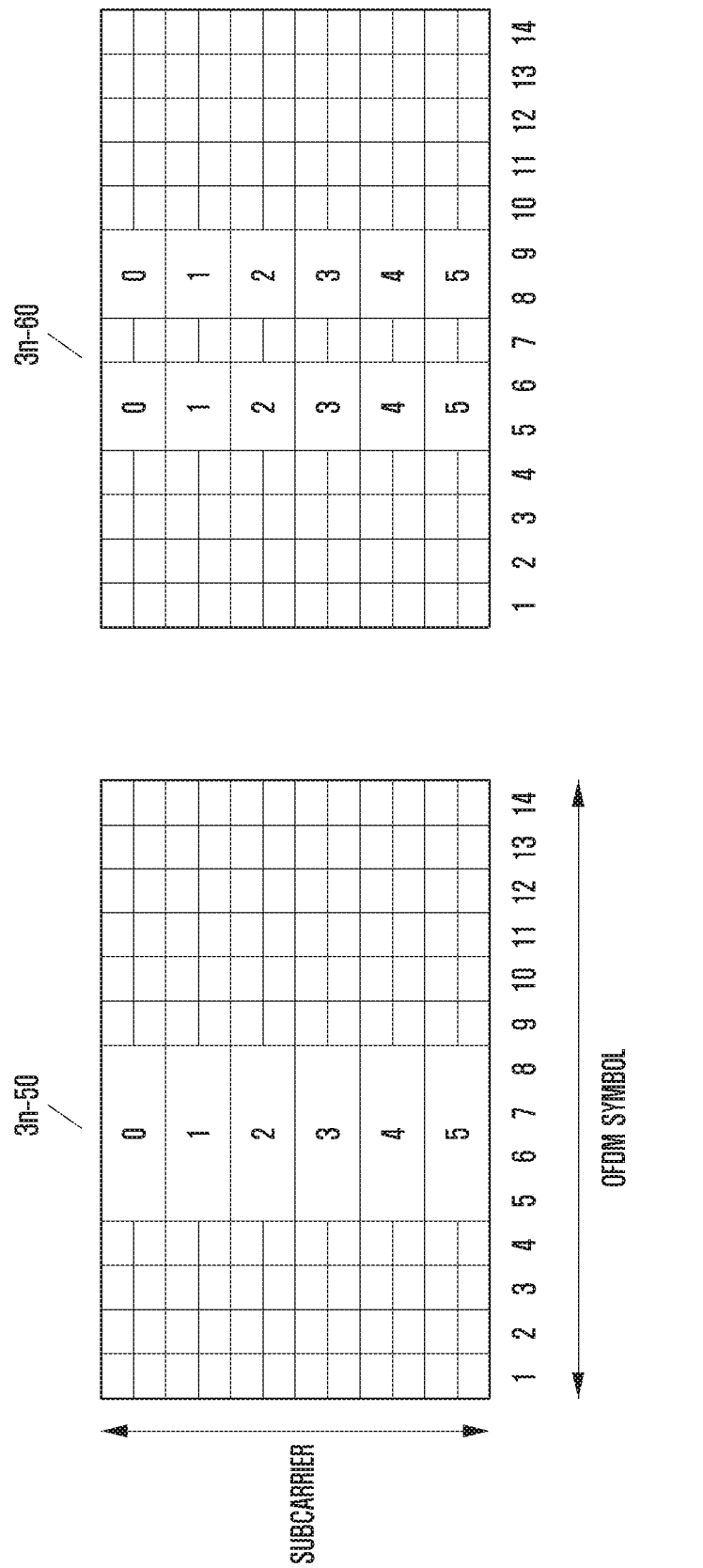
Figure 3N:
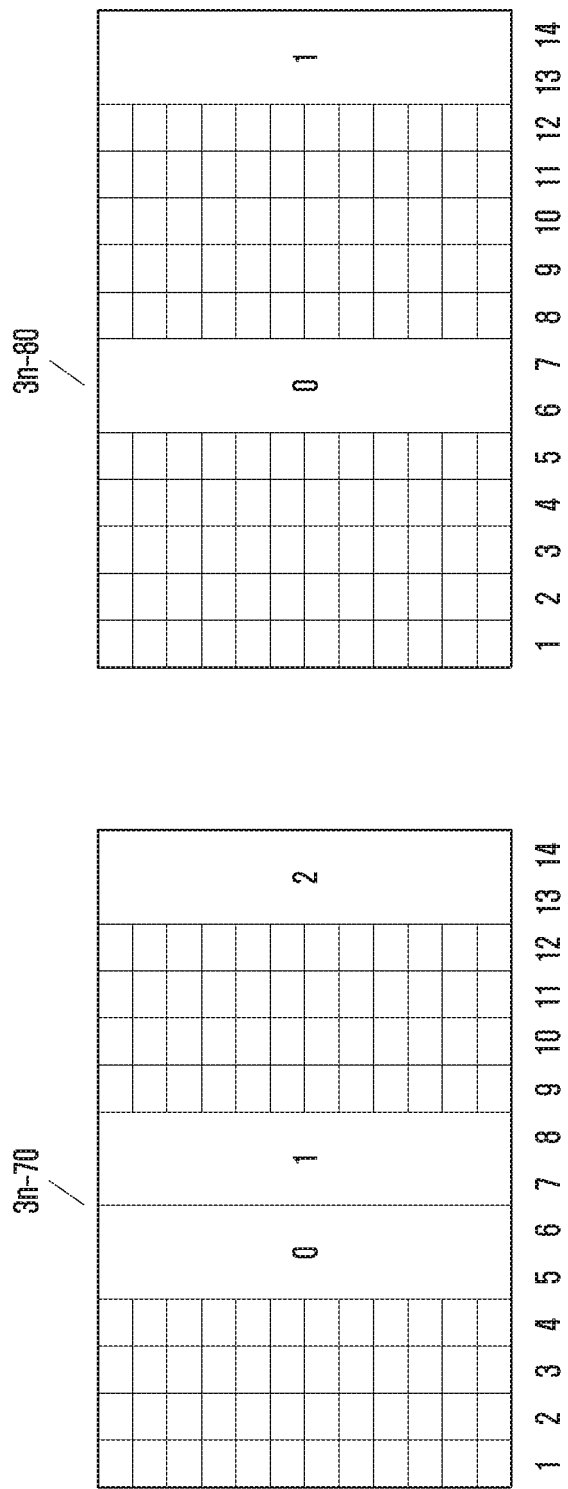
Figure 30A:
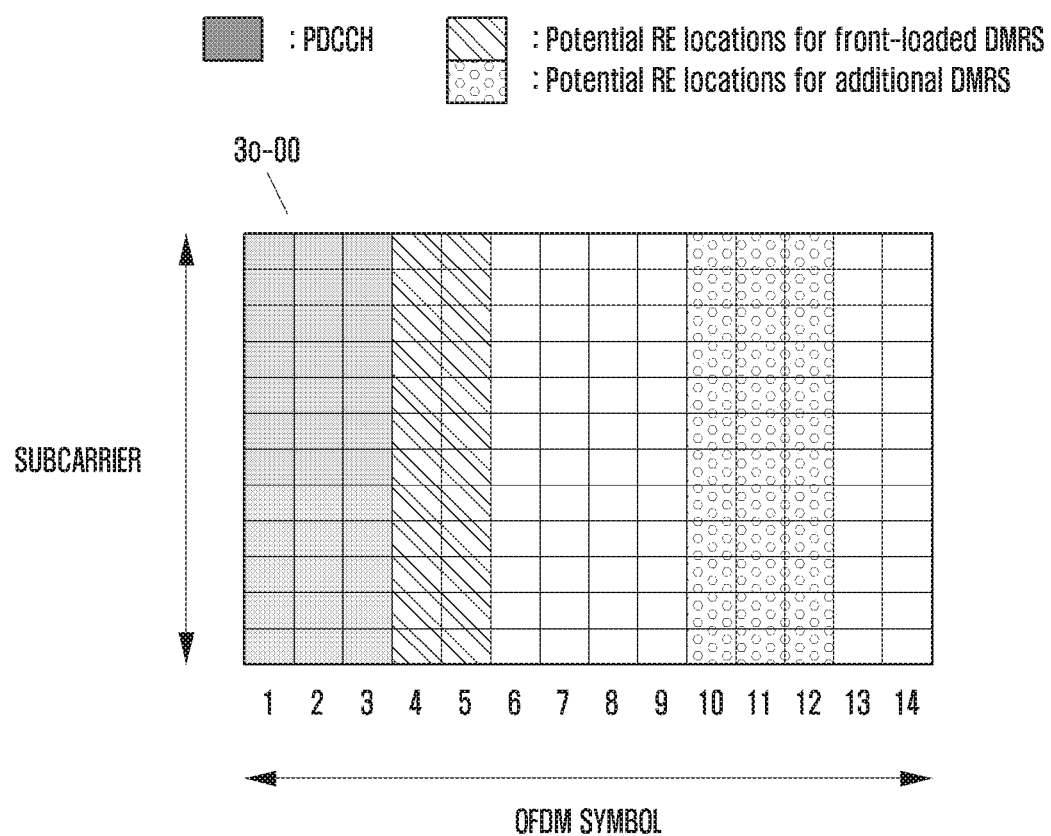
Figure 30C:
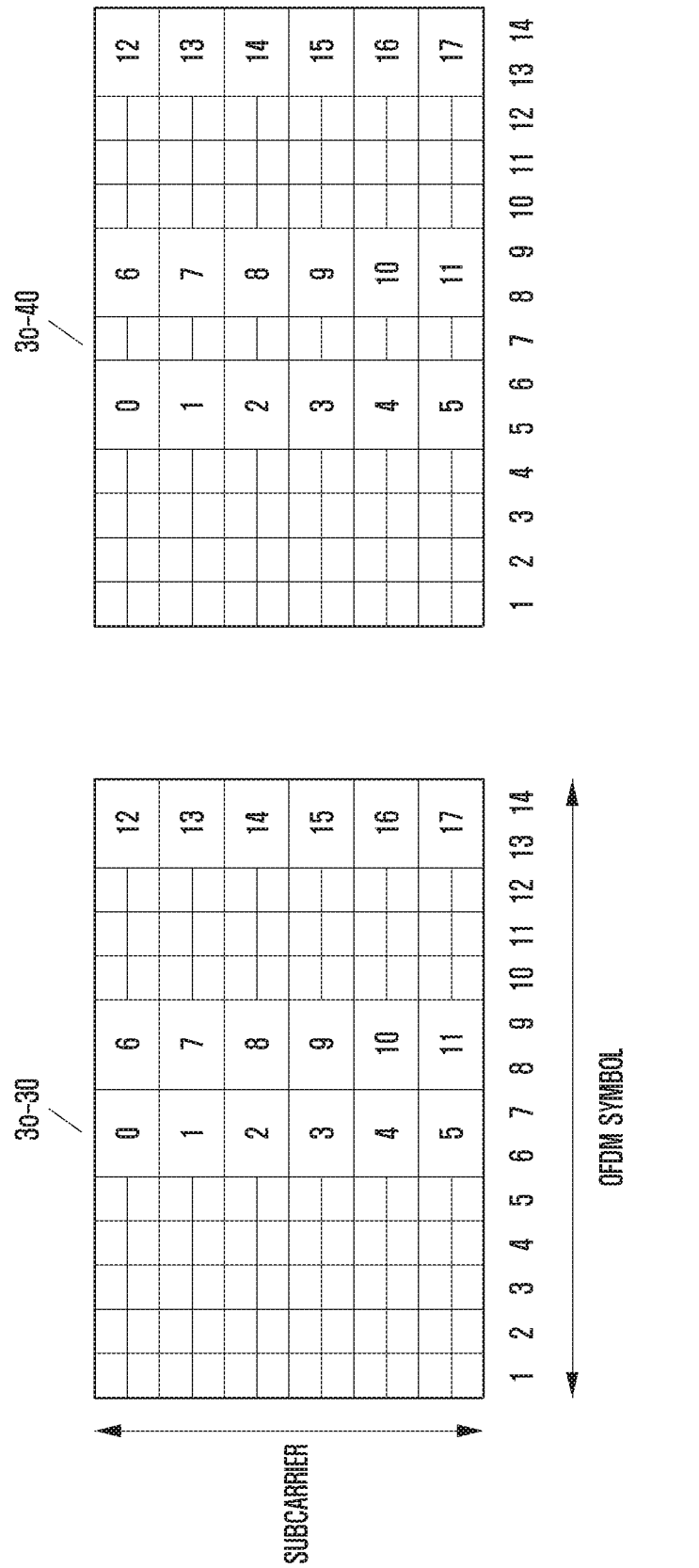
Figure 30D:
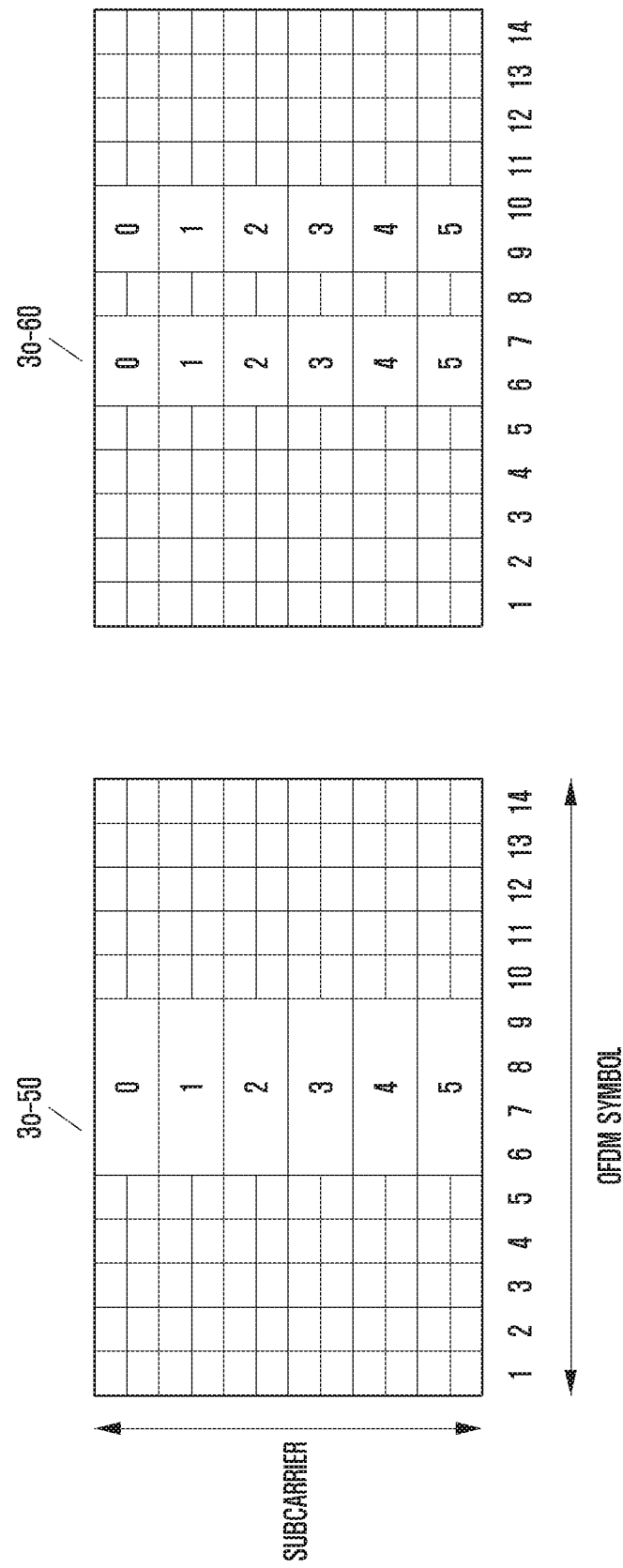
Figure 30E:
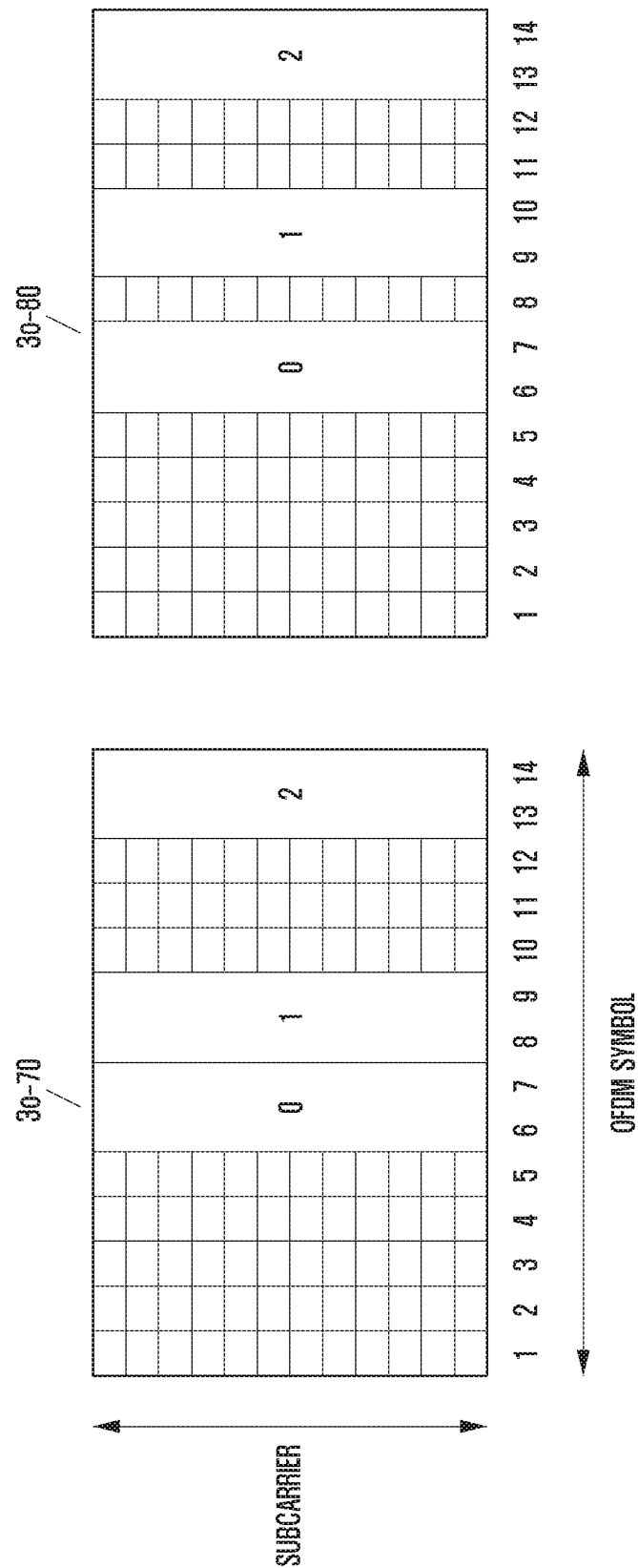

FIGS. 3NA, 3NB, 3NC, 3ND, 3OA, 3OB, 3OC, 3OD, and 3OE are diagrams showing CSI-RS port mapping examples for CSI-RS resources according to the embodiments.

Referring to FIGS. 3NA, 3NB, 3NC and 3ND, 3*n*-00 indicates two PDCCH OFDM symbol, two front-loaded DMRSs and one or more additional DMRS OFDM symbols. According to 3*n*-00, a CSI-RS may be transmitted in {5, 6, 7, 8, 13, 14}-th OFDM symbols. In this case, if UL and DL coexist in one slot, the number of actually used CSI-RS OFDM symbols may be properly adjusted based on a guard period (GP) and PUCCH symbol. For example, if one GP OFDM symbol and PUCCH OFDM symbol are configured, the {13, 14}-th OFDM symbols are not configured as a CSI-RS resource.

In the environment such as 3*n*-00, 36 2-port CSI-RS resources may be defined as in 3*n*-10 for 2-port CSI-RS transmission. If a collision against an LTE CRS is to be avoided, {0, 1, 2, 3, 4, 5, 18, 19, 20, 21, 22, 23}-th configurations are not used in 3*n*-10. In the case of a 4-port CSI-RS, a total of 18 CSI-RS resources may be defined based on 4 REs neighboring in the frequency/time axis as in 3*n*-30. In this case, one CDM-4 may be applied or two length-2 CDM-Ts may be applied to one 4-port CSI-RS resource. If a collision against an LTE CRS is to be avoided, a CSI-RS resource may be defined as a new pattern in which Nos. 5 and 8 OFDM symbols are not used as in 3*n*-40. In the case of an 8-port CSI-RS, a total of six CSI-RS resources may be defined based on eight REs neighboring in the time and frequency axis as in 3*n*-50. In this case, one CDM-8 may be applied or two length-4 CDM-Ts may be applied to one 8-port CSI-RS resource. If a collision against an LTE CRS is to be avoided, the No. 7 OFDM symbol may be empty and a CSI-RS resource may be defined as in 3*n*-60. In the case of a 24-port CSI-RS, three CSI-RS resources including 24 REs may be defined as in 3*n*-70 or 3*n*-80. CDM-2, CDM-4 or CDM-8 may be applied to each CSI-RS resource. In the case of CDM-2, CDM-T is applied to 2 REs neighboring in the time axis. In the case of CDM-4, CDM-T/F is applied to 4 REs neighboring in the time and frequency axis. In the case of CDM-8, CDM-T/F is applied to 8 REs neighboring in the time and frequency axis. If a collision against an LTE CRS is to be avoided, two CSI-RS resources in which Nos. 5 and 8 OFDM symbols are not used may be defined as in 3*n*-80.

Referring to FIGS. 3OA, 3OB, 3OC, 3OD and 3OE, 3*o*-00 indicates three PDCCH OFDM symbols, two front-loaded DMRSs and one or more additional DMRS OFDM symbols. According to 3*o*-00, a CSI-RS may be transmitted in {6, 7, 8, 9, 13, 14}-th OFDM symbols. In this case, if UL and DL coexist in one slot, the number of actually used CSI-RS OFDM symbols may be properly adjusted based on a guard period (GP) and a PUCCH symbol. For example, if one GP OFDM symbol and PUCCH OFDM symbol are configured, the {13, 14}-th OFDM symbols are not configured as a CSI-RS resource.

In the environment such as 3o-00, 36 2-port CSI-RS resources may be defined as in 3o-10 for 2-port CSI-RS transmission. If a collision against an LTE CRS is to be avoided, the No. OFDM symbol may be empty and a CSI-RS resource may be defined as in 3o-20. In the case of a 4-port CSI-RS, a total of 18 CSI-RS resources may be defined based on 4 REs neighboring in the time and frequency axis as in 3o-30. In this case, one CDM-4 may be applied or two length-2 CDM-T may be applied to one 4-port CSI-RS resource. If a collision against an LTE CRS is to be avoided, the No. 8 OFDM symbol may be empty and a CSI-RS resource may be defined as in 3o-40. In the case of an 8-port CSI-RS, a total of 6 CSI-RS resources may be defined based on 8 REs neighboring in the time and frequency axis as in 3o-50. In this case, one CDM-8 may be applied or two length-4 CDM-Ts may be applied to one 8-port CSI-RS resource. If a collision against an LTE CRS is to be avoided, the No. 8 OFDM symbol may be empty and a CSI-RS resource may be defined as in 3o-60. In the case of a 24-port CSI-RS, three CSI-RS resources including 24 REs may be defined as in 3o-70 or 3o-80. CDM-2, CDM-4 or CDM-8 may be applied to each CSI-RS resource. In the case of CDM-2, CDM-T is applied to 2 REs neighboring in the time axis. In the case of CDM-4, CDM-T/F is applied to 4 REs neighboring in the time and frequency axis. In the case of CDM-8, CDM-T/F is applied to 8 REs neighboring in the time and frequency axis. If a collision against an LTE CRS is to be avoided, the No. 8 OFDM symbol may be empty and a CSI-RS resource may be defined as in 3o-80.

In addition, in 8, 12, 16, 24 and 32 ports not described in this example, a CSI-RS resource may be defined according to the above-described aggregation method.

(3-6) Embodiment: CDM Configuration Method for CSI-RS Transmission

A BS may indicate whether or not to apply CDM and a CDM group pattern for each CSI-RS resource through higher layer signaling. For example, a BS may provide higher layer signaling to a UE so that the UE applies at least one of {CDM off, CDM-2, CDM-4, CDM-8}. The CDM signaling may be implicitly defined according to a CSI-RS transmission condition. For example, a UE may determine whether or not to apply CDM based on the number of configured CSI-RS ports or a CSI-RS RE pattern. In this case, when the number of CSI-RS ports is 2 or 4 or less or all CSI-RS ports are transmitted in one OFDM symbol, the UE may be agree to assume CDM off. For another example, the UE may determine whether or not to apply CDM based on a CSI-RS transmission object. In this case, if a CSI-RS is used for a time/frequency tracking object (when it is configured by an MIB or SIB) or for a beam management object (when a subtime unit is configured, that is, when a CSI-RS OFDM symbol and a data OFDM symbol have different subcarrier spacings or a CSI-RS is transmitted according to an IFDMA method), the UE may be agreed to assume CDM off.

In the example, one CDM configuration signaling has been assumed, but signaling may be separately applied to CDM-T (time) and CDM-F (frequency) upon actual application. In this case, only the CDM-T may be off or only the CDM-F may be off through methods similar to the example.

(3-7) Embodiment: CSI-RS Bandwidth Configuration Method

In NR, a CSI-RS resource configuration includes information on a CSI-RS transmission bandwidth (bandwidth and transmission location) explicitly or implicitly. In this case, a CSI-RS transmission bandwidth configured by a higher layer may include at least one of the following options {system BW, bandwidth part index, scheduled resource, explicit signaling (e.g., bit map or starting RB & ending RB)}. If a CSI-RS bandwidth is configured as a system BW, a corresponding CSI-RS is transmitted in a full band. If a CSI-RS bandwidth is configured as a bandwidth part, a BS needs to notify a UE of information on bandwidth part indices in which a CSI-RS is transmitted. If a CSI-RS is hopped based on a predetermined pattern, information related to a bandwidth part index may be omitted.

If a CSI-RS bandwidth is configured as a scheduling resource, one of the following two options may be applied. The first method is that a) a CSI-RS may be full transmitted within a band including a minimum scheduled RB~a maximum scheduled RB. In this case, a BS may transmit the CSI-RS from the RB of the lowest index to the RB of the highest index assigned to a UE. In this case, it is evident that transmission may be omitted in some RBs depending on configured CSI-RS RE density. Furthermore, in this example, a CSI-RS transmission pattern is not changed depending on a resource allocation type (localized allocation or distributed allocation). The second method is that b) CSI-RS transmission is performed only within a scheduled RB. In this case, a BS may transmit a CSI-RS from the RB (or RBG) of the lowest index to an RB to which a PDSCH has been actually assigned among the RB (or RBG) of the highest index, which have been assigned to a UE. In this case, it is evident that transmission may be omitted in some RBs depending on configured CSI-RS RE density. Furthermore, in this example, a CSI-RS transmission pattern is changed depending on a resource allocation type (localized allocation or distributed allocation).

If a CSI-RS transmission band is determined using explicit signaling, one of the following two options may be applied. The first method is that a) whether a CSI-RS is transmitted in a band represented by each bit is notified through a bit map. In this case, the configuration of the CSI-RS transmission band has small required granularity compared to resource allocation or PRB bundling. Accordingly, in order to define a CSI-RS transmission band represented by each bit, a table may be separately defined. However, the CSI-RS transmission band may be agreed to have a size of N times based on an RBG size table, such as Table 3a. In this case, there is an advantage in that a bitmap payload for a CSI-RS bandwidth configuration is reduced by 1/N times compared to a bitmap payload for resource allocation. The N may be previously defined as a given value, may be determined by a value, such as a system BW or a bandwidth of a bandwidth part or a UE maximum BW, or may be directly configured through higher layer signaling. In this case, it is evident that transmission may be omitted in some RBs depending on configured CSI-RS RE density. The second is b) a method of providing notification of the start point of a band in which a CSI-RS is transmitted, that is, the index of an RB having the lowest index among RBs (or RBGs), and the end point, that is, the indices of RBs having the highest index among RBs (or RBGs). As in Method a), in this case, an RB (or RBG) index which may be selected as the start point or end point may be limited. Furthermore, in this case, it is evident that transmission may be omitted in some RBs depending on configured CSI-RS RE density.

TABLE 3b

An example of resource allocation RBG size vs. Downlink System Bandwidth

| System Bandwidth $N_{RB}^{DL}$ | RBG Size (P) |
|---|---|
| ≤10 | 1 |
| 11-26 | 2 |
| 27-63 | 3 |
| 64-110 | 4 |

(3-8) Embodiment: OFDM Symbol Location for CSI-RS Transmission

The detailed application of the CSI-RS OFDM symbol location described in the (3-4) embodiment may be different depending on the transmission location of a different channel or RS, such as an SS block or a DMRS. In this example, detailed descriptions correspond to a case where one slot has been configured with 14 OFDM symbols. If one slot is configured with 14 OFDM symbols or less, the detailed descriptions may be properly modified accordingly.

The candidate locations of CSI-RS OFDM symbols available in the first example may include all the 14 OFDM symbols. In this case, if some of the {1, 2, 3}-th OFDM symbols of a given UE are assigned as a control resource set (CORESET), the corresponding UE may be aware that a CSI-RS is not transmitted in the corresponding OFDM symbols (or the UE may be aware that it does not need to receive a CSI_RS). An OFDM symbol location where the CORESET is transmitted may be determined based on CORESET configuration information of a corresponding UE, but may be determined by synthetically taking into consideration of CORESET information of other UEs configured through independent signaling. UEs for which some of {3, 4}-th OFDM symbols (if a CORESET is present in {1, 2}-th OFDM symbol) has been assigned as a front-loaded DMRS transmission-capable location may be aware that a CSI-RS is not transmitted in the corresponding OFDM symbols (or the UEs may be aware that they do not need to receive a CSI-RS). Thereafter, a CSI-RS may be configured and transmitted in {5, 6, . . . , X<=14}-th OFDM symbols. The last location X where a CSI-RS may be configured may be different depending on a DL-UL configuration value. UEs for which some of {4, 5}-th OFDM symbols (if a CORESET is present in {1, 2, 3}-th OFDM symbols) has been assigned as a front-loaded DMRS transmission-capable location may be aware that a CSI-RS is not transmitted in the corresponding OFDM symbols (or the UEs may be aware that they do not need to receive a CSI-RS). Thereafter, a CSI-RS may be configured and transmitted in {6, 7, . . . , X<=14}-th OFDM symbols. The last location X where a CSI-RS may be configured may be different depending on a DL-UL configuration value.

The candidate locations of CSI-RS OFDM symbols available in the second example ma include only some of all the 14 OFDM symbols. For example, it may be agreed that a CSI-RS cannot be configured from {1, 2, 3}-th OFDM symbols, that is, a maximum range in which a CORESET may be configured, to {4, 5}-th OFDM symbols, that is, a maximum range in which a front-loaded DMRS may be configured. That is, a CSI-RS may be configured and transmitted in some of {6, 7, . . . , X<=14}-th OFDM symbols. The last location X where a CSI-RS may be configured may be different depending on a DL-UL configuration value.

In both the examples, a CSI-RS may be configured in the same OFDM symbol as additional DMRS OFDM symbol transmitted after a front-loaded DMRS within one slot. However, a UE does not assume that a CSI-RS RE and a DMRS RE overlap in a corresponding OFDM symbol. That is, the CSI-RS and the DMRS are not transmitted in the same RE at the same time.

Meanwhile, the embodiments of the disclosure disclosed in the specification and drawings have suggested given examples in order to easily describe the technical contents of the disclosure and to help understanding of the disclosure, and are not intended to limit the scope of the disclosure. That is, it is evident to those skilled in the art to which the disclosure pertains that other modified examples based on technical spirit of the disclosure may be practiced. Furthermore, the embodiments may be combined and operated, if necessary.

The invention claimed is:

1. A method performed by a terminal in a wireless communication system, the method comprising:
receiving, from a base station, a message configuring a channel state information reference signal (CSI-RS) resource, the message including first information on a frequency domain location and a frequency domain aggregation level for the CSI-RS resource, second information on a time domain location for the CSI-RS resource, and third information on a code divisional multiplexing (CDM) type for the CSI-RS resource;
identifying a CDM group consisting of two resource elements based on the first information, wherein the two resource elements are defined by two neighboring subcarriers of one orthogonal frequency division multiplexing (OFDM) symbol;
identifying a plurality of resource elements corresponding to the CSI-RS resource based on the first information and the second information, wherein the plurality of resource elements include the CDM group and another CDM group on different OFDM symbols which are aggregated based on the second information indicating two time domain locations; and
receiving, from the base station, a CSI-RS on the plurality of resource elements,
wherein a reference signal density in a physical resource block (PRB) is different for the different OFDM symbols, and the reference signal density is indicated from the base station.

2. The method of claim 1, wherein the frequency domain aggregation level indicates an extension level of the CDM group in a frequency axis.

3. The method of claim 2,
wherein the third information indicates an orthogonal cover code (OCC) to be applied to the two resource elements, and
wherein a length of the OCC is 2.

4. A terminal in a wireless communication system, the terminal comprising:
a transceiver configured to transmit or receive a signal; and
a controller coupled with the transceiver and configured to:
receive, from a base station, a message configuring a channel state information reference signal (CSI-RS) resource, the message including first information on a frequency domain location and a frequency domain aggregation level for the CSI-RS resource, second information on a time domain location for the CSI- RS resource, and third information on a code divisional multiplexing (CDM) type for the CSI-RS resource, identify a CDM group consisting of two resource elements based on the first information, wherein the two resource elements are defined by two neighboring subcarriers of one orthogonal frequency division multiplexing (OFDM) symbol, identify a plurality of resource elements corresponding to the CSI-RS resource based on the first information and the second information, wherein the plurality of resource elements include the CDM group and another CDM group on different OFDM symbols which are aggregated based on the second information indicating two time domain locations, and receive, from the base station, a CSI-RS on the plurality of resource elements, wherein a reference signal density in a physical resource block (PRB) is different for the different OFDM symbols, and the reference signal density is indicated from the base station.

5. The terminal of claim 4, wherein the frequency domain aggregation level indicates an extension level of the CDM group in a frequency axis.

6. The terminal of claim 5, wherein the third information indicates an orthogonal cover code (OCC) to be applied to the two resource elements, and wherein a length of the OCC is 2.

7. A method performed by a base station in a wireless communication system, the method comprising:

transmitting, to a terminal, a message configuring a channel state information reference signal (CSI-RS) resource, the message including first information on a frequency domain location and a frequency domain aggregation level for the CSI-RS resource, second information on a time domain location for the CSI-RS resource, and third information on a code divisional multiplexing (CDM) type for the CSI-RS resource;

identifying a CDM group consisting of two resource elements based on the first information, wherein the two resource elements are defined by two neighboring subcarriers of one orthogonal frequency division multiplexing (OFDM) symbol;

identifying a plurality of resource elements corresponding to the CSI-RS resource based on the first information and the second information, wherein the plurality of resource elements include the CDM group and another CDM group on different OFDM symbols which are aggregated based on the second information indicating two time domain locations; and transmitting, to the terminal, a CSI-RS on the plurality of resource elements, wherein a reference signal density in a physical resource block (PRB) is different for the different OFDM symbols, and the reference signal density is indicated to the terminal.

8. The method of claim 7, wherein the frequency domain aggregation level indicates an extension level of the CDM group in a frequency axis.

9. The method of claim 8, wherein the third information indicates an orthogonal cover code (OCC) to be applied to the two resource elements, and wherein a length of the OCC is 2.

10. A base station in a wireless communication system, the base station comprising:

a transceiver configured to transmit or receive a signal; and a controller coupled with the transceiver and configured to:

transmit, to a terminal, a message configuring a channel state information reference signal (CSI-RS) resource, the message including first information on a frequency domain location and a frequency domain aggregation level for the CSI-RS resource, second information on a time domain location for the CSI-RS resource, and third information on a code divisional multiplexing (CDM) type for the CSI-RS resource, identify a CDM group consisting of two resource elements based on the first information, wherein the two resource elements are defined by two neighboring subcarriers of one orthogonal frequency division multiplexing (OFDM) symbol, identify a plurality of resource elements corresponding to the CSI-RS resource based on the first information and the second information, wherein the plurality of resource elements include the CDM group and another CDM group on different OFDM symbols which are aggregated based on the second information indicating two time domain locations, and transmit, to the terminal, a CSI-RS on the plurality of resource elements, wherein a reference signal density in a physical resource block (PRB) is different for the different OFDM symbols, and the reference signal density is indicated to the terminal.

11. The base station of claim 10, wherein the frequency domain aggregation level indicates an extension level of the CDM group in a frequency axis.

12. The base station of claim 11, wherein the third information indicates an orthogonal cover code (OCC) to be applied to the two resource elements, and wherein a length of the OCC is 2.

* * * * *